United States Patent
Hebrink et al.

(10) Patent No.: US 12,352,464 B2
(45) Date of Patent: Jul. 8, 2025

(54) MULTI-SURFACE PASSIVE COOLING ARTICLES

(71) Applicant: 3M INNOVATIVE PROPERTIES COMPANY, St. Paul, MN (US)

(72) Inventors: Timothy J. Hebrink, Scandia, MN (US); Ryan J. Rogers, Shoreview, MN (US); Milind B. Sabade, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 19 days.

(21) Appl. No.: 17/779,921

(22) PCT Filed: Dec. 16, 2020

(86) PCT No.: PCT/IB2020/062038
§ 371 (c)(1),
(2) Date: May 25, 2022

(87) PCT Pub. No.: WO2021/137080
PCT Pub. Date: Jul. 8, 2021

(65) Prior Publication Data
US 2023/0008147 A1    Jan. 12, 2023

Related U.S. Application Data

(60) Provisional application No. 62/955,800, filed on Dec. 31, 2019.

(51) Int. Cl.
*F24F 5/00* (2006.01)
*E04F 13/12* (2006.01)
(Continued)

(52) U.S. Cl.
CPC ............ *F24F 5/0075* (2013.01); *E04F 13/12* (2013.01); *F24S 20/66* (2018.05); *F28F 13/18* (2013.01);
(Continued)

(58) Field of Classification Search
CPC ...... F24F 5/0075; F24F 5/0089; F24F 5/0092; F24F 2005/0078; F24F 2005/0082;
(Continued)

(56) References Cited

U.S. PATENT DOCUMENTS 3,285,333 A    11/1966  Johnson, Jr.
3,350,372 A    10/1967  Anspon et al.
(Continued)

FOREIGN PATENT DOCUMENTS

WO    200048037 A2    8/2000
WO    2013036112 A1    3/2013
(Continued)

OTHER PUBLICATIONS

"Industrial Applications: Radiant Barrier Coating", SOLEC Solar Energy Corporation, 2020, 4 pages.
(Continued)

Primary Examiner — Travis Ruby
(74) Attorney, Agent, or Firm — Philip P. Soo

(57) ABSTRACT

Passive cooling article (120) includes a plurality of first elements (122) defining a high absorbance in the atmospheric window wavelength range and defining high average reflectance in the solar wavelength range and a plurality of second elements (124) defining a low absorbance in the atmospheric window wavelength range and defining high average reflectance in the solar wavelength range, wherein the plurality of first (122) and second (124) elements are interspersed to form a major structure having a first major surface (130) comprising the first element outer surfaces
(Continued)

(126) and the second element outer surfaces (128), wherein the first element outer surfaces (126) face a first direction toward a first end region (136) of the major structure (130) and the second element outer surfaces (128) face a second direction toward a second end region (136) of the major structure. The article (120) may be applied to a substrate (104), for example, on a generally vertical surface of a vehicle or stationary structure.

20 Claims, 19 Drawing Sheets

(51) Int. Cl.
F24S 20/66 (2018.01)
F28F 13/18 (2006.01)
(52) U.S. Cl.
CPC ... F24F 2005/0082 (2013.01); F28F 2245/06 (2013.01)
(58) Field of Classification Search
CPC ......... F25B 23/003; F28F 13/14; F28F 13/16; F28F 13/18; F28F 2245/06; F28F 2255/06; E04B 1/762; E04B 2001/7691; E06B 2009/2464; F24S 20/60–69; F24S 50/80
See application file for complete search history.

(56) References Cited

U.S. PATENT DOCUMENTS

| | | | |
|---|---|---|---|
| 4,726,989 A | 2/1988 | Mrozinski | |
| 4,874,567 A | 10/1989 | Lopatin et al. | |
| 4,976,859 A | 12/1990 | Wechs | |
| 5,238,623 A | 8/1993 | Mrozinski | |
| 5,993,954 A | 11/1999 | Radovanovic et al. | |
| 6,261,994 B1 | 7/2001 | Bourdelais et al. | |
| 6,368,742 B2 | 4/2002 | Fisher et al. | |
| 6,632,850 B2 | 10/2003 | Hughes et al. | |
| 6,783,349 B2 | 8/2004 | Neavin et al. | |
| 6,929,864 B2 | 8/2005 | Fleming et al. | |
| 7,018,713 B2 | 3/2006 | Padiyath et al. | |
| 7,215,473 B2 | 5/2007 | Fleming | |
| 7,328,638 B2 | 2/2008 | Gardiner et al. | |
| 7,350,442 B2 | 4/2008 | Ehnes et al. | |
| 8,962,214 B2* | 2/2015 | Smith | B01D 67/0027 |
| | | | 429/491 |
| 9,034,459 B2 | 5/2015 | Condo et al. | |
| 9,670,300 B2 | 6/2017 | Olson et al. | |
| 9,709,349 B2 | 7/2017 | Raman et al. | |
| 10,088,251 B2 | 10/2018 | Raman et al. | |
| 10,134,566 B2 | 11/2018 | David et al. | |
| 10,240,013 B2 | 3/2019 | Mrozinski et al. | |
| 10,263,132 B2 | 4/2019 | Hebrink et al. | |
| 2006/0197953 A1* | 9/2006 | Perez | B82Y 15/00 |
| | | | 356/445 |
| 2009/0147361 A1 | 6/2009 | Gardiner | |
| 2013/0236697 A1 | 9/2013 | Walker, Jr. et al. | |
| 2014/0131023 A1 | 5/2014 | Raman et al. | |
| 2015/0131146 A1 | 5/2015 | Fan et al. | |
| 2015/0338175 A1 | 11/2015 | Raman et al. | |
| 2016/0149067 A1 | 5/2016 | Hebrink et al. | |
| 2016/0268464 A1 | 9/2016 | Fan et al. | |
| 2017/0198129 A1 | 7/2017 | Olson et al. | |
| 2017/0248381 A1* | 8/2017 | Yang | F28F 21/089 |
| 2018/0180331 A1 | 6/2018 | Yu et al. | |
| 2019/0184687 A1* | 6/2019 | Yasuda | B32B 27/08 |

FOREIGN PATENT DOCUMENTS

| | | |
|---|---|---|
| WO | 2018130926 A1 | 7/2018 |
| WO | 2019130198 A1 | 7/2019 |
| WO | 2019130199 A1 | 7/2019 |
| WO | 2020240366 A1 | 12/2020 |

OTHER PUBLICATIONS

"Low Emissive Paints", IPS innovative products & systems, 2007, 2 pages.
Gentle, "A Subambient Open Roof Surface on the Mid-Summer Sun", Advanced Science, 2015, vol. 2, pp. 1500119(1)-1500119(2).
Hossain, "A Metamaterial Emitter for Highly Efficient Radiative Cooling", Advanced Optical Materials, 2015, vol. 3, pp. 1047-1051.
Hossain, "Radiative Cooling: Principles, Progress, and Potentials", Advanced Science, 2016, vol. 3, pp. 1500360(1)-1500360(2).
International Search Report for PCT International Application No. PCT/IB2020/062038, mailed on Feb. 3, 2021, 4 pages.
Raman, "Passive Radiative Cooling below ambient air temperature under direct sunlight", Nature, Nov. 2014, vol. 515, pp. 540-544.
Zhai, "Scalable-manufactured randomized glass-polymer hybrid metamaterial for daytime radiative cooling", Science, Mar. 2017, vol. 355, pp. 1062-1066.

* cited by examiner

MULTI-SURFACE PASSIVE COOLING ARTICLES

CROSS REFERENCE TO RELATED APPLICATIONS

This application is a national stage filing under 35 U.S.C. 371 of PCT/IB2020/062038, filed 16 Dec. 2020, which claims the benefit of U.S. Provisional Application No. 62/955,800, filed 31 Dec. 2019, the disclosures of which are incorporated by reference in their entireties herein.

Passive radiative cooling without external energy sources may be appealing for reducing electricity needed in cooling applications such as refrigeration, air conditioning, vehicles, electrical transformers, and communication antennas. Surface material properties for passive radiative cooling to occur during the day include low emittance over the solar energy wavelengths of 0.3 to 2.5 micrometers and high emittance over infrared wavelength range of 3 to 20 microns. For cooling surfaces below air temperature by passive radiative cooling, the surface may have high emittance in the infrared wavelength range of 8 to 13 micrometers and not in the wavelength range of 3 to 8 micrometers (or 13 to 20 micrometers). According to Kirchoff's law of thermal radiation, high emittance correlates to high absorbance. The orientation of the radiative cooling surface relative to the sky, especially on vertical surfaces, may affect performance. Some investigation into the ability to conduct passive cooling during the day has been conducted. Some cooling panels made with films for passive cooling have been described.

SUMMARY

The present disclosure provides passive cooling using multi-surface passive cooling articles. In particular, the present disclosure relates to passive cooling articles having high emissivity elements at least partially defining first element surfaces and low emissivity elements at least partially defining second element surfaces facing a different direction than the first surfaces, wherein the high emissivity elements and the low emissivity elements form a surface of a major structure. In some applications, the major structure is applicable to a vertical surface of a substrate (such as a building or a vehicle) with the high emissivity elements facing, or oriented, upward toward the sky and the low emissivity elements facing, or oriented, downward toward the ground or at least "shaded" by the high emissivity elements. The structure may be described as a "cool wall" surfacing material. The high emissivity elements may form a high emissivity solar mirror. The low emissivity elements may form a low emissivity infrared (IR) mirror with an optional visual graphic. The element surfaces may include macrostructures, microstructures, or even nanostructures to facilitate various properties.

In one aspect, the present disclosure relates to a passive cooling article having a high absorbance and a low absorbance in an atmospheric window region on different-facing elements of the article. The passive cooling article includes a plurality of first elements defining first element outer surfaces and a plurality of second elements defining second element outer surfaces. The plurality of first elements define a first absorbance of greater than or equal to 0.6 (in some embodiments, greater than or equal to 0.7, 0.8, 0.9, or even 1) in an atmospheric window wavelength range from 8 to 13 micrometers (in some embodiments, 4 to 20 micrometers) and defining a first average reflectance of greater than or equal to 80% (in some embodiments, greater than or equal to 90%) in a solar wavelength range from 0.4 to 2.5 micrometers (in some embodiments, from 0.3 to 3.5 micrometers). The plurality of second elements define a second absorbance of less than or equal to 0.5 (in some embodiments, less than or equal to 0.4, 0.3, 0.2, or even 0.1; generally lower than the first absorbance) in the atmospheric window wavelength range and defining a second average reflectance of greater than or equal to 60% (in some embodiments, greater than or equal to 80% or even 90%) in the solar wavelength range. The plurality of first elements and the plurality of second elements are interspersed to form a major structure having a first major surface including the first element outer surfaces and the second element outer surfaces and a second major surface opposing the first major surface. The major structure has a first end region and a second end region, wherein the first element outer surfaces face a first direction toward the first end region and the second element outer surfaces face a second direction toward the second end region.

In another aspect, the present disclosure relates to an apparatus (or system) including the passing cooling article. The apparatus includes a substrate capable of being cooled with at least a portion of a substate surface configured to be exposed to solar energy. The passive cooling article covers at least the portion of the substrate surface to reflect solar energy directed toward the substrate surface.

As used herein, the term "passive cooling" refers to passive radiative cooling that may provide cooling without consuming energy from a source of energy, such as a battery or other electricity source. Passive cooling may be defined in contrast to "active cooling" for which a source of energy is consumed (for example, cooling by air conditioning unit having a compressor and fan powered by electricity).

As used herein, the term "light" refers to electromagnetic energy of any wavelength. In some embodiments, light means electromagnetic energy having a wavelength of at most 20 micrometers, or at most 13 micrometers. In some embodiments, light means radiant energy in a region of the electromagnetic spectrum from 0.25 to 20 micrometers.

As used herein, the "solar region" or "solar wavelength range" of the electromagnetic spectrum refers to a portion of the electromagnetic spectrum that partially or fully includes sunlight or solar energy. The solar region may include at least one of the visible, ultraviolet, or infrared wavelengths of light. The solar region may be defined as wavelengths in a range from 0.4 to 2.5 micrometers (or from 0.3 to 2.5 micrometers, 0.3 to 3.0 micrometers, or even 0.3 to 3.5 micrometers).

As used herein, the "atmospheric window region" or "atmospheric window wavelength range" of the electromagnetic spectrum refers to a portion of the electromagnetic spectrum that partially or fully includes wavelengths that can be partially transmitted through the atmosphere. The atmospheric window region may include at least some infrared wavelengths of light. The atmospheric window region may be defined as wavelengths ranging from 8 to 13 micrometers, 7 to 14 micrometers, or even 6 to 14 micrometers.

As used herein, the term "visible," "visible region," or "visible wavelength range" refers to wavelengths from 0.4 to 0.8 micrometers.

As used herein, the term "infrared," "infrared region," or "infrared wavelength range" refers to wavelengths of light that are greater than or equal to 0.8 micrometers and less than 1 millimeter. A "near-infrared region" refers to wavelengths from 0.8 to 4 micrometers. A "mid-infrared region" refers to wavelengths from 4 to 20 micrometers.

As used herein, the term "material" refers to a monolithic material or composite material.

As used herein, the terms "transmittance" and "transmission" refer to the ratio of total transmission of a layer of a material compared to that received by the material, which may account for the effects of absorption, scattering, reflection, etc. Transmittance (T) may range from 0 to 1 or be expressed as a percentage (T%).

The term "average transmittance" refers to the arithmetic mean of a sample of transmittance measurements over a range of wavelengths.

Transmission can be measured with methods described in ASTM E1348-15e1 (2015). A Lambda 1050 spectrophotometer equipped with an integrating sphere was used to make transmission measurements described herein. The Lambda 1050 was configured to scan from 250 nanometer wavelengths of light to 2500 nanometer wavelengths of light at 5 nanometer intervals in transmission mode. Background scans are conducted with no sample in the light path before the integrating sphere, and the standard spectralon covers over the integrating sphere ports. After background scans are made, the film sample is placed in the light path by covering the entrance port to the integrating sphere with the film sample. Light transmission spectrum scans are made using the standard detectors for a range from 250 nanometers to 2500 nanometers and recorded by the software provided with the Lambda 1050.

As used herein, the term "minimum transmittance" refers to the lowest transmittance value over a range of wavelengths.

As used herein, the terms "reflectance" and "reflectivity" refer to the effectiveness in reflecting light for a surface of an object. The term "average reflectance" refers to at least one of: a measurement of the reflectance of uniformly unpolarized light (for at least one incidence angle) or the average of reflectance measurements of two or more polarizations of light (for example, s and p polarizations, for at least one angle of incidence).

Reflection can be measured with methods described in ASTM E1349-06 (2015). A Lambda 1050 spectrophotometer equipped with an integrating sphere was used to make reflection measurements described herein. The Lambda 1050 was configured to scan from 250 nanometers to 2500 nanometers at 5 nanometer intervals in reflection mode. Background scans are conducted with no sample in the light path and spectralon standards covering the integrating sphere ports. After background scans are made, the spectralon standard at the back of the integrating sphere is replaced with the film sample. Light reflection spectrum scans are made using the standard detectors for a range from 250 nanometers to 2500 nanometers and recorded by the software provided with the Lambda 1050. Solar reflectivity can be reported as a weighted average over the solar wavelength range. In some embodiments, any of the above-listed values may be an average value obtained by weighting the results over the wavelength range, according to the weightings of the AM1.5 standard solar spectrum.

As used herein, "emissivity" of a surface of a material is its effectiveness in emitting energy as thermal radiation. The emissivity may be described as a ratio of the radiant exitance of the surface compared to that of a black body at the same temperature as the surface and can range from 0 to 1. Emissivity can be measured using infrared imaging radiometers with methods described in ASTM E1933-99a (2010).

As used herein, the term "absorbance" refers to the base 10 logarithm of a ratio of incident radiant power to transmitted radiant power through a material. The ratio may be described as the radiant flux received by the material divided by the radiant flux transmitted by the material. Absorbance (A) may be calculated based on transmittance (T) according to Equation 1:

$$A = -\log_{10} T = 2 - \log_{10} T\%$$ (Equation 1).

As used herein, the term "absorptivity" of a surface of a material is its effectiveness in absorbing radiant energy. The absorptivity may be described as a ratio of the radiant flux absorbed by the surfaced compared to that received by the surface. As known to those of ordinary skill in the art, emissivity is equal to the absorptivity of the surface of the material. In other words, a high absorbance means high emissivity, and a low absorbance means low emissivity. Therefore, emissivity and absorptivity may be used interchangeably throughout this disclosure to describe this property of the material.

Absorbance in the solar region can be measured with methods described in ASTM E903-12 (2012). Absorbance measurements described herein were made by making transmission measurements as previously described and then calculating absorbance using Equation 1.

As used herein, the term "minimum absorbance" refers to the lowest absorbance value over a range of wavelengths.

As used herein, the term "average absorbance" refers to the arithmetic mean of a sample of absorbance measurements over a range of wavelengths. For example, absorbance measurements in a range from 8 to 13 micrometers can be averaged over that range.

As used herein, the terms "polymer" and "polymeric material" include, but are not limited to, organic homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries. Polymers also include synthetic and natural organic polymers (for example, cellulose polysaccharides and their derivatives).

As used herein, the term "fluoropolymer" refers to any polymer having fluorine. In some embodiments, a fluoropolymer may be described as a fluoroplastic or, more particularly, a fluorothermoplastic (for example, fluorothermoplastics available under the trade designation "3M DYNEON THV" from the 3M Company of St. Paul, Minn.).

As used herein, the term "microporous" refers to having internal porosity (continuous or discontinuous) having average pore diameters of 50 to 10,000 nanometers.

As used herein, the term "micro-voided" refers to having internal discrete voids having an average void diameter of 50 to 10,000 nanometers.

As used herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (for example, comprise and derivatives thereof) are considered to additionally be recited in closed-ended language (for example, consist and derivatives thereof) and in partially closed-ended language (for example, consist essentially, and derivatives thereof).

In this application, terms such as "a," "an," and "the" are not intended to refer to only a singular entity but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

As used herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "at least," "at most," and "up to" a number (for example, up to 50) includes the number (for example, 50).

As used herein, the recitations of numerical ranges by endpoints include all numbers subsumed within that range as well as the endpoints (for example, 1 to 5 includes 1, 1.5, 2, 2.75, 3, 3.80, 4, 5, etc.).

The terms "in the range," "ranging from," and "within a range" (and similar statements) includes the endpoints of the stated range.

Groupings of alternative elements or embodiments disclosed herein are not to be construed as limitations. Each group member may be referred to and claimed individually or in any combination with other members of the group or other elements found therein. It is anticipated that at least one member of a group may be included in, or deleted from, a group for reasons of convenience and/or patentability. When any such inclusion or deletion occurs, the specification is herein deemed to contain the group as modified thus fulfilling the written description of all Markush groups used in the appended claims.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in at least one embodiment.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

DETAILED DESCRIPTION

Figure 1:
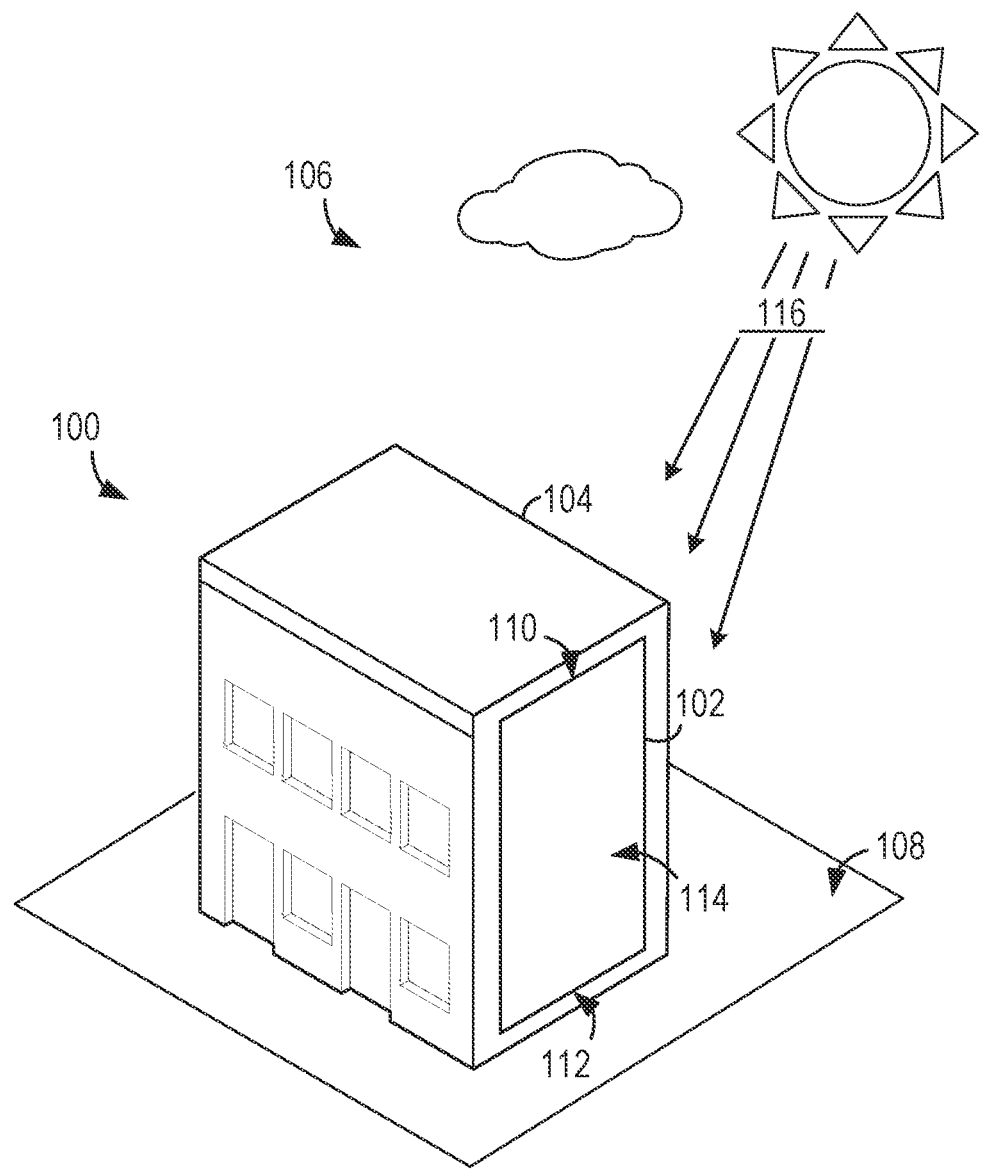
FIG. 1 is a schematic illustration of one example application of a passive cooling apparatus, which may also be described as being part of a passive cooling system, according to the present disclosure.

The present disclosure provides passive cooling using multi-surface passive cooling articles. In particular, the present disclosure relates to passive cooling articles having high emissivity elements at least partially defining first element surfaces and low emissivity elements at least partially defining second element surfaces facing a different direction than the first surfaces, wherein the high emissivity elements and the low emissivity elements form a surface of a major structure. In some applications, the major structure is applicable to a vertical surface of a substrate (such as a building or a vehicle) with the high emissivity elements facing, or oriented, upward toward the sky and the low emissivity elements facing, or oriented, downward toward the ground or at least "shaded" by the high emissivity elements. The structure may be described as a "cool wall" surfacing material. The high emissivity elements may form a high emissivity solar mirror. The low emissivity elements may form a low emissivity infrared (IR) mirror with an optional visual graphic. The element surfaces may include macrostructures, microstructures, or even nanostructures to facilitate various properties.

The passive cooling article may include one or more layers of material to provide reflectance in the solar region and absorption in the atmospheric window region, particularly the high emissivity elements. Reflectance in the solar region may be particularly effective in facilitating cooling during the day when subjected to sunlight by reflecting sunlight that would otherwise be absorbed by the object.

Absorption in the atmospheric window region may be particularly effective in facilitating cooling at night by radiating or emitting infrared light. Energy may also be radiated or emitted during the day to some degree. In general, the high emissivity element may be configured to absorb a minimum of solar energy from 0.4 to 2.5 micrometers and radiate a maximum of energy from 8 to 13 micrometers (for example, by maximizing absorbance and thus emissivity), especially when cooling a substrate to a temperature below air temperature. In some embodiments, when cooling a substrate to a temperature above, or equal to, air temperature, the high emissivity element may be configured to absorb a minimum of solar energy from 0.4 to 2.5 micrometers and radiate a maximum of energy from 4 to 20 micrometers.

In some embodiments, the passive cooling article may be described as, or include, a composite cooling film and exhibits relatively broadband absorption (and thus emission). The use of a cooling film that exhibits broadband emission may advantageously enhance the ability of cooling film to passively cool an entity that, in normal operation, is often at a temperature above (in some embodiments, significantly above), the ambient temperature of the surrounding environment. Such entities may include, for example, a heat-rejecting unit (such as a heat exchanger, condenser, or compressor, and any associated items) of a cooling, refrigeration, or heat pump system. Such a heat-rejecting entity may be, for example, an external (or outdoor) unit of a residential cooling or a heating ventilation air conditioning (HVAC) system or of a commercial or large-scale cooling or HVAC system. In some cases, such a heat-rejecting entity may be an external unit of a commercial refrigeration or freezer system. In some embodiments, such an entity may be an external component of a cooling unit of a large refrigerated shipping container such as a truck trailer, rail car, or intermodal container. (Such large-scale refrigerated shipping containers and the like may be referred to as "reefers" in the trade.) In some embodiments, such an entity may be a high-voltage transformer, or a high-powered broadcast antenna (such as used in mass-element or beam-forming systems for 5G wireless communication).

The passive cooling articles may be applied to a substrate, or object, to reflect light in a solar region of the electromagnetic spectrum and radiate light in an atmospheric window region of the electromagnetic spectrum, both of which may cool the substrate in particular using the high emissivity elements angled toward the sky. The low emissivity elements of the passive cooling articles may be angled toward the ground, which may be less exposed to solar energy than the high emissivity portions angled toward the sky, may reflect light or provide a visual graphic. In some embodiments, the passive cooling articles may be described as "cool wall" surfacing materials having high emissivity solar mirrors, generally angled facing up toward the sky when applied to a surface, and low emissivity mirrors or graphics (such as commercial graphics), generally angled facing down toward the ground when applied to the surface. The mirrors may have specular reflectivity or diffuse reflectivity. The surfaces of the high emissivity solar mirror and the low emissivity mirror may form an angle relative to one another and be described as opposing mirror surfaces. The opposing mirror surfaces may be additionally textured, for example, to provide drag reduction or antisoiling properties.

Significant amounts of energy can be absorbed by objects exposed to sunlight. Advantageously, the present disclosure provides a passive cooling article that can address cooling needs in a passive manner, during the day and night. For example, the passing cooling articles may be used to cool the walls of buildings or transportation vehicles including the sides of semi-truck trailers. Passive cooling may reduce the overall energy required to maintain a suitable temperature, which may significantly reduce operational costs and reduce greenhouse gas emissions, especially in vehicular applications where fossil fuels may be used to provide air conditioning or refrigeration. Further, passive cooling may reduce the overall demand for water, for example, in cooling towers and spray ponds that evaporate water for cooling, which may be particularly beneficial in areas lacking abundant access to water.

Although reference is made herein to certain applications, such as buildings and vehicles, the passive cooling articles may be used in any outdoor environment to cool a structure, particularly on generally vertical surfaces of structures exposed to sunlight. Non-limiting examples of applications of the passive cooling article include commercial building air conditioning, commercial refrigeration (for example, supermarket refrigerators), data center cooling, heat transfer fluid systems, power generator cooling, vehicle air conditioning or refrigeration (for example, cars, trucks, trains, buses, ships, airplanes, etc.), electrical transformers, or communication antennas. In particular, the passive cooling articles may be applied to the generally vertical sides of refrigerated semi-truck trailers or buses, which may facilitate cooling. In particular, the passive cooling article cools a fluid (which may be a liquid or gas) which is then used to remove heat from a cooling system (such as refrigeration or air conditioning) via a heat exchanger. Various other applications will become apparent to one of skill in the art having the benefit of the present disclosure.

Reference will now be made to the drawings, which depict at least one feature described in this disclosure. However, it will be understood that other features not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar.

FIG. 1 is a schematic illustration of one example application of a passive cooling apparatus 100, which may also be described as being part of a passive cooling system in some cases. The passive cooling apparatus 100 may include a passive cooling article 102 coupled to a surface of a substrate 104, which is illustrated as a stationary building. In general, the article 102 may be disposed or applied to an exterior surface of the substrate 104, particularly an exterior surface exposed to light 116 from the sun (for example, an outer wall or side surface). In some embodiments, the article 102 may be thermally coupled to the substrate 104, which may allow for heat transfer therebetween. The article 102 may be suitable for outdoor environments and have, for example, a suitable operating temperature range, water resistance, dirt resistance, and ultraviolet (UV) stability.

The article 102 may be used to cover part or all of the substrate 104. The article 102 may be generally planar in shape. The article 102, however, does not need to be planar and may be flexible to conform to the substrate 104.

The article 102 may reflect the light 116 in the solar region of the electromagnetic spectrum to cool the substrate 104, which may be particularly effective in a daytime environment. Without the article 102, the light 116 may have otherwise been absorbed by the substrate 104 and converted into heat. Reflected light 116 may be directed into the atmosphere through the sky 106.

The article 102 may radiate light in the atmospheric window region of the electromagnetic spectrum into atmosphere through the sky 106 to cool the substrate 104, which may be particularly effective in a nighttime environment. The article 102 may allow heat to be converted into light 116 (for example, infrared light) capable of partially transmitting through the sky 106 through the atmospheric window region. The radiation of light 116 may be a property of the article 102 that does not require additional energy and may be described as passive radiation, which may cool the article and the substrate 104, when thermally coupled to the article 102. During the day, the reflective properties allow the article 102 to emit more energy than is absorbed. The radiative properties in combination with the reflective properties, to reflect sunlight during the day, the article 102 may provide more cooling than an article that only radiates energy through the atmosphere and into space.

Among other parameters, the amount of cooling and temperature reduction may depend on the reflective and absorptive properties of the article 102. The cooling effect of the article 102 may be described with reference to a first temperature of the ambient air proximate or adjacent to the substrate and a second temperature of the portion of the substrate 104 proximate or adjacent to the article 102. In some embodiments, the first temperature is greater than the second temperature by at least 2.7 (in some embodiments, at least 5.5, 8.3, or even at least 11.1) degrees Celsius (for example, at least 5, 10, 15, or even at least 20 degrees Fahrenheit).

As shown in the illustrated embodiment, the article 102 may be applied to a generally vertical surface of the substrate 104. An outer major surface 114 may be defined by the article 102 opposite to an inner major surface (not shown) positioned closer to the substrate 104. In some embodiments, the inner major surface of the article 102 may be coupled to the substrate 104. For example, the inner major surface of the article 102 may be bonded or adhered to the substrate 104.

The article 102 may define a first end region 110 and a second end region 112. The first end region 110 and the second end region 112 may be proximate, or adjacent to, on opposite ends of the article 102. In some embodiments, the article 102, when applied, may be oriented such that the first end region 110 is closer to the sky 106 than the second end region 112 and the second end region 112 is closer to the ground 108 (or ground surface) than the first end region 110.

In general, the article 102 may be oriented such that energy in the solar region incident on the outer major surface 114 from the sky 106 is generally reflected and so that energy in the atmospheric window region is emitted toward the sky 106. The article 102 may also be oriented such that energy in the atmospheric window region is not absorbed from the direction of the ground 108 (for example, energy emitting from the ground or objects on the ground radiating heat in the mid-infrared wavelengths). In some embodiments, the article 102 may also be used to display a visual graphic viewable from the ground 108.

Figure 2:
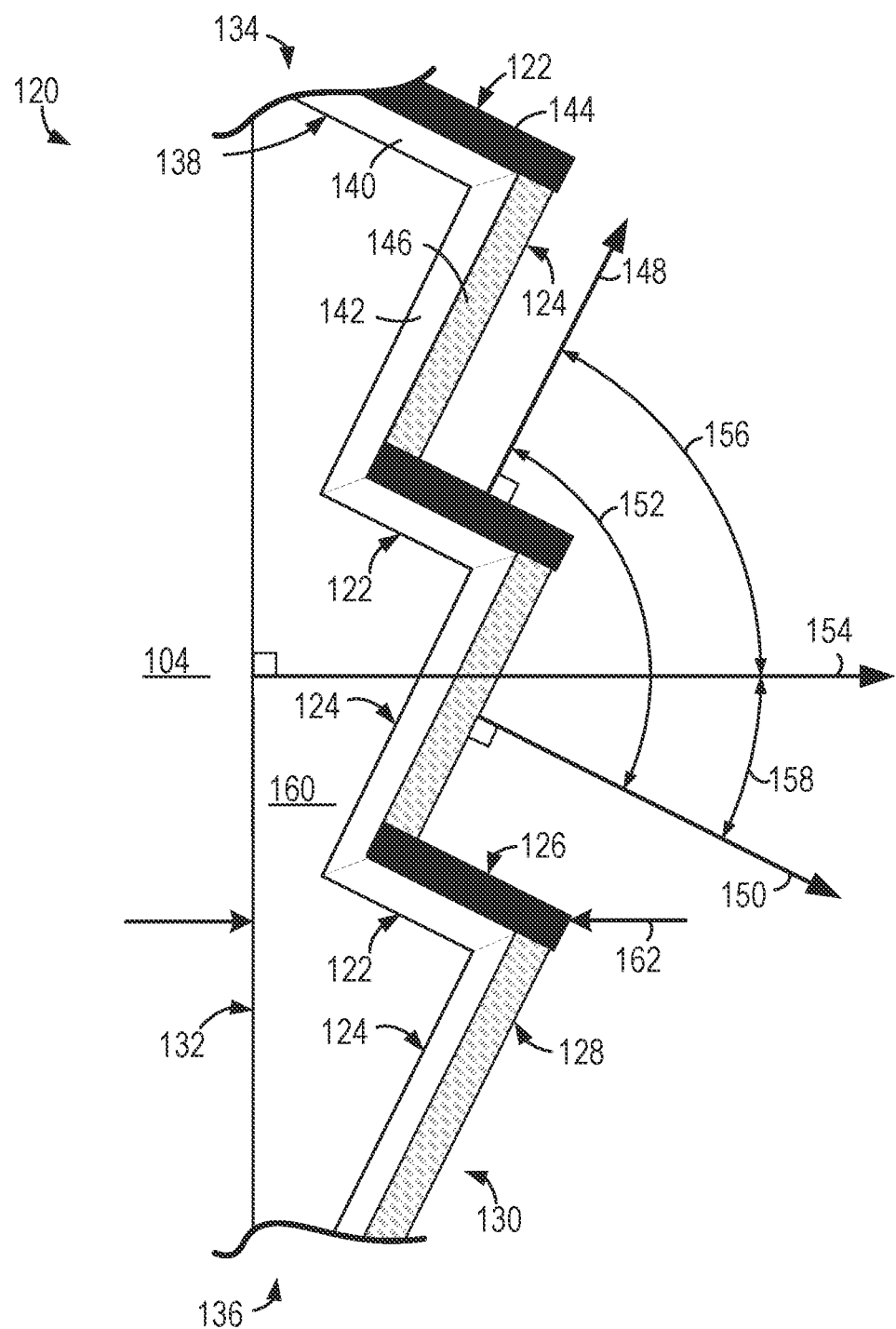
FIG. 2 is a schematic cross-sectional illustration of one example of a passive cooling article usable with the passive cooling apparatus or system of FIG. 1.

FIG. 2 is a schematic cross-sectional illustration of one example of a passive cooling article 120 usable as the passive cooling article 102 (FIG. 1). The article 120 is couplable to an outer surface of the substrate 104. The illustrated view shows a cross-section the article 120 along a plane orthogonal to the outer surface of at least a portion of the substrate 104.

As illustrated, the article 120 includes a plurality of first elements 122 defining first element outer surfaces 126 and a plurality of second elements 124 defining second element outer surfaces 128. Each first element 122 may define one first element outer surface 126. Each second element 124 may define one second element outer surface 128.

In general, each first element 122 may be disposed proximate, or adjacent, to one of the second elements 124, and vice versa. The plurality of first elements 122 and the plurality of second elements 124 may be interspersed to form a first major surface 130 of a major structure (which may be generally formed as a sheet with an uneven major surface). The first major surface 130 (usable as the outer major surface 114 of FIG. 1) includes the first element outer surfaces 126 and the second element outer surfaces 128. The first major surface 130 may be formed continuously by the first elements 122 and the second elements 124. A second major surface 132 (usable as the inner major surface of the article 102 of FIG. 1) may be defined opposing the first major surface 130. In particular, the second major surface 132 may be on the opposite side of the article 120 than the first major surface 130.

The article 120 may include a backing layer 160 couplable to the substrate 104. The backing layer 160 may be defined as being coupled to the second major surface 132 at least partially (or entirely) formed by the plurality of first and second elements 122, 124 or may be defined as at least partially (or entirely) forming the second major surface 132.

The article 120 may define a first end region 134 and a second end region 136. The first element outer surfaces 126 may face a first direction toward the first end region 134. The second element surfaces may face a second direction toward the second end region 136. When applied to the substrate 104, the article 120 may be oriented such that the first end region 134 is closer to the sky 106 (FIG. 1) and the second end region 136 is closer to the ground 108 (FIG. 1). The first element outer surfaces 126 may be described as sky-facing surfaces. The second element outer surfaces 128 may be described as ground-facing surfaces.

The plurality of first elements 122 and the plurality of second elements 124 may be formed in any suitable shape to provide the first element outer surfaces 126 and the second element outer surfaces 128 in the proper orientation. For example, any of the shapes described with respect to FIGS. 6-18 may be used to form the shape of one or more of the elements 122, 124.

In some embodiments, at least some (or all) of the elements 122, 124 are formed as continuous surface structures. As used herein, the term "continuous surface structures" refers to surface structures that extend fully across the first major surface 130 in at least one direction, such as a vertical or horizontal direction. In one or more embodiments, at least some (or all) of the elements 122, 124 are formed as, or arranged as, alternating rows of elongate elements. In one example, each element 122, 124 may extend horizontally from a first side of the article 120 to a second side of the article 120 opposite to the first side, for example, along a horizontal direction orthogonal to a vertical direction, which is defined as being aligned to a direction between the first end region 134 to the second end region 136. Multiple elements 122, 124 may be interspersed vertically, for example, in a linear array. Any suitable shape may be used to form the elements 122, 124 as alternating rows or elongate elements, for example, similar to those shown in FIGS. 11A-15). In particular, a first element 122 may be used to form part of each structure shown in FIGS. 11A-15 (for example, a portion closer to the first end region 134) and a second element 124 may be used to form the other part of each structure (for example, a portion closer to the second end region 136).

In some embodiments, such as the illustrated embodiment, the article 120 may be described as plurality of first elements 122 and the plurality of second elements 124 separated by multiple parallel ridges. In some embodiments, the articles 120 may be described as having multiple parallel ridges each having first and second opposing ridge faces, corresponding to the first elements 122 and the second elements 124, respectively.

In some embodiments, at least some (or all) of the first elements 122, 124 are formed as discrete surface structures. As used herein, the term "discrete surface structures" refers to surface structures that do not extend fully across the first major surface 130 in a vertical or horizontal direction. In some embodiments, the elements 122, 124 may be interspersed both vertically and horizontally (for example, in a two-dimensional array). Any suitable shape may be used to form the elements 122, 124 as discrete surface structures, for example, similar to the shapes shown in FIGS. 6-10 and 16-18. In some embodiments, the discrete surface structures may have any suitable three-dimensional shape, such as a hemisphere, a half ovoid, a half-prolate spheroid, a half-oblate spheroid, or a pyramid-like shape. In some embodiments, the discrete surface structures define surfaces 126, 128 (for example, when viewed perpendicular to the first major surface 130) shaped as rectangles, squares, circles, ovals, triangles, or other suitable geometric shapes.

In general, the cross-sectional profiles of one or more elements 122, 124 may have a cross-sectional profile shape (for example, viewed in the horizontal direction or a direction parallel to a major surface 130, 132), for example, generally like or similar to a quarter circle, quarter oval, triangle, square, rectangle, multiples or combinations thereof, or another suitable geometric shape that provides the first major surface 130. The cross-sections of the elements 122, 124 may be the same or similar. In one example, the cross-sections of one first element 122 and one adjacent second element 124 may each be generally formed as one or more rectangular shapes (see FIG. 2), which meet at an angle to form the first major surface 130. In another example, the cross-sections of one first element 122 and one adjacent second element 124 may each be generally formed as quarter circles (see FIG. 3), which may meet to form a half circle. The cross-sections of the elements 122, 124 may also be different. In a further example, the cross-section of one first element 122 may be formed as a right triangle and the cross-section of one adjacent second element 124 may be formed as a quarter circle, which together may form a triangle-like shape having one curved side.

In some embodiments, at least some of the first element outer surfaces 126 or second element outer surfaces 128 define generally planar surfaces (see FIG. 2). In some embodiments, at least some of the first element outer surfaces 126 or second element outer surfaces 128 define curved surfaces (see FIG. 3).

In some embodiments, as illustrated, the supporting layer 138 may define a surface profile (for example, the surface facing the elements 122, 124) that has the same contours of the first major surface 130, for example, in at least one cross-sectional view. In some embodiments, at least some of the plurality of first elements 122 or second elements 124 define generally planar element outer surfaces 126, 128 applied to the contoured surface of the supporting layer 138, which at least partially (or entirely) defines the angle between the element outer surfaces 126, 128.

One or more angles may be used to define the relative orientation of the first element outer surfaces 126 and the second element outer surfaces 128 relative to one another. In some embodiments, normal vectors may be used to facilitate defining such angles. Normal vectors may be defined normal (or orthogonal or perpendicular) to a particular surface. As used herein, the term "normal" when referring to vectors refers to being normal to at least a portion of a particular surface or normal to an average tangent to the particular surface.

In some embodiments, first vectors 148 are defined normal to the first element outer surfaces 126. Second vectors 150 may be defined normal to the second element surfaces 128. At least one of the first vectors 148 and at least one of the second vectors 150 may define an interelement angle 152 therebetween. In some embodiments, the interelement angle 152 is greater than or equal to 15 degrees and less than or equal to 165 degrees (in some embodiments, greater than or equal to 45, 60, 90, or even 120 degrees or less than or equal to 135, 120, 90, or even 60 degrees).

The first vectors 148 of the first element outer surfaces 126 may also be defined relative to a major surface vector 154. In some embodiments, the major surface vector 154 may be defined normal to the second major surface 132 of the article 120. At least one of the first vectors 148 and the major surface vector 154 may define a first element angle 156 therebetween. In some embodiments, the first element angle 156 is greater than or equal to 15 degrees (or greater than or equal to 45, 60, or even 75 degrees) and less than or equal to 75 degrees (or less than or equal to 65 or even 50 degrees).

The second vectors 150 of the element outer surfaces 128 may also be defined relative to the major surface vector 154. At least one of the second vectors 150 and the major surface vector 154 may define a second element angle 158 therebetween. In some embodiments, the second element angle 158 is greater than or equal to 15 degrees (or greater than or equal to 30 or even 45 degrees) and less than or equal to 75 degrees (or less than or equal to 45 or even 30 degrees).

The article 120 may be used in various applications. In general, the first element outer surfaces 126 may be angled toward the sky 106 such that the first element outer surfaces 126 are generally not visible from the ground, especially when the article 120 is viewed from a distance or when the article 120 is sufficiently elevated above the ground 108. In some embodiments, at least a portion of the first major surface 130 of the article 120 may be used to display a visual graphic (such as a commercial graphic) on a generally vertical surface of the substrate 104. In particular, the second element outer surfaces 128 may together define the visual graphic, which may include text or an image. The visual graphic displayed on at least some of the second element outer surfaces 128 may be angled toward the ground 108 for suitable viewing from the ground. In other embodiments, at least some of the first major surface 130 of the article 120 may be used to provide a mirror (diffuse or specular) facing the ground 108. The mirror may be formed by at least some of the second element outer surfaces 128 angled toward the ground 108. The mirror may reduce the absorbance of energy emitted from or reflected by the ground 108 or other objects generally below the article 120. Such energy may include energy in the mid-infrared region or at least energy in the atmospheric window region.

One or more of the angles 152, 156, 158 may be selected, or optimized, depending on the particular application. In one example, when the article 120 is used to display a visual graphic visible to the ground 108, the second element angle 158 may be selected to be less than the first element angle 156.

The first element angle 156 may be greater than or equal to 45 degrees and less than or equal to 90 degrees. The second element angle 158 may be greater than or equal to 10 degrees and less than or equal to 45 degrees. In another example, when the article 120 is used to provide a mirror toward the ground 108, the first element angle 156 and the second element angle 158 may be generally equal. The first element angle 156 and the second element angle 158 may be within 20 degrees (or 15, 10, or even 5 degrees) of one another.

Any suitable dimensions of the article 120 may be used depending on the particular application. For example, the article 120 may define a thickness 162 along the major surface vector 154 between the first major surface 130 and the second major surface 132. As used herein, the thickness 162 is defined as the greatest thickness between the first and second major surfaces 130, 132. In some embodiments, the thickness 162 may be greater than or equal to 1 micrometer or less than or equal to 100 centimeters.

In addition, the relative sizes of the plurality of first elements 122 and the plurality of second elements 124 may be selected, or optimized, depending on the particular application. In one example, when the article 120 is used to display the visual graphic, a total surface area of the first element outer surfaces 126 may be less than a total surface area of the second element outer surfaces 128 (in some embodiments, less than or equal to 80, 70, 60, 50, 40, 30, or even 20 percent of the total area of the second element outer surfaces 128). In another example, when the article 120 is used to provide a mirror toward the ground 108, the total surface area of the first element outer surfaces 126 may be generally equal to the total surface area of the second element outer surfaces 128. For example, the total area of the first element outer surfaces 126 may be equal to 80 to 120% (in some embodiments, 90 to 110%, 95 to 105%, or even 99 to 101%) of the total surface area of the second element outer surfaces 128.

In general, the plurality of first elements 122 may be described as high emissivity elements, which have high absorbance in the atmospheric window region. As used herein, the term "high absorbance" refers to an absorbance greater than or equal to 0.6 (in some embodiments, greater than or equal to 0.7, 0.8, 0.9, 1, 1.5, 2, 2.5, 3, 3.5, 4, 4.5, or even 5). In some embodiments, the plurality of first elements 122 may further define a low absorbance in the near-infrared region and a high absorbance the mid-infrared region, for example, from 4 to 20 micrometers.

Also, in general, the plurality of second elements 124 may be described as low emissivity elements, which have low absorbance in the atmospheric window region. The plurality of second elements 124 may define a low absorbance, especially in the atmospheric window region. As used herein, the term "low absorbance" refers to an absorbance less than or equal to 0.5 (in some embodiments, less than or equal to 0.4, 0.3, 0.2, or even 0.1).

The plurality of first elements 122 may also define a high average reflectance, especially in the solar region. The plurality of second elements 124 may also define a high average reflectance, especially in the solar region. As used herein, the term "high reflectance" refers to a reflectance greater than or equal to 60% (in some embodiments, greater than or equal to 70, 80, 85, 90, 91, 92, 93, 94, 95, 96, 97, 98, 99, or even 99.5%). Accordingly, the term "high average reflectance" refers to an average reflectance across a particular wavelength band being greater than or equal to 60% (in some embodiments, greater than or equal to 70, 80, 85, 90, 91, 92, 93, 94, 95, 96, 97, 98, 99, or even 99.5%).

One or more portions of the elements 122, 124 may contribute to the absorbance or reflectance properties of the respective elements. In some embodiments, the article 120 includes a supporting layer 138, which includes first supporting layers 140 and second supporting layers 142. The first supporting layers 140 and the second supporting layers 142 may be defined as different portions of the supporting layer 138. The supporting layer 138 may be formed as one integral piece or material or a plurality of pieces of separate pieces of material. Each supporting layer 138, 140, 142 may include one or more layers.

At least some of the plurality of first elements 122 may be defined to include the first supporting layers 140. At least some of the plurality of first elements 122 may be defined to include first outer layers 144 to at least partially (or entirely) cover corresponding first supporting layers 140. The first outer layers 144 may at least partially (or entirely) define the first element outer surfaces 126. At least some of the plurality of second elements 124 may be defined to include the second supporting layers 142. At least some of the plurality of second elements 124 may be defined to include second outer layers 146 to at least partially (or entirely) cover corresponding second supporting layers 142. The second outer layers 146 may at least partially (or entirely)

define the second element outer surfaces 128. Each outer layer 144, 146 may include one or more layers.

In some embodiments, each first element 122 is defined to include one first supporting layer 140 and one corresponding first outer layer 144. In some embodiments, each second element 124 is defined to include one second supporting layer 142 and one corresponding second outer layer 146.

In some embodiments, the first outer layers 144 at least partially (or entirely) define the high absorbance in the atmospheric window region and the high average reflectance in the solar region of the first elements 122. In some embodiments, the second outer layers 146 at least partially (or entirely) define the low absorbance in the atmospheric window region and the high average reflectance in the solar region of the second elements 122. The corresponding supporting layers 140, 142 may or may not contribute to the absorbance or reflectance of the respective elements 122, 124. In some embodiments, the corresponding supporting layers 140, 142 may at least partially (or entirely) define the absorbance of the elements 122, 124 (for example, when the corresponding outer layers 144, 146 transmit at least some of the energy in the atmospheric window region).

In some embodiments, at least some of the first or second supporting layers 140, 142 define reflectors that at least partially (or entirely) define the reflectance properties of the elements 122, 124. When both supporting layers 140, 142 define reflectors, the supporting layer 138 may be described as a reflector layer. The reflectors may be diffuse or specular. When the supporting layer 138 is formed of an integral piece of material, the plurality of first elements 122 and the plurality of second elements 124 may define the same average reflectance. The integral piece of material may be formed, for example, by bending or thermoforming, to provide a support for the first element outer surfaces 126 facing a different direction than the second element outer surfaces 128.

In general, the supporting layers 140, 142 may at least partially (or entirely) define the respective high average reflectances in the solar region for the first and second elements 122, 124. In some embodiments, the first supporting layers 140 at least partially (or entirely) define the high average reflectance in the solar region, which may be described as first reflectors, and the first outer layers 144 at least partially (or entirely) define the high absorbance in the atmospheric window region. In some embodiments, the second supporting layers 142 at least partially (or entirely) define the high average reflectance in the solar region, and may be described as second reflectors, and the second outer layers 146 at least partially (or entirely) define the low absorbance in the atmospheric window region.

Various suitable materials and structures may be used to at least partially (or entirely) form at least some (or all) the first elements 122. Non-limiting examples of materials and structures that may be used to form the first elements 122 include: a dense fluoropolymer layer, a microporous (or micro-voided) fluoropolymer layer, a dense polyester layer at least partially (or entirely) covered by a dense fluoropolymer layer, a microporous (or micro-voided) polyester layer at least partially (or entirely) covered by a dense fluoropolymer layer, a multilayer optical film at least partially (or entirely) defining a high average reflectance in the solar wavelength range, and a metal layer at least partially (or entirely) defining a high average reflectance in the solar wavelength range.

In some embodiments, at least some (or all) of the plurality of first elements 122 may include inorganic particles at least partially (or entirely) defining a high average reflectance in the solar region. In particular, the inorganic particles may be, or include, white inorganic particles.

Figure 5:
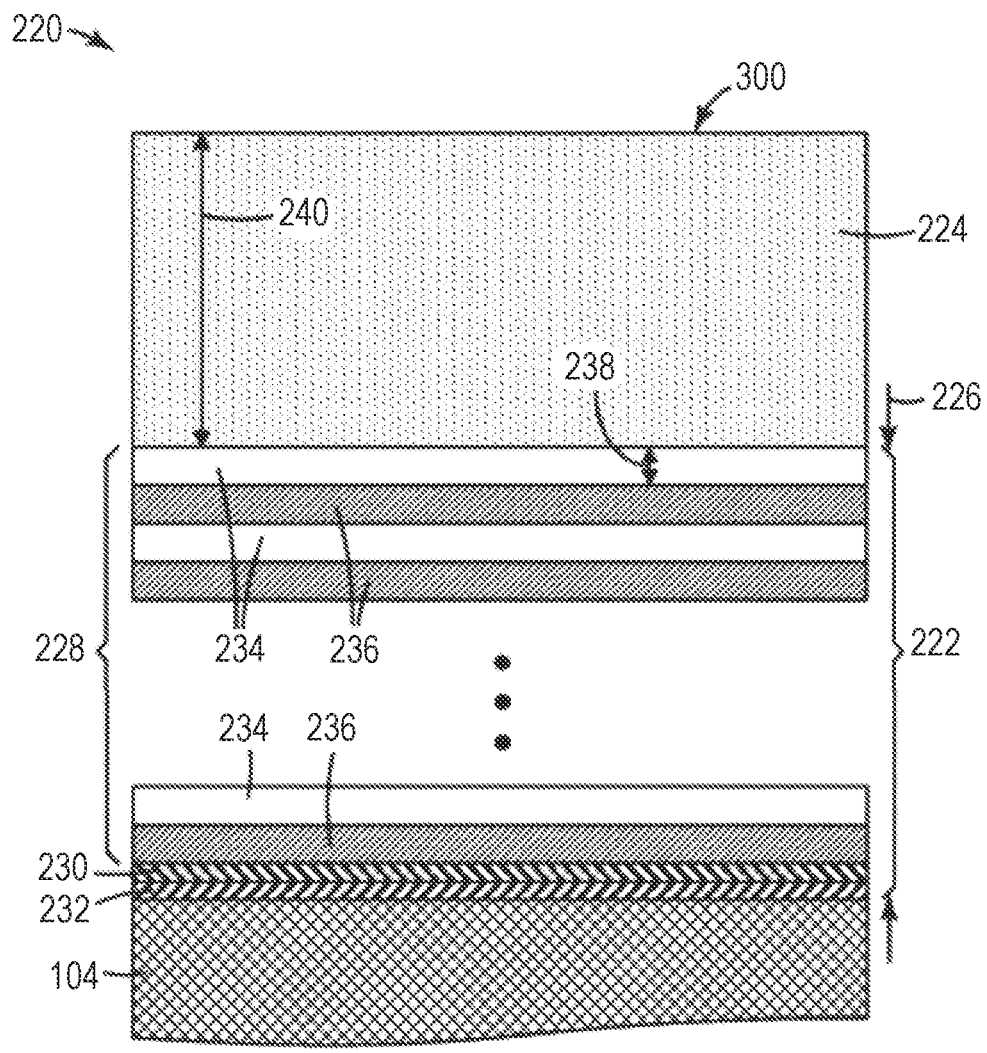
FIG. 5 is a schematic illustration of one example of a high emissivity element that includes a multilayer optical film usable with the passive cooling apparatus or system of FIG. 1.

Various types of inorganic particles, fluoropolymers, microporous (or micro-voided) polymer layers, multilayer optical films (such as solar mirror films), and metal layers are described further herein. In particular, at least one example of a multilayer optical film is shown in FIG. 5.

Various suitable materials and structures may be used to at least partially (or entirely) form at least some (or all) of the second elements 124. Non-limiting examples of materials and structures that may be used to form the second elements 124 include: a dense polyethylene layer, a dense polyethylene copolymer layer, a microporous (or micro-voided) polyethylene layer, a microporous (or micro-voided) polyethylene copolymer layer, a fluoropolymer layer defining a thickness less than or equal to 10 micrometers, a coating including metal, an infrared mirror film at least partially (or entirely) defining a low absorbance in the atmospheric window wavelength range, a graphic layer at least partially (or entirely) defining a low absorbance in the atmospheric window wavelength range, a graphic layer at least partially (or entirely) covered by an infrared mirror film at least partially (or entirely) defining a low absorbance in the atmospheric window wavelength range, and a metal layer at least partially (or entirely) defining a high average reflectance in the solar wavelength range.

Various types of polyethylene copolymers, coatings including metal, infrared mirror films (such as low emissivity infrared mirror films), and graphic layers are described further herein.

Various suitable materials and structures may be used to at least partially (or entirely) form at least some (or all) first outer layers 144 of the plurality of first elements 122. Non-limiting examples of materials and structures that may be used to form the first outer layers 144 include: a dense fluoropolymer layer, a microporous (or micro-voided) fluoropolymer layer, a dense polyester layer at least partially (or entirely) covered by a dense fluoropolymer layer, a microporous (or micro-voided) polyester layer at least partially (or entirely) covered by a dense fluoropolymer layer, and a multilayer optical film at least partially (or entirely) defining a high average reflectance in the solar wavelength range.

Various suitable materials and structures may be used to at least partially (or entirely) form at least some (or all) of the second outer layers 146. Non-limiting examples of materials and structures that may be used to form the second outer layers 146 include: a dense polyethylene layer, a dense polyethylene copolymer layer, a microporous (or micro-voided) polyethylene layer, a microporous (or micro-voided) polyethylene copolymer layer, a fluoropolymer layer defining a thickness less than or equal to 10 micrometers, a coating including metal, an infrared mirror film at least partially (or entirely) defining a low absorbance in the atmospheric window wavelength range, a graphic layer at least partially (or entirely) defining a low absorbance in the atmospheric window wavelength range, and a graphic layer at least partially (or entirely) covered by an infrared mirror film at least partially (or entirely) defining a low absorbance in the atmospheric window wavelength range.

Various suitable materials and structures may be used to at least partially (or entirely) form at least some (or all) of the supporting layer 138, first supporting layers 140, or second supporting layers 142. Non-limiting examples of materials and structures that may be used to form the supporting layer 138, first supporting layers 140, or second supporting layers 142 include: a metal layer and a polymer layer. Non-limiting examples of materials and structures that may be used to form the polymer layer include: a dense polymer layer, a microporous (or micro-voided) polymer layer that may at least partially (or entirely) define a high average reflectance in the solar wavelength range, a multi-layer optical film at least partially (or entirely) defining a high average reflectance in the solar wavelength range, and a graphic layer.

Various suitable materials and structures may be used to at least partially (or entirely) define the high absorbance in the atmospheric window region for the plurality of first elements 122. Non-limiting examples of materials and structures that may be used to at least partially (or entirely) define the high absorbance in the atmospheric window region include: a dense fluoropolymer layer, a microporous (or micro-voided) fluoropolymer layer, a dense polyester layer at least partially (or entirely) covered by a dense fluoropolymer layer, a microporous (or micro-voided) polyester layer at least partially (or entirely) covered by a dense fluoropolymer layer, and a multilayer optical film.

In some embodiments, at least some (or all) of the first elements 122 may include various structures, which may contribute to the high absorbance in the atmospheric window region. In some embodiments, inorganic particles may be provided as surface or embedded structures on or in material of the plurality of first elements 122, such as embedded in any polymer layer (such as a dense polymer layer, a microporous (or micro-voided) polymer layer, or a multilayer optical film), to contribute to the high absorbance in the atmospheric window region. In some embodiments, the inorganic particles may be, or include, white inorganic particles, which may at least partially (or entirely) define a high average reflectance in the solar region. Any suitable white inorganic particles may be used known to one skilled in the art having the benefit of the present disclosure.

Inorganic particles may include barium sulfate, calcium carbonate, silica, alumina, aluminum silicate, zirconia, zinc oxide, or titania. The inorganic particles may be in the form of nanoparticles, such as nanotitania, nanosilica, nanozirconia, or even nano-scale zinc oxide particles. The inorganic particles may be in the form of beads or microbeads. The inorganic particles may be formed of a ceramic material, glass (such as in the form of glass beads or glass bubbles), or various combinations of thereof. In some embodiments, the inorganic particles have an effective $D_{90}$ particle size of greater than or equal to 0.1 micrometer (in some embodiments, at least 1, 2, 3, 5, 6, 7, 8, 9, 10, or even at least 13 micrometers). In some embodiments, the inorganic particles have an effective $D_{90}$ particle size of less than or equal to 50 micrometers (in some embodiments, less than or equal to 45, 40, 35, 30, 25, 20, 15, 14, 13, 12, 11, 10, 9, or even at most 8 micrometers).

As defined in NIST "Particle Size Characterization," ASTM E-2578-07 (2012) describes $D_{90}$ as the intercept where 90% of the samples mass has particles with a diameter less than the value. For example, a $D_{90}$ of 10 micrometers specifies that 90% of the samples mass includes particles with diameters less than 10 micrometers. Particle diameter may be measured with a particle size analyzer (for example, available under the trade designation "HORIBA PARTICLE SIZE ANALYZER" from Flow Sciences, Inc., Leland, N.C.).

Non-limiting examples of ceramic microspheres that may be used as inorganic particles ceramic microspheres available under the trade designations "3M CERAMIC MICROSPHERES WHITE GRADE W-210" (alkali aluminosilicate ceramic, effective $D_{90}$ particle size of 12 micrometers), "3M CERAMIC MICROSPHERES WHITE GRADE W-410" (alkali aluminosilicate ceramic, effective $D_{90}$ particle size of 21 micrometers), "3M CERAMIC MICROSPHERES WHITE GRADE W-610" (alkali aluminosilicate ceramic, effective $D_{90}$ particle size of 32 micrometers), from 3M Company, or various combinations thereof. In general, various combinations of inorganic particles of the same or different size may be used.

Various suitable materials and structures may be used to at least partially (or entirely) define the low absorbance in the atmospheric window region for the plurality of second elements 124. Non-limiting examples of materials and structures that may be used to at least partially (or entirely) define the low absorbance in the atmospheric window region include: a dense polyethylene layer, a dense polyethylene copolymer layer, a microporous (or micro-voided) polyethylene layer, a microporous (or micro-voided) polyethylene copolymer layer, a fluoropolymer layer defining a thickness less than or equal to 10 micrometers, a coating including metal, an infrared mirror film at least partially (or entirely) defining a low absorbance in the atmospheric window wavelength range, a graphic layer, and a graphic layer at least partially (or entirely) covered by an infrared mirror film.

Various suitable materials and structures may be used to at least partially (or entirely) define the high average reflectance in the solar region for the plurality of first elements 122 or second elements 124. Non-limiting examples of materials and structures that may be used to at least partially (or entirely) define the high average reflectance in the solar region include: a metal layer at least partially (or entirely) defining a high average reflectance in the solar wavelength range, a microporous (or micro-voided) polymer layer, and a multilayer optical film. In some embodiments, one or more of the structures also include white inorganic particles, such as any polymer layer or multilayer optical film, that at least partially (or entirely) define a high average reflectance in the solar region.

The first major surface 130 may be described as a textured surface. Some textures (for example, depending on the dimensions of the various surface structures relative to the wavelength of electromagnetic radiation) may enhance the passive cooling effects achieved by the article 120 as a whole. While one purpose of texturing the first major surface 130 to include surface structures may be to provide radiative cooling, texturing may also provide additional benefits, such as drag resistance or antisoiling. Various types of surface structures may include surface microstructures or surface nanostructures, which may be discrete or continuous.

In some embodiments, at least some of the plurality of first elements 122 or second elements 124 may define various anti-drag surface structures to provide a reduction in drag resistance. In some embodiments, the article 120 may be applied to the surface of a vehicle. The texturing may achieve drag reduction, for example, when the vehicle moves through the air. The presence of surface microstructures or nanostructures may result in a lowered coefficient of friction between the surface and the air through which the vehicle is moving, which can result in cost or fuel savings. Any suitable shape may be used to form the anti-drag surface structures, for example, similar to the shapes shown in FIGS. 6-10 and 16-18.

In some embodiments, at least some of the plurality of first elements 122 or second elements 124 may define various antisoiling surface structures, which may contribute to dirt resistance and antisoiling properties. In some embodiments, antisoiling surface structures may be defined in, or on, at least some of the first outer surfaces 126 or the second outer surfaces 128 to contribute to dirt resistance or antisoiling properties. In particular, in some embodiments, at least the first outer surfaces 126, which may be more susceptible to dirt and soiling than the second outer surfaces 128, may include antisoiling surface structures. Non-limiting examples of antisoiling surface structures for dirt resistance and antisoiling properties are shown in FIGS. 11A-18.

Any suitable fluoropolymer material may be used in the article 120. Non-limiting examples of fluoropolymers that may be used include: a polymer of tetrafluoroethylene (TFE), hexafluoropropylene (HFP), and vinylidene fluoride (for example, available under the trade designation "3M DYNEON THV" from 3M Company), a polymer of TFE, HFP, vinylidene fluoride, and perfluoropropyl vinyl ether (PPVE) (for example, available under the trade designation "3M DYNEON THVP" from 3M Company), a polyvinylidene fluoride (PVDF) (for example, "3M DYNEON PVDF 6008" available from 3M Company), an ethylene chlorotrifluoroethylene (ECTFE) polymer (for example, available under the trade designation "HALAR 350LC ECTFE" from Solvay, Brussels, Belgium), an ethylene tetrafluoroethylene (ETFE) (for example, available under the trade designation "3M DYNEON ETFE 6235" from 3M Company), a perfluoroalkoxy alkane (PFA) polymer, a fluorinated ethylene propylene (FEP) polymer, a polytetrafluoroethylene (PTFE), a polymer of TFE, HFP, and ethylene (for example, available under the trade designation "3M DYNEON HTE1705" from 3M Company), or various combinations thereof In general, various combinations of fluoropolymers can be used. In some embodiments, the fluoropolymer includes FEP. In some embodiments, fluoropolymer includes PFA.

Examples of fluoropolymers include those available, for example, from 3M Company under the trade designations "3M DYNEON THV221GZ" (39 mol % tetrafluoroethylene, 11 mol % hexafluoropropylene, and 50 mol % vinylidene fluoride), "3M DYNEON THV2030GZ" (46.5 mol % tetrafluoroethylene, 16.5 mol % hexafluoropropylene, 35.5 mol % vinylidene fluoride, and 1.5 mol % perfluoropropyl vinyl ether), "3M DYNEON THV610GZ" (61 mol % tetrafluoroethylene, 10.5 mol % hexafluoropropylene, and 28.5 mol % vinylidene fluoride), and "3M DYNEON THV815GZ" (72.5 mol % tetrafluoroethylene, 7 mol % hexafluoropropylene, 19 mol % vinylidene fluoride, and 1.5 mol % perfluoropropyl vinyl ether). Examples of fluoropolymers also include PVDF available, for example, under the trade designations "3M DYNEON PVDF 6008" and "3M DYNEON PVDF 11010" from 3M Company; FEP available, for example, under the trade designation "3M DYNEON FLUOROPLASTIC FEP 6303Z" from 3M Company; and ECTFE available, for example, under the trade designation "HALAR 350LC ECTFE" from Solvay.

Any suitable microporous (or micro-voided) polymer layer (or film) may be used. In general, a microporous layer may include a network of interconnected voids or discrete voids, which may be spherical, oblate, or some other shape. The microporous layer may reflect at least a portion of visible and infrared radiation of the solar spectrum and may emit thermal radiation in the atmospheric window region and may be described as a reflective microporous layer. The reflective microporous layer may have voids that are of appropriate size that diffusely reflect wavelengths in the solar region (such as 0.4 to 2.5 micrometers). Generally, this means that the void sizes should be in a particular size range (such as 100 to 3000 nanometers). A range of void sizes corresponding to those dimensions may facilitate effective broadband reflection.

Reflectivity of the reflective microporous layer is generally a function of the number of polymer film-void interfaces, since reflection (typically diffuse reflection) occurs at those locations. The porosity and thickness of the reflective microporous layer may be selected accordingly. In general, higher porosity and higher thickness correlate with higher reflectivity. In some applications, film thickness may be minimal to reduce cost. The thickness of the reflective microporous layer may be in the range of 10 to 500 micrometers (or in the range of 10 to 200 micrometers). Likewise, the porosity of the reflective microporous layer may be in the range of 10 to 90 volume percent (or in the range of 20 to 85 volume percent).

Microporous polymer films that may be suitable for use as the reflective microporous layer are described, for example, in U.S. Pat. No. 8,962,214 (Smith et al.) entitled "Microporous PVDF Films", in U.S. Pat. No. 10,240,013 (Mrozinski et al.) entitled "Microporous Material from Ethylene-Chlorotrifluoroethylene Copolymer and Method for Making Same", and in U.S. Pat. No. 4,874,567 (Lopatin et al.) entitled "Microporous Membranes from Polypropylene," which are incorporated herein by reference. These films may have average pore diameters of at least 0.05 micrometers.

In certain embodiments, the reflective microporous layer includes at least one Thermally Induced Phase Separation (TIPS) material. The pore size of TIPS materials can be generally controlled due to the ability to select the extent of stretching of the layer. Various materials and methods for making TIPS materials are described in detail in U.S. Pat. No. 4,726,989 (Mrozinski), U.S. Pat. No. 5,238,623 (Mrozinski), U.S. Pat. No. 5,993,954 (Radovanovic et al.), and U.S. Pat. No. 6,632,850 (Hughes et al.).

Reflective microporous layers that may be used may also include Solvent Induced Phase Separated (SIPS) materials (such as described in U.S. Pat. No. 4,976,859 (Wechs)) and other reflective microporous layers made by extrusion, extrusion-stretching and extrusion-stretching-extraction processes. Suitable reflective microporous layers that may be formed by SIPS may include polyvinylidene fluoride (PVDF), polyether sulfone (PES), polysulfone (PS), polyacrylonitrile (PAN), nylon (i.e., polyamide), cellulose acetate, cellulose nitrate, regenerated cellulose, or polyimide. Suitable reflective microporous layers that may be formed by stretching techniques (such as described in U.S. Pat. No. 6,368,742 (Fisher et al.)) may include polytetrafluoroethylene (PTFE) or polypropylene.

In some embodiments, the reflective microporous layer includes a thermoplastic polymer, for instance polyethylene, polypropylene, 1-octene, styrene, polyolefin copolymer, polyamide, poly-1-butene, poly-4-methyl-l-pentene, polyethersulfone, ethylene tetrafluoroethylene, polyvinylidene fluoride, polysulfone, polyacrylonitrile, polyamide, cellulose acetate, cellulose nitrate, regenerated cellulose, polyvinyl chloride, polycarbonate, polyethylene terephthalate, polyimide, polytetrafluoroethylene, ethylene chlorotrifluoroethylene, or combinations thereof In some embodiments, materials suitable for use as the reflective microporous layer may include nonwoven fibrous layers. Nonwoven fibrous layers may be made using a melt blown or melt spinning process, which may include using: polyolefins such as polypropylene and polyethylene, polyester (such as polyethylene terephthalate (PET)), polybutylene terephthalate, polyamide, polyurethane, polybutene, polylactic acid, polyphenylene sulfide, polysulfone, liquid crystalline polymer, polyethylene-co-vinyl acetate, polyacrylonitrile, cyclic polyolefin, and copolymers and blends thereof In some embodiments, the polymer, copolymer, or blend thereof represents at least 35% of the overall weight of the directly formed fibers present in the nonwoven fibrous layer.

Nonwoven fibers can be made from a thermoplastic semi-crystalline polymer, such as a semi-crystalline polyester. Useful polyesters include aliphatic polyesters. Nonwoven materials based on aliphatic polyester fibers can be especially advantageous in resisting degradation or shrinkage at high temperature applications.

Some embodiments of microporous membrane fabricated with nonwoven fibers are highly reflective white papers including polysaccharides. Microporous polysaccharide white papers having greater than 90% reflectance over visible wavelengths of 400 to 700 nanometers are available from International Paper, Memphis, Tennessee, under the trade designations "IP ACCENT OPAQUE DIGITAL (100 lbs)", "IP ACCENT OPAQUE DIGITAL (100 lbs)", "HAMMERMILL PREMIUM COLOR COPY (80 lbs)", and "HAMMERMILL PREMIUM COLOR COPY (100 lbs)." Titania, BaSO4 and other white pigments are often added to paper to increase their reflection of visible light (400-700 nanometers).

Other nonwoven fibrous layers that may be used for the reflective microporous layer include those made using a wet laid process. Suitable fibers for use in air laid and wet laid processes include those made from natural (animal or vegetable) and/or synthetic polymers, including thermoplastic and solvent-dispersible polymers. Useful polymers include wool; silk; cellulosic polymers (for example, cellulose and cellulose derivatives); fluorinated polymers (for example, polyvinyl fluoride, polyvinylidene fluoride, copolymers of vinylidene fluoride such as poly(vinylidene fluoride-co-hexafluoropropylene), and copolymers of chlorotrifluoroethylene such as poly(ethylene-co-chlorotrifluoroethylene)); chlorinated polymers; polyolefins (for example, polyethylene, polypropylene, poly-1-butene, copolymers of ethylene and/or propylene, with 1-butene, 1-hexene, 1-octene, and/or 1-decene (for example, poly(ethylene-co-1-butene), poly(ethylene-co-l-butene-co-l-hexene)); polyisoprenes; polybutadienes; polyamides (for example, nylon 6, nylon 6,6, nylon 6,12, poly(iminoadipoyliminohexamethylene), poly(iminoadipoyliminodecamethylene), or polycaprolactam); polyimides (for example, poly(pyromellitimide)); polyethers; polyether sulfones (for example, poly(diphenyl ether sulfone), or poly(diphenyl sulfone-co-diphenylene oxide sulfone)); polysulfones; polyvinyl acetates; copolymers of vinyl acetate (for example, poly(ethylene-co-vinyl acetate), copolymers in which at least some of the acetate groups have been hydrolyzed to provide various poly(vinyl alcohols) including poly(ethylene-co-vinyl alcohol)); polyphosphazenes; polyvinyl esters; polyvinyl ethers; poly(vinyl alcohols); polyaramids (for example, para-aramids such as poly(paraphenylene terephthalamide) and fibers sold under the trade designation KEVLAR by DuPont Co., Wilmington, Del., pulps of which are commercially available in various grades based on the length of the fibers that make up the pulp such as, for example, KEVLAR 1F306 and KEVLAR 1F694, both of which include aramid fibers that are at least 4 mm in length);

polycarbonates; and combinations thereof Nonwoven fibrous layers may be calendared to adjust the pore size.

The use of a reflective micro-voided polymer film as the reflective microporous layer may provide a reflectance that is even greater than that of a silvered mirror. In some embodiments, a reflective micro-voided polymer film has a high average reflectance in the solar region. In particular, the use of a fluoropolymer blended into the micro-voided polymer film may provide a high average reflectance that may be greater than other types of multilayer optical films. Examples of polymers useful for forming the reflective micro-voided polymer film include polyester (or polyethylene terephthalate (PET)) available from 3M Company. Modified PET copolyesters including PETG available, for example, as SPECTAR 14471 and EASTAR GN071 from Eastman Chemical Company of Kingsport, Tenn., and PCTG available, for example, as TIGLAZE ST and EB0062 also from Eastman Chemical Company are also useful high refractive index polymers. The molecular orientation of PET and PET modified copolyesters may be increased by stretching which increases its in-plane refractive indices providing even more reflectivity in the multilayer optical film. In general, an incompatible polymer additive, or inorganic particle additive, is blended into the PET host polymer at levels of at least 10 wt. %, at least 20 wt. %, at least 30 wt. %, at least 40 wt. %, or even at least 49 wt. % during extrusion prior to stretching to nucleate voids during the stretching process. Suitable incompatible polymers additives for PET include: fluoropolymers, polypropylenes, polyethylenes, and other polymers which do not adhere well to PET. Similarly, if polypropylene is the host polymer, then incompatible polymer additives such as PET or fluoropolymers can be added to the polypropylene host polymer at levels of at least 10 wt. %, at least 20 wt. %, at least 30 wt. %, at least 40 wt. %, or even at least 49 wt. % during extrusion prior to stretching to nucleate voids during the stretching process.

Examples of suitable inorganic particle additives for nucleating voids in micro-voided polymer films include titania, silica, alumina, aluminum silicate, zirconia, calcium carbonate, barium sulfate, and glass beads and hollow glass bubbles, although other inorganic particles and combinations of inorganic particles may also be used. Crosslinked polymeric microspheres can also be used instead of inorganic particles. Inorganic particles can be added to the host polymer at levels of at least 10 wt. %, at least 20 wt. %, at least 30 wt. %, at least 40 wt. %, or even at least 49 wt. % during extrusion prior to stretching to nucleate voids during the stretching process. If present, the inorganic particles may have a volume average particle diameter of 5 nanometers to 1 micrometer, although other particle sizes may also be used. Hard particles including glass beads or glass bubbles can be present on the surface layer of UV mirror skin layer or the antisoiling layer to provide scratch resistance. In some embodiments, glass beads and/or glass bubbles may even protrude from the surface as hemispheres or even quarter spheres.

In some embodiments, micro-voided polymer films include a fluoropolymer continuous phase. Examples of suitable polymers include ECTFE, PVDF, and copolymers of tetrafluoroethylene, hexafluoropropylene, and vinylidene fluoride such as, for example, those available under the trade designation THV from 3M Company.

An example of micro-voided PET film including barium sulfate is available as LUMIRROR XJSA2 from Toray Plastics (America) Inc. of North Kingstown, R.I. LUMIRROR XJSA2 includes $BaSO_4$ inorganic additive to increase its reflectivity of visible light (400-700 nanometers). Additional examples of reflective micro-voided polymer films are available from Mitsubishi Polymer Film, Inc. of Greer, South Carolina, as HOSTAPHAN V54B, HOSTAPHAN WDl3, and HOSTAPHAN W270.

Some examples of micro-voided polyolefin films are described in, for example, U.S. Pat. No. 6,261,994 (Bourdelais et al.).

The reflective microporous layer is generally diffusely reflective, for example, of visible radiation over a majority of wavelengths in the range of 400 to 700 nanometers, inclusive. In some embodiments, the reflective microporous layer may have an average reflectance of at least 60% (in some embodiments, at least 70%, 80%, 85%, 90%, 91%, 92%, 93%, 94%, 95%, 96%, 97%, 98%, 99%, or even at least 99.5%) over a wavelength range of at least 400 up to 700 nanometers.

The reflectivity of the reflective microporous layer may be reflective over a broader wavelength range. In some embodiments, the reflectivity of the microporous polymer layer may have an average reflectance of at least 60% (in some embodiments, at least 70%, 80%, 85%, 90%, 91%, 92%, 93%, 94%, 95%, 96%, 97%, 98%, 99%, or even at least 99.5%) over the solar region, such as a wavelength range of from 0.4 to 2.5 micrometers (or even from 0.3 to 3.0 micrometers).

Any suitable material may be used to at least partially (or entirely) form at least some (or all) of the metal layer. Non-limiting examples of metals that may be used in the metal layer include one or more of the following: silver (Ag), copper (Cu), aluminum (Al), gold (Au), Inconel, stainless steel, or various combinations thereof. In some embodiments, a metal layer may be formed including a 100 nanometer thick layer of silver and a 20 nanometer thick layer of copper to protect the silver from corrosion. In some embodiments, the metal layer may at least partially (or entirely) define a high average reflectance at least in the solar wavelength range.

A metal layer may be bent, for example, using a metal bending machine, to provide first portions of the metal layer at different angles than the second portions. In some embodiments, the first portions may be used to support and orient the plurality of first elements 122, and the second portions may be used to support and orient the plurality of second elements 124.

Additionally, or alternatively, a metal layer may be vapor coated. In some embodiments, vapor coated onto the first and second outer layers 144, 146 (for example, on a surface opposite to the first major surface 130).

Any suitable material may be used to as a polyethylene copolymer, which may be used, for example, in a dense polymer layer, a microporous (or micro-voided) polymer layer, or a graphic layer. Non-limiting examples of polyethylene copolymers include copolymers, for example, available under the trade designation "ENGAGE" from Atofina Petrochemicals, Inc. Houston, Tex., copolymers available under the trade designation "TPX" from Mitsui Chemicals, Osaka, Japan, or cyclic olefin copolymers available under the trade designation "COC" from Zeon Chemicals, Louisville, Ken.. In general, various combinations of polyethylene copolymers can be used.

Polyethylene copolymers may include copolymers of ethylene and alkyl (meth)acrylates (for example, methyl acrylate, methyl methacrylate, ethyl acrylate, butyl acrylate) can be prepared by known methods; for example, as described in U.S. Pat. No. 3,350,372 (Anspon et al.). Ethylene-co-methyl acrylate copolymers are also widely available from commercial sources. Examples of suitable ethylene-co-methyl acrylate copolymers include those available from DuPont under the trade designation "ELVALOY" such as, for example, "ELVALOY AC 1209" (ethylene-co-methyl acrylate (91:9 wt.:wt.) copolymer), "ELVALOY 1609 AC" (ethylene-co-methyl acrylate (91:9 wt.:wt.) copolymer), "ELVALOY AC 1913" (ethylene-co-methyl acrylate (87:13 wt.:wt.) copolymer), "ELVALOY 1218 AC" (ethylene-co-methyl acrylate (82:18 wt.:wt.) copolymer), "ELVALOY AC 1820" (ethylene-co-methyl acrylate (80:20 wt.:wt.) copolymer), "ELVALOY AC 12024S" (ethylene-co-methyl acrylate (76:24 wt.:wt.) copolymer), "ELVALOY AC 1224" (ethylene-co-methyl acrylate (76:24 wt.:wt.) copolymer), "ELVALOY AC 15024S" (ethylene-co-methyl acrylate (76:24 wt.:wt.) copolymer), and "ELVALOY 1125 AC" (ethylene-co-methyl acrylate (75:25 wt.:wt.) copolymer). Additional suitable polyethylene copolymers include Ethylene-vinyl acetate copolymer (82/18 wt.:wt.), obtained under the trade designation "ELVAX 460 EVA" copolymer resin from E. I. du Pont de Nemours & Company of Wilmington, DE, Ethylene-vinyl acetate copolymer (92.5/7.5 wt.:wt.), available under the trade designation "BYNEL 3120" from E. I. du Pont de Nemours & Company.

Various suitable materials may be used to provide coatings including metal, for example, included in the plurality of second elements 124. Coatings including metal, such as paints including metal, may at least partially (or entirely) define a low absorbance in the atmospheric window region. The coatings including metal may be opaque. The metal may be a pigment to provide a color for the coating and may contribute to the low emissivity. One example of a paint including metal is a LO/MIT radiant barrier coating available from SOLEC-Solar Energy Corporation of Ewing, NJ, which is formulated to reduce radiant heat transfer.

Any suitable type of infrared mirror film may be used, for example, in the plurality of second elements 124. In some embodiments, the infrared mirror film is a low emissivity infrared mirror film. In some embodiments, the infrared mirror film may have a high reflectance in at least the atmospheric window region and optionally in the near-infrared and mid-infrared regions. In some embodiments, the infrared mirror film may have a low average reflectance in the visible region. As used herein, the term "low average reflectance" refers to an average reflectance across a particular wavelength band being less than or equal to 30% (or less than or equal to 20% or 10%).

Low emissivity films contain a visible light-transmissive flexible support, a first nucleating oxide seed layer, a first metal layer, an organic spacing layer, a second nucleating oxide seed layer, a second metal layer and a polymeric protective layer. The thicknesses of the metal layers and spacing layer are such that the films are visible light-transmissive and infrared-reflective. The films have high visible light transmittance, high infrared reflected energy and reduced solar energy transmittance.

A variety of oxides may be employed in the nucleating oxide seed layers. The seed layers may be the same or different and desirably are the same. The seed layer oxide desirably promotes deposition of the subsequently applied metal layer in a more uniform or more dense fashion, or promotes earlier formation (for example, at a thinner applied thickness) of a continuous metal layer. Selection of an appropriate oxide may depend upon the chosen support and adjacent metal layer, and normally may be made empirically. Representative seed layer oxides include gallium oxide, indium oxide, magnesium oxide, zinc oxide, tin oxide and mixtures (including mixed oxides and doped oxides) thereof. For example, the seed layers may contain zinc oxide or zinc oxide doped with aluminum or aluminum oxide.

The seed layers may be formed using techniques employed in the film metallizing art such as sputtering (for example, planar or rotary magnetron sputtering); evaporation (for example, resistive or electron beam evaporation); chemical vapor deposition; metal organic chemical vapor deposition (CVD) (such as metalorganic CVD, or MOCVD); plasma-enhanced, assisted, or activated CVD (such as plasma-enhanced CVD, or PECVD); ion sputtering; and the like. A seed layer may for example conveniently be formed directly by sputtering the seed layer oxide or in situ by sputtering the precursor metal in an oxidizing atmosphere. The sputtering target may also include metals (for example, aluminum, indium, tin or zinc) or oxides (for example, alumina, indium oxide, indium tin oxide, tin oxide or zinc oxide) to make the sputtering target more conductive. Examples of sputtering targets include zinc oxide:alumina, zinc oxide:gallium oxide, zinc oxide:tin oxide, indium oxide:zinc oxide, indium oxide:tin oxide, indium oxide:tin oxide:zinc oxide, indium:zinc, indium:tin, indium:tin:zinc, indium gallium zinc oxide or $Zn_{(1-x)}Mg_xO:Al$, $MgIn_2O_{(4-x)}$. Specific examples thereof include 99:1 and 98:2 zinc oxide:alumina, 95:5 zinc oxide:gallium oxide, 93:7 zinc oxide:gallium oxide, 90:10 indium oxide: zinc oxide, 90:10 and 95:5 indium oxide:tin oxide, from about 76:24 to about 57:43 indium:zinc and 90:10 indium: tin. The seed layers may have the same or different thicknesses, and preferably are each sufficiently thick so that the subsequently applied metal layers will be homogeneous with a minimum of light absorption. The seed layers may be sufficiently thin so as to ensure that the resultant solar control film and articles employing the film will have the desired degree of visible light transmission and near-IR or IR reflection. For example, the seed layers may have a physical thickness (as opposed to an optical thickness) less than about 20 nanometers (nm), less than about 10 nm, less than about 8 nm, less than about 5 nm, less than about 4 nm or less than about 3 nm. The seed layers may also have a physical thickness greater than 0 nm, at least 0.5 nm or at least 1 nm. In one embodiment, the seed layers have a physical thickness greater than 0 and less than about 5 nm. In a second embodiment, the seed layer physical thicknesses are greater than 0 and less than about 4 nm. In a third embodiment, the seed layer physical thicknesses are greater than 0 and less than about 3 nm.

A variety of metals may be employed in the metal layers. The metal layers may be the same or different and desirably are the same. Examples of metals include silver, copper, nickel, chrome, noble metals (for example, gold, platinum or palladium) and alloys thereof. The metal layers can be formed using film metallizing art techniques like those mentioned above for the seed layers and using a non-oxidizing atmosphere for non-noble metals. The metal layers are sufficiently thick so as to be continuous, and sufficiently thin so as to ensure that the solar control film and articles employing the film will have the desired degree of visible light transmission and near-IR or IR reflection. The metal layers normally will be thicker than the seed layers. In one embodiment, the metal layers will have a physical thickness of about 5 to about 50 nm. In another embodiment, the metal layer thicknesses are about 5 to about 15 nm. In a third embodiment, the metal layer thicknesses are about 5 to about 12 nm.

The organic spacing layer lies between the first metal layer and second nucleating seed layer and may be formed from a variety of organic materials. If desired, the spacing layer can be applied using conventional coating methods such as roll coating (for example, gravure roll coating) or spray coating (for example, electrostatic spray coating). The spacing layer preferably is crosslinked using, for example, techniques like those which may be employed when a crosslinked organic base coat layer is used. A crosslinked organic spacing layer has several advantages over a non-crosslinked organic spacing layer. A crosslinked organic spacing layer will neither melt nor soften as appreciably with heating as a non-crosslinked organic spacing layer, and thus is less likely to flow, deform or thin significantly under the simultaneous influence of temperature and pressure, as during a forming or laminating process. A crosslinked organic spacing layer is highly solvent resistant, whereas a non-crosslinked organic spacing layer may be dissolved or appreciably softened by solvents including those found in automotive fluids such as gasoline, oil, transmission fluid, and window cleaners. A crosslinked organic spacing layer may also have desirable physical properties compared to a non-crosslinked organic spacing layer fabricated from a similar polymer, such as higher modulus and stiffness, better elastic recovery when strained or better resilience. Preferably the spacing layer is crosslinked in situ atop the first metal or alloy layer. The spacing layer preferably is formed by processes involving flash evaporation, vapor deposition and crosslinking of a monomer as described in the above-mentioned U.S. Pat. Nos. 6,929,864, 7,018,713, and 7,215,473, which are incorporated herein by reference. Volatilizable (meth)acrylates are preferred for use in such processes, with volatilizable acrylates being especially preferred. Coating efficiency can be improved by cooling the support. Particularly preferred monomers include multifunctional (meth)acrylates, used alone or in combination with other multifunctional or monofunctional (meth)acrylates, such as hexanediol diacrylate, ethoxyethyl acrylate, phenoxyethyl acrylate, cyanoethyl (mono)acrylate, isobornyl acrylate, isobornyl methacrylate, octadecyl acrylate, isodecyl acrylate, lauryl acrylate, beta-carboxyethyl acrylate, tetrahydrofurfuryl acrylate, dinitrile acrylate, pentafluorophenyl acrylate, nitrophenyl acrylate, 2-phenoxyethyl acrylate, 2-phenoxyethyl methacrylate, 2,2,2-trifluoromethyl (meth) acrylate, diethylene glycol diacrylate, triethylene glycol diacrylate, triethylene glycol dimethacrylate, tripropylene glycol diacrylate, tetraethylene glycol diacrylate, neopentyl glycol diacrylate, propoxylated neopentyl glycol diacrylate, polyethylene glycol diacrylate, tetraethylene glycol diacrylate, bisphenol A epoxy diacrylate, 1,6-hexanediol dimethacrylate, trimethylol propane triacrylate, ethoxylated trimethylol propane triacrylate, propylated trimethylol propane triacrylate, tris(2-hydroxyethyl) isocyanurate triacrylate, pentaerythritol triacrylate, phenylthioethyl acrylate, naphthyloxyethyl acrylate, IRR-214 cyclic diacrylate from UCB Chemicals, epoxy acrylate RDX80095 from Rad-Cure Corporation, and mixtures thereof A variety of other curable materials can be included in the spacing layer, for example, acrylamides, vinyl ethers, vinyl naphthalene, acrylonitrile, and mixtures thereof. The spacing layer physical thickness will depend in part upon its refractive index and in part upon the desired optical characteristics of the solar control film. A preferred optical thickness is about 1/4 to 1/2 the wavelength of the center of the desired pass band for transmitted light. For use in an infrared-rejecting interference stack, the crosslinked organic spacing layer may for example have a refractive index of about 1.3 to about 1.7, an optical thickness of about 75 to about 275 nm (for example, about 100 to about 150 nm) and a corresponding physical thickness of about 50 to about 210 nm (for example, about 65 to about 100 nm). Optical modeling can be employed to select suitable layer thicknesses.

A variety of organic materials may be used to form the polymeric protective layer. If desired, the protective layer may be applied using conventional coating methods such as roll coating (for example, gravure roll coating) or spray coating (for example, electrostatic spray coating). The protective layer preferably is crosslinked using, for example, techniques like those which may be employed when a crosslinked organic base coat layer is used. The protective layer may also be separately formed and applied using lamination. Preferably the protective layer is formed using flash evaporation, vapor deposition and crosslinking of a monomer or oligomer as described above. Examples of monomers or oligomers for use in such protective layers include volatilizable (meth)acrylates. The protective layer may also contain adhesion-promoting additives. Examples of additives include the spacing layer additives described above. When the solar control film is laminated between sheets of a mechanical energy-absorbing material, such as polyvinyl butyral (PVB), the index of refraction of the protective layer can be selected to minimize reflection at the interface caused by any difference in refractive indices between the mechanical energy-absorbing material and the solar control film. The protective layer can also be post-treated to enhance adhesion of the protective layer to the mechanical energy-absorbing material. Examples of post-treatments include the support pretreatments described above. In one embodiment, plasma post-treatment of both sides of the solar control film can be employed.

Various suitable materials and structures may be used to at least partially (or entirely) form at least some (or all) of any graphic layer used in the second elements 124. Non-limiting examples of materials and structures that may be used to form the graphic layer include: a polyvinyl chloride (PVC) layer, a polyethylene copolymer layer, a microporous (or micro-voided) polyethylene copolymer layer, and a microporous (or micro-voided) polyethylene at least partially (or entirely) covered by a dense polyethylene copolymer layer. A print material, such as an ink or paint, may be applied to the graphic layer to further form the visual graphic. The graphic layer may be defined as including a print material layer and a graphic support layer.

Any suitable techniques may be used to form the article 120. In some embodiments, when the supporting layer 138 is formed of a metal, a sheet of metal (such as aluminum) may be bent using a metal bending machine. Metal bending machines, often called brakes, can be used to form sheet metal into the desired form factor of article 120. Metal bending machines are commercially available from companies such as Bolton Tools, Baileigh Industrial, and RAMS Sheet metal equipment.

In some embodiments, the first or second elements 122, 124 including polymer may be formed by thermoforming. In some embodiments, article 120 may be thermoformed from thermoformable polymer sheet with commonly available polymer sheet thermoformers. Thermoforming machines are generally commercially available from companies such as Belovac Industries, Sencorpwhite, and Formech Inc. In some embodiments, laminated strips or discrete portions may be applied to a supporting layer 138 prior to thermoforming or metal bending, for example, to form the outer layers 144, 146.

Figure 3:
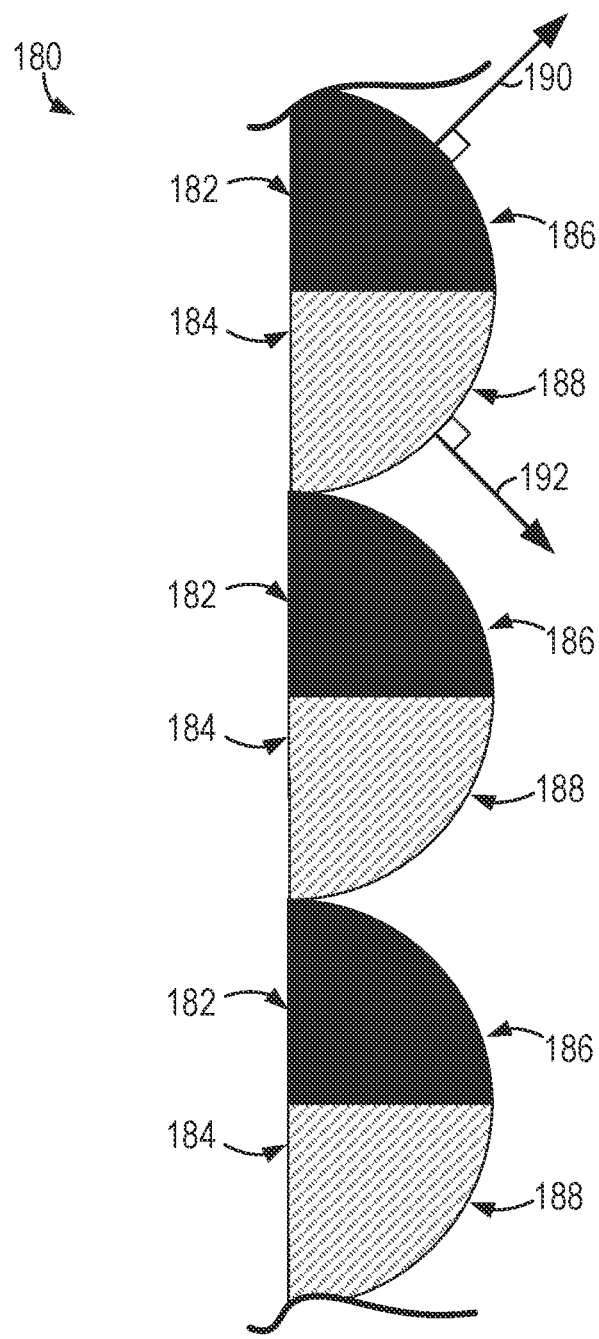
FIG. 3 is a schematic cross-sectional illustration of another example of a passive cooling article usable with the passive cooling apparatus or system of FIG. 1.

FIG. 3 is a schematic cross-sectional illustration of another example of a passive cooling article 180 usable as the passive cooling article 102 (FIG. 1). The article 180 may include one more of the features described with respect to the article 120 (FIG. 2), except that the article 180 does not include a separate supporting layer. The plurality of first elements 182 and the plurality of second elements 184 may each include structures or materials to provide a reflectance and a high or low absorbance and emissivity, respectively. In particular, the plurality of first elements 182 may provide a high absorbance in the atmospheric window region and a high reflectance in the solar region, and the plurality of second elements 184 may provide a low absorbance in the atmospheric window region and a high reflectance in the solar region. Any suitable materials may be used to form the article 180, such as the same or similar materials used to form the article 120.

Also shown are first element outer surfaces 186 and second element outer surfaces 188 that are curved, which may also be used as the corresponding first element outer surfaces 126 or second element outer surfaces 128 of FIG. 2. In the illustrated embodiment, the cross-sectional profile of each of the first element outer surfaces 186 or the second element outer surfaces 188 has a quarter circle shape.

First vectors 190 may be defined normal to the first element outer surfaces 186. Second vectors 192 may be defined normal to the second element outer surfaces 188. As illustrated, the first and second vectors 190, 192 are defined as being normal to either at least a portion of the respective outer surfaces 186, 188 or normal to an average tangent to the respective outer surfaces 186, 188.

Figure 4:
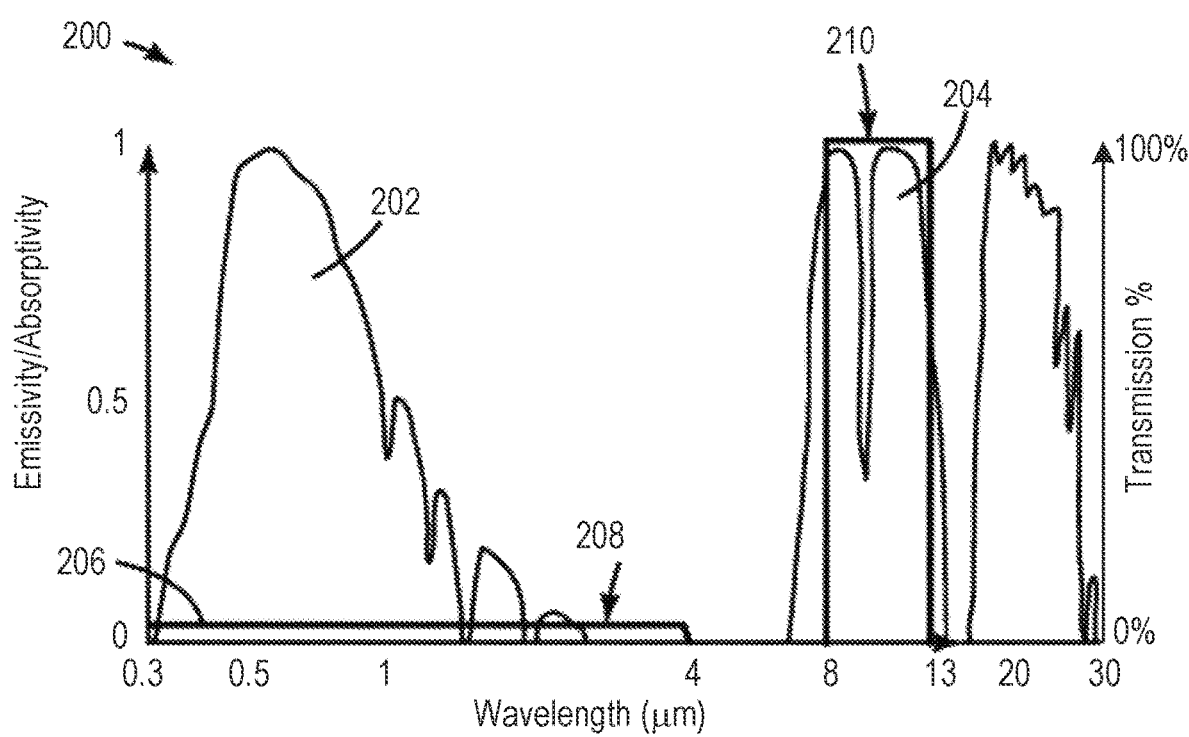
FIG. 4 is a graph of an energy spectrum of solar energy (or sunlight) described as terrestrial reference spectrum found in ASTM G173-03 (2012), an energy transmission % spectrum in an atmospheric window region, and one example of an absorption of high emissivity elements of a passive cooling article usable with the passive cooling apparatus or system of FIG. 1.

FIG. 4 is a graph 200 of: an energy spectrum 202 of solar energy (or sunlight) described as terrestrial reference spectrum found in ASTM G173-03 (2012), an energy transmission % spectrum 204 in an atmospheric window region (for example, from 0 to 1), and one example of an absorption 206 (for example, absorptivity or emissivity, as shown on the y-axis from 0 to 1) of high emissivity elements of an article, such as the first elements 122 (FIG. 2) or the first elements 182 (FIG. 3). Absorption 206 may also be described in terms of absorbance (for example, the logarithm of transmission).

High emissivity elements may define reflectors to reflect some or all the light of the energy spectrum 202 in the reflective band 208. The reflective band 208 at least partially (or entirely) covers wavelengths in the solar region and, in some cases (such as an infrared mirror film), at least partially (or entirely) covers wavelengths in the visible, near-infrared, or mid-infrared regions. Reflectors may have low absorption 206 in the reflective band 208.

High emissivity elements may have a high absorption 206 in an absorptive band 210. The absorptive band 210 may at least partially (or entirely) cover the wavelengths in the atmospheric window region, which may facilitate transmitting at least some infrared energy (for example, from any article of the present disclosure) through the high transmission regions of the atmosphere, for example, as shown by the energy transmission % spectrum 204. High emissivity elements may have low reflectivity in the absorptive band 210.

FIG. 5 is a schematic illustration of one example of a high emissivity element 220 that includes a multilayer optical film, which may be used with any article, such as article 102, 120, or 180, of the passive cooling apparatus 100 (FIG. 1). The high emissivity element 220 may be applied to the substrate 104. The high emissivity element 220 may be used to reflect light in solar region and to radiate light in atmospheric window region. The high emissivity element 220 may include multiple components, which may cooperatively provide reflective and absorptive properties described herein to cool the substrate 104. In some embodiments, the high emissivity element 220 is thermally coupled to the substrate 104 to transfer heat therebetween. In some embodiments, the substrate 104 is coupled to a fluid, liquid or gas, which can transfer heat away from another article (such as a heat exchanger, building, battery, refrigerator, freezer, air conditioner, or photovoltaic module).

In some embodiments, such as the one depicted, the high emissivity element 220 may include a reflector 222 with high average reflectance in the solar region to reflect light in the solar region and may have an outer layer 224 with a high transmittance in the solar region to allow light to pass through to the reflector. The outer layer 224 may also have a high absorbance in the atmospheric window region to radiate energy in wavelengths of the atmospheric window region away from the article. In some embodiment, the outer layer 224 is thermally coupled to the reflector 222 to transfer heat therebetween. Heat from the substrate 104 transferred to the reflector 222 may be further transferred to the outer layer 224, which may be radiated as light in the atmospheric window region to cool the substrate 104 at night and during the day.

The outer layer 224 may partially or fully cover the reflector 222. In general, the outer layer 224 may be positioned between the reflector 222 and at least one source of solar energy (for example, the sun). The outer layer 224 may be exposed to elements in an outdoor environment and may be formed of material particularly suited for such environments.

The outer layer 224 may be formed of material that provides high transmittance in the solar region or high absorptivity in the atmospheric window region, or both. The material of the outer layer 224 may include at least one polymer (for example, a fluoropolymer).

The reflector 222 may partially or fully cover the substrate 104. In general, the reflector 222 may be positioned between the substrate 104 and the outer layer 224 or at least one source of solar energy. The reflector 222 may be protected from environmental elements by the outer layer 224.

In some embodiments, the reflector 222 may be thin to facilitate heat transfer from the substrate 104 to the outer layer 224. In general, a thinner reflector 222 may provide better heat transfer. In some embodiments, the overall thickness 226 of the reflector 222 is less than or equal to 50 micrometers (in some embodiments, less than or equal to 40, 30, 25, 20, 15, or even at most 10 micrometers).

In the illustrated embodiment, the reflector 222 includes a multilayer optical film 228 and may include a metal layer 230. The metal layer 230 (described herein in more detail) may be disposed between the film 228 and the substrate 104. The film 228 may be disposed between the outer layer 224 and the substrate 104. The film 228 may be coupled to the substrate 104, for example, by an adhesive layer 232 (or backing layer). The adhesive layer 232 may be disposed between the metal layer 230 and the substrate 104. The adhesive layer may include thermally conductive particles to aid in heat transfer. Thermally conductive particles include aluminum oxide and alumina nanoparticles. Additional thermally conductive particles for the adhesive layer include those available under the trade designation "3M BORON DINITRIDE" from 3M Company.

The film 228 may include at least layer that defines the reflective band 208 (FIG. 4). In some embodiments, film 228 includes plurality of first optical layers 234 and plurality of second optical layers 236. The layers 234, 236 in the film 228 may alternate or be interleaved and have different refractive indices. Each first optical layer 234 may be adjacent to a second optical layer 236, or vice versa. Most of the first optical layers 234 may be disposed between adjacent second optical layers 236, or vice versa (for example, all layers except one).

The reflective band 208 may be defined by the number of optical layers, the thicknesses, and the refractive indices of the optical layers 234, 236 in any suitable manner known to one skilled in the art of making reflective multi-layer optical films having the benefit of the present disclosure.

In some embodiments, the film 228 has up to 1000 total optical layers 234, 236 (in some embodiments, up to 700, 600, 500, 400, 300, 250, 200, 150, or even up to 100 total optical layers).

The thicknesses of the optical layers 234, 236 in one film 228 may vary. The optical layers 234, 236 may define a maximum thickness 238. Some of the optical layers 234, 236 may be thinner than the maximum thickness 238. The maximum thickness 238 of optical layers 234, 236 may be much smaller than a minimum thickness 240 of the outer layer 224. The outer layer 224 may also be described as a skin layer. In some embodiments, the outer layer 224 may provide structural support for the film 228, particularly when the outer layer 224 is co-extruded with the film 228. In some embodiments, the minimum thickness 240 of the outer layer 224 is at least 5 (in some embodiments, at least 10, or even at least 15) times greater than the maximum thickness 238 of the optical layers 234, 236.

The refractive indices of the optical layers 234, 236 may be different. The first optical layer 234 may be described as a low index layer and the second optical layer 236 may be described as a high index layer, or vice versa. In some embodiments, a first refractive index (or average refractive index) of the low index layers is less than a second refractive index (or average refractive index) of the high index layers by greater than or equal to 4% (in some embodiments, greater than or equal to 5, 10, 12.5, 15, 20, or even at least 25%). In some embodiments, the first refractive index of the low index layer may be less than or equal to 1.5 (in some embodiments, less than or equal to 1.45, 1.4, or even at most 1.35). In some embodiments, the second refractive index of the high index layer may be greater than or equal to 1.4 (in some embodiments, greater than or equal to 1.42, 1.44, 1.46, 1.48, 1.5, 1.6, or even at least 1.7).

The film 228 may be formed of at least one material that provide high average reflectance in the solar region. The material of the film 228 may include at least one polymer. One type of polymeric material is a fluoropolymer. At least one of the materials used to form the film 228 may be the same or different as at least one material used to form the outer layer 224. In some embodiments, both the film 228 and the outer layer 224 may include a fluoropolymer. The composition of the fluoropolymers may be the same or different in the film 228 compared to the outer layer 224.

In some embodiments, the first optical layer 234 is formed of different material than second optical layer 236. One of first and second optical layers 234, 236 may include a fluoropolymer. The other of first and second optical layers 234, 236 may include a fluoropolymer or include a non-fluorinated polymer. In some embodiments, the first optical layer includes a fluoropolymer and the second optical layer includes a non-fluorinated polymer.

In some embodiments, multilayer optical films described herein can be made using general processing techniques, such as those described in U.S. Pat. No. 6,783,349 (Neavin et al.), which is incorporated herein by reference.

Desirable techniques for providing a multilayer optical film with a controlled spectrum may include, for example, (1) the use of an axial rod heater control of the layer thickness values of coextruded polymer layers as described, for example, in U.S. Pat. No. 6,783,349 (Neavin et al.); (2) timely layer thickness profile feedback during production from a layer thickness measurement tool such as, for example, an atomic force microscope (AFM), a transmission electron microscope, or a scanning electron microscope; (3) optical modeling to generate the desired layer thickness profile; and (4) repeating axial rod adjustments based on the difference between the measured layer profile and the desired layer profile.

In some embodiments, the basic process for layer thickness profile control may involve adjustment of axial rod zone power settings based on the difference of the target layer thickness profile and the measured layer profile. The axial rod power increase needed to adjust the layer thickness values in a given feedblock zone may first be calibrated in terms of watts of heat input per nanometer of resulting thickness change of the layers generated in that heater zone. For example, fine control of the spectrum is possible using 24 axial rod zones for 275 layers. Once calibrated, the necessary power adjustments can be calculated once given a target profile and a measured profile. The procedure is repeated until the two profiles converge.

In one embodiment, articles of the present disclosure may include a UV light reflective multi-layer optical film reflecting a wavelength range from 350 to 450 nanometers made with 150 high refractive index layers including a CoPMMA (for example, available under the trade designation "PERSPEX CP63" from Lucite International of Cordova, Tenn.) alternating with 150 low refractive index layer including a fluoropolymer (for example, available under the trade designation "3M DYNEON THV221" from 3M Company), and a visible light reflective multi-layer optical film reflecting a wavelength range from 450 to 750 nanometers made with 150 high refractive index layers including a PET (for example, available under the trade designation "EASTAPAK 7452" from Eastman Chemical Company, Kingsport, Tenn.), alternating with 150 low refractive index layers including a fluoropolymer (for example, available under the trade designation "3M DYNEON THV221" from 3M Company). The surface of the visible light reflective multi-layer optical film opposite the UV light reflective multi-layer optical film is coated with 100 nanometers of copper (Cu). The surface of the UV light reflective multilayer optical film opposite the visible light reflective mirror is a layer having fluoropolymer (for example, available under the trade designation "3M DYNEON THV815" from 3M Company).

Non-limiting examples of non-fluorinated polymers (polymers without fluorine) that may be used include at least one of: a polyethylene terephthalate (PET), a co-polymer of ethyl acrylate and methyl methacrylate (co-PMMA), a polypropylene (PP), a polyethylene (PE), a polyethylene copolymer, a polymethyl methacrylate (PMMA), an acrylate copolymer, a polyurethane, or various combinations thereof. In general, various combinations of non-fluorinated polymers can be used.

Examples of isotropic optical polymers, especially for use in the low refractive index optical layers, may include homopolymers of polymethylmethacrylate (PMMA), such as those available from Ineos Acrylics, Inc., Wilmington, Del., under the trade designations "CP71" and "CP80;" and polyethyl methacrylate (PEMA), which has a lower glass transition temperature than PMMA. Additional useful polymers include copolymers of PMMA (CoPMMA), such as a CoPMMA made from 75 wt. % methylmethacrylate (MMA) monomers and 25 wt. % ethyl acrylate (EA) monomers, (for example, available under the trade designation "PERSPEX CP63" from Ineos Acrylics, Inc., or available under the trade designation "ATOGLAS 510" from Arkema, Philadelphia, Pa.), a CoPMMA formed with MMA comonomer units and n-butyl methacrylate (nBMA) comonomer units, or a blend of PMMA and poly(vinylidene fluoride) (PVDF). Additional examples of optical polymers for Layer A include acrylate triblock copolymers, where each endblock of at least one of the first block copolymer, the second block copolymer, or the at least one additional block copolymer is formed of poly(methyl methacrylate), and further wherein each midblock of at least one of the first block copolymer or the second block copolymer is formed of poly(butyl acrylate). In some embodiments, at least one of the first block copolymer, the second block copolymer, or the at least one additional block copolymer is formed of from 30 wt. % to 80 wt. % endblocks, and from 20 wt. % to 70 wt. % midblocks, based on a total weight of the respective block copolymer. In certain particular embodiments, at least one of the first block copolymer, the second block copolymer, or the at least one additional block copolymer is formed of from 50 wt. % to 70 wt. % endblocks, and from 30 wt. % to 50 wt. % midblocks, based on the total weight of the respective block copolymer. In any of the foregoing embodiments, the first block copolymer may be selected to be the same as the second block copolymer. Triblock acrylate copolymers are available, for example, under the trade designation "KURARITY LA4285" from Kuraray America, Inc., Houston, Tex.

Additional suitable polymers for the optical layers, especially for use in the low refractive index optical layers, may include at least one of: polyolefin copolymers, such as poly (ethylene-co-octene) (PE-PO) (for example, available under the trade designation "ENGAGE 8200" from Dow Elastomers, Midland, MI), poly (propylene-co-ethylene) (PPPE) (for example, available under the trade designation "Z9470" from Atofina Petrochemicals, Inc., Houston, TX), and a copolymer of atactic polypropylene (aPP) and isotactic polypropylene (iPP). The multilayer optical films can also include, for example, in the second layers, a functionalized polyolefin, such as linear low-density polyethylene-graft-maleic anhydride (LLDPE-g-MA) (for example, available under the trade designation "BYNEL 4105" from E.I. du Pont de Nemours & Co., Inc., Wilmington, Del.).

Material may be selected based on absorbance or transmittance properties described herein, as well as on refractive index. In general, the greater the refractive index between two materials in the film 228, the thinner the film can be, which may be desirable for efficient heat transfer.

Examples of polymers useful for forming the high refractive index optical layers include polyethylene terephthalate (PET), available from 3M Company, and also available from Nan Ya Plastics Corporation, Wharton, Tex. Copolymers of PET including PETG and PCTG under the trade designation "SPECTAR 14471" and "EASTAR GN071" from Eastman Chemical Company, Kingsport, TN, are also useful high refractive index layers. The molecular orientation of PET and CoPET may be increased by stretching which increases its in-plane refractive indices providing even more reflectivity in the multilayer optical film.

UV stabilization with UV-absorbers (UVAs) and Hindered Amine Light Stabilizers (HALs) can intervene in the prevention of photo-oxidation degradation of PETs, PMMAs, and CoPMMAs. UVAs for incorporation into PET, PMMA, or CoPMMA optical layers include benzophones, benzotriazoles, and benzotriazines. Examples of UVAs for incorporation into PET, PMMA, or CoPMMA optical layers include those available under the trade designations "TINUVIN 1577" and "TINUVIN 1600," from BASF Corporation, Florham Park, NJ. Typically, UVAs are incorporated in the polymer at a concentration of 1-10 wt %. Examples of HALs for incorporation into PET, PMMA, or CoPMMA optical layers include those available under the trade designations "CHIMMASORB 944" and "TINUVIN 123," from BASF Corporation. Typically, the HALs are incorporated into the polymer at are 0.1-1.0 wt %. A 10:1 ratio of UVA to HALs can be optimum.

UVAs and HALs can also be incorporated into the fluoropolymer surface layer, or a fluoropolymer layer below the surface layer. U.S. Pat. No. 9,670,300 (Olson et al.) and U.S. Pat. App. Pub. No. 2017/0198129 (Olson et al.), which are incorporated herein by reference, describe examples of UVA oligomers that are compatible with PVDF fluoropolymers.

Other UV blocking additives may be included in the fluoropolymer surface layer. Small particle non-pigmentary zinc oxide and titanium oxide can also be used as UV blocking additives in the fluoropolymer surface layer. Nanoscale particles of zinc oxide and titanium oxide will reflect, or scatter, UV light while being transparent to visible and near-infrared light. These small zinc oxide and titanium oxide particles that can reflect UV light are available, for example, in the size range of 10-100 nanometers from Kobo Products, Inc., South Plainfield, N.J.

Anti-stat additives may also be useful for incorporation into either the fluoropolymer surface layer or into the optical layers to reduce unwanted attraction of dust, dirt, and debris. Ionic salt anti-stats available from 3M Company may be incorporated into PVDF fluoropolymer layers to provide static dissipation. Anti-stat additives for PMMA and CoPMMA (for example, available under the trade designation "STAT-RITE" from Lubrizol Engineered Polymers, Brecksville, Ohio, or under the trade designation "PELESTAT" from Sanyo Chemical Industries, Tokyo, Japan).

In some embodiments, the outer layer 224 includes a polymer of TFE, HFP, and vinylidene fluoride. In some embodiments, the outer layer 224 includes at least one of: a PE, a polyethylene copolymer, a PMMA, an acrylate copolymer, or a polyurethane.

In some embodiments, the first optical layers 234 include a polymer of TFE, HFP, and vinylidene fluoride and the second optical layers 212 include a polyester (such as polyethylene terephthalate (PET)), or vice versa.

The high emissivity element 220 may include at least two different materials. The absorbance spectra of each material alone may not provide high absorbance throughout the absorptive band. Two materials, however, that have complementary absorbance spectra (described herein in more detail) may cooperatively provide the high emissivity element 220 with high absorbance throughout the absorptive band. For example, a first material may have a transmission peak centered at a wavelength in the absorptive band, which may not radiate enough energy in the atmospheric window region, but a second material may have a complementary absorption peak centered around the same wavelength in the absorptive band.

A transmission peak may be described as a transmittance greater than 10%, or an absorbance of less than 1. An absorption peak may be described as an absorption of at least 1, or a transmittance of at most 10%. Other transmittance or absorbance values, however, which may be described herein, may be used to define thresholds for transmission and absorption peaks. A transmission peak or absorbance peak may exceed the selected threshold in a bandwidth of at least 10 (in some embodiments, at least 20, 30, 40, 50, 75, or even at least 100) nanometers.

In one example, one of the layers in the high emissivity element 220, such as the outer layer 224 or one of the layers of the reflector 222, may include a first material having a minimum absorbance of less than 1 (a transmission peak) located in a third wavelength range contained in the second wavelength range. A different layer in the high emissivity element 220 may include a second material having a minimum absorbance of at least 1 (an absorption peak) in the third wavelength range. The absorption peak of the second material absorbs light that would otherwise pass through the transmission peak of the first material. In this manner, two or more materials may sufficiently absorb most of the light in the 8 to 13 micrometer absorbance band in a complementary manner.

The metal layer 230 may be disposed on the substrate 104 or on the bottom of the film 228. In some embodiments, the metal layer 230 is coated onto substrate 104 or under the film 228. The metal layer 230 may be disposed between substrate 104 and the film 228. The metal layer 230 may reflect light for at least part of the reflective band. In some embodiments, the metal layer 230 has a high average reflectance in the solar region.

In some embodiments, the optical film 228 or the metal layer 230 alone may not provide high reflectance throughout the reflective band. The metal layer 230 and the film 228 may have complementary reflectance spectra and together may provide the high emissivity element 220 with high reflectance throughout the reflective band. For example, the film 228 may be highly reflective in one range of the reflective band and the metal layer 230 may be highly reflective in another range of the reflective band where the film is not highly reflective.

In some embodiments, the film 228 is highly reflective in a lower wavelength range and the metal layer 230 is highly reflective in a higher wavelength range, which is adjacent to the lower wavelength range. In one example, the film 228 is highly reflective in a range from 0.3 to 0.8 micrometer, and the metal layer 230 is highly reflective in a complementary range from 0.8 to 2.5 micrometers. In other words, the high reflective range of the metal layer 230 begins near where highly reflective range of the film 228 ends. Together, the film 228 and the metal layer 230 may provide high reflectivity in a range from 0.4 to 2.5 micrometers.

Alternatively, or in addition to selecting high absorptivity material, the outer layer 224 or the film 228 may include structures that provide high absorptivity in the atmospheric window region, such as inorganic particles. In particular, the structures may be sized appropriately to increase the absorptivity of the high emissivity element 220.

Figure 6:
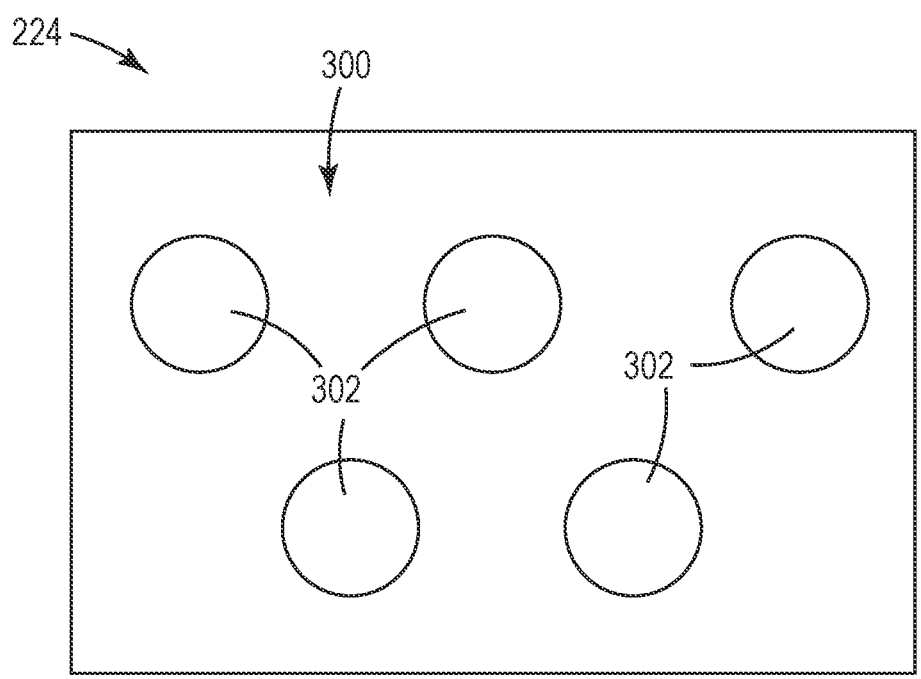
FIG. 6 is a schematic top-down illustration of one example of a surface having a plurality of structures usable with the passive cooling apparatus or system of FIG. 1.

FIG. 6 is a schematic top-down illustration of one example of a surface usable as the surface 300 of outer layer 224 having a plurality of structures 302, which may be selected to improve absorbance or reflectivity. As illustrated, the plurality of structures 302 are disposed in or on the surface of at least one of the layers, such as the outer layer 224. The structures 302 may be dispersed evenly through at least one of the layers, such as the outer layer 224. In some embodiments, the structures 302 may be disposed in or on the surface and be dispersed evenly through at least one of the layers. The arrangement of the structures 302 may be described as an array, which may be two dimensional or three dimensional. In some embodiments, the structures 302 may be described as microstructures or nanostructures depending on the size of at least one dimension (such as a maximum width or diameter).

The structures 302 may include inorganic particles. For example, each structure 302 depicted may correspond to one inorganic particle. The inorganic particles may be dispersed in or disposed on at least one layer.

The structures 302 may include surface structures. The surface structures may be disposed on a surface, such as the surface 300 of the outer layer 224 or a surface of the film 228. In some embodiments, the structures 302 may be integrated into or on the surface 300. For example, the structures 302 when formed as surface structures may be formed by extrusion replication or micro-replication on at least one of the layers, as described in U.S. Provisional App. Ser. No. 62/611,639, which is incorporated herein by reference. The surface structures may or may not be formed of the same material as the at least one layer.

FIGS. 7-10 are schematic illustrations of various examples of surface structures 304, 305, 306, 307 that define first widths 310, 320, 330, 340 and second widths 312, 322, 332, 342, which may be selected to improve absorbance or reflectivity, usable with the passive cooling apparatus 100 (FIG. 1). The first widths 310, 320, 330, 340 may be described as outer widths, and the second widths 312, 322, 332, 342 may be described as base widths. In some embodiments, the surface structures 304, 305, 306, 307 may have an average width in a range of 0.1 to 50 micrometers (for example, between the first widths and the second width), which may facilitate emissivity or absorptivity in the atmospheric window region. The surface structures 304, 305, 306, 307 may each include a sidewall 314, 315, 316, 317 defining each width 310, 312, 320, 322, 330, 332, 340, 342.

Figure 7:
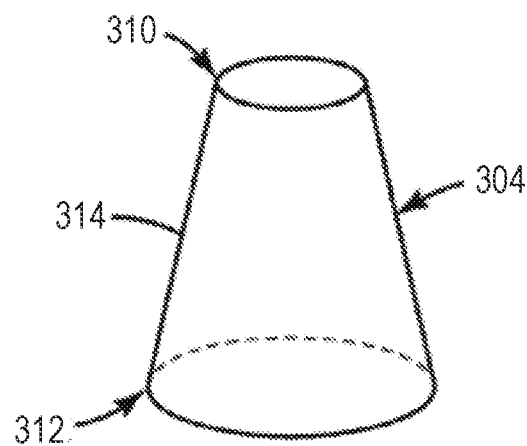
FIGS. 7-10 are schematic illustrations of various examples of surface structures usable with the passive cooling apparatus or system of FIG. 1.
Figure 8:
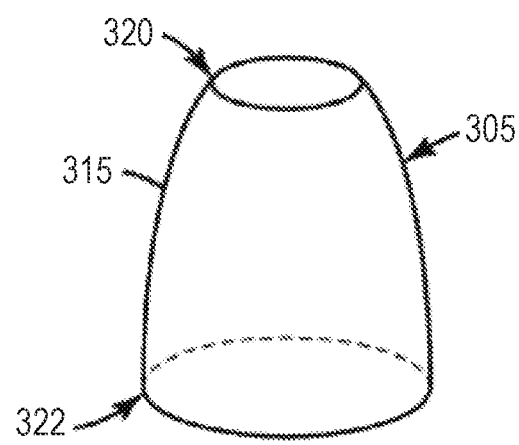
Figure 9:
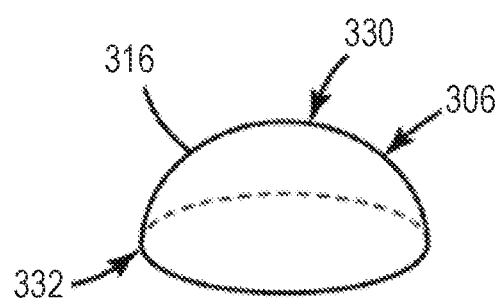
Figure 10:
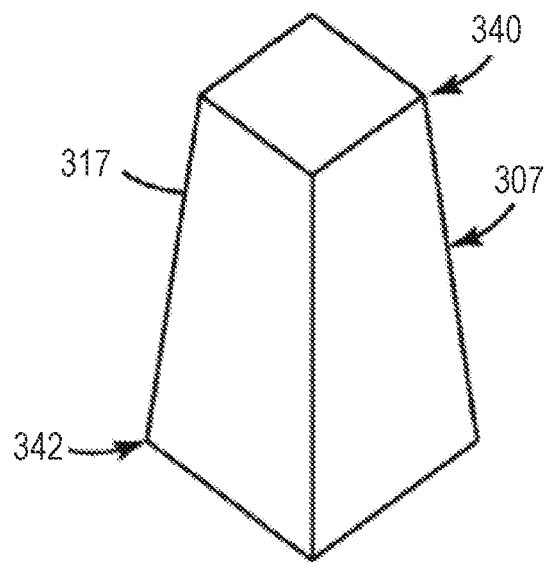

The sidewalls 314, 315, 316, 317 may be formed in various geometries. Some geometries may be particularly suited to certain manufacturing processes. The geometries may be defined by a cross-section extending between the first width 310, 320, 330, 340 and the second width 312, 322, 332, 342. The surface structures 304, 305, 306 may be described as conical or having a cone-like shape. As used herein, the term "width" may refer to a diameter of structure 304, 305, 306, for example, when the cross-section of the structure is circular, oval, or cone-like. In FIG. 7, the cross-section of the sidewall 314 of the surface structure 304 may include at least one straight line between the widths 310, 312. The first width 310 may be smaller than the second width 312 to define a slope. In FIGS. 8-9, the cross-section of the sidewalls 315, 316 of the surface structures 305, 306, respectively, may include at least one curve or arc between the respective first and second widths 320, 322 and 330, 3332. In FIG. 8, the width 320 is non-zero to give a tapered cylindrical shape to the surface structure 305. In FIG. 9, the width 330 is equal to zero to give a hemispherical shape to the surface structure 306. In some embodiments, the surface structure 306 may be spheroid, or even an ellipsoid shape. As can be seen in FIG. 10, the surface structure 307 may be described as a square- or rectangular-shaped post. The cross-section of the sidewall 317 of the surface structure 307 may be include a straight line between the widths 340, 342, as illustrated, or may even include at least one curve or arc between the widths. The sidewall 317 may define a slope, wherein the first width 340 is less than the second width 342, as illustrated, or may even be vertical, wherein the first and second widths are equal.

Each structure 304, 305, 306, 307 may protrude from the surface by a height extending orthogonal to the surface. The width of each structure 304, 305, 306, 307 may be defined orthogonal to the height and parallel to the surface. In some embodiments, each surface structure 304, 305, 306, 307 has an average width of greater than or equal to 0.1 micrometer (in some embodiments, greater than or equal to 1, 3, 5, 7, 8, 9, or even at least 10) micrometers. In some embodiments, each surface structure 304, 305, 306, 307 has an average width of less than or equal to 50 micrometers (in some embodiments, at less than or equal to 45, 40, 35, 30, 25, 20, 15, 14, 13, 12, 11, 10, 9, or even at most 8 micrometers). In some embodiments, each surface structure 304, 305, 306, 307 has an average height of at least 0.5 micrometer (in some embodiments, at least 1, 3, 5, 7, 8, 9, or even at least 10 micrometers). In some embodiments, each surface structure 304, 305, 306, 307 has an average height of at most 50 micrometers (in some embodiments, at most 20, 15, 14, 13, 12, 11, 10, 9, or even at most 8 micrometers).

Figure 11A:
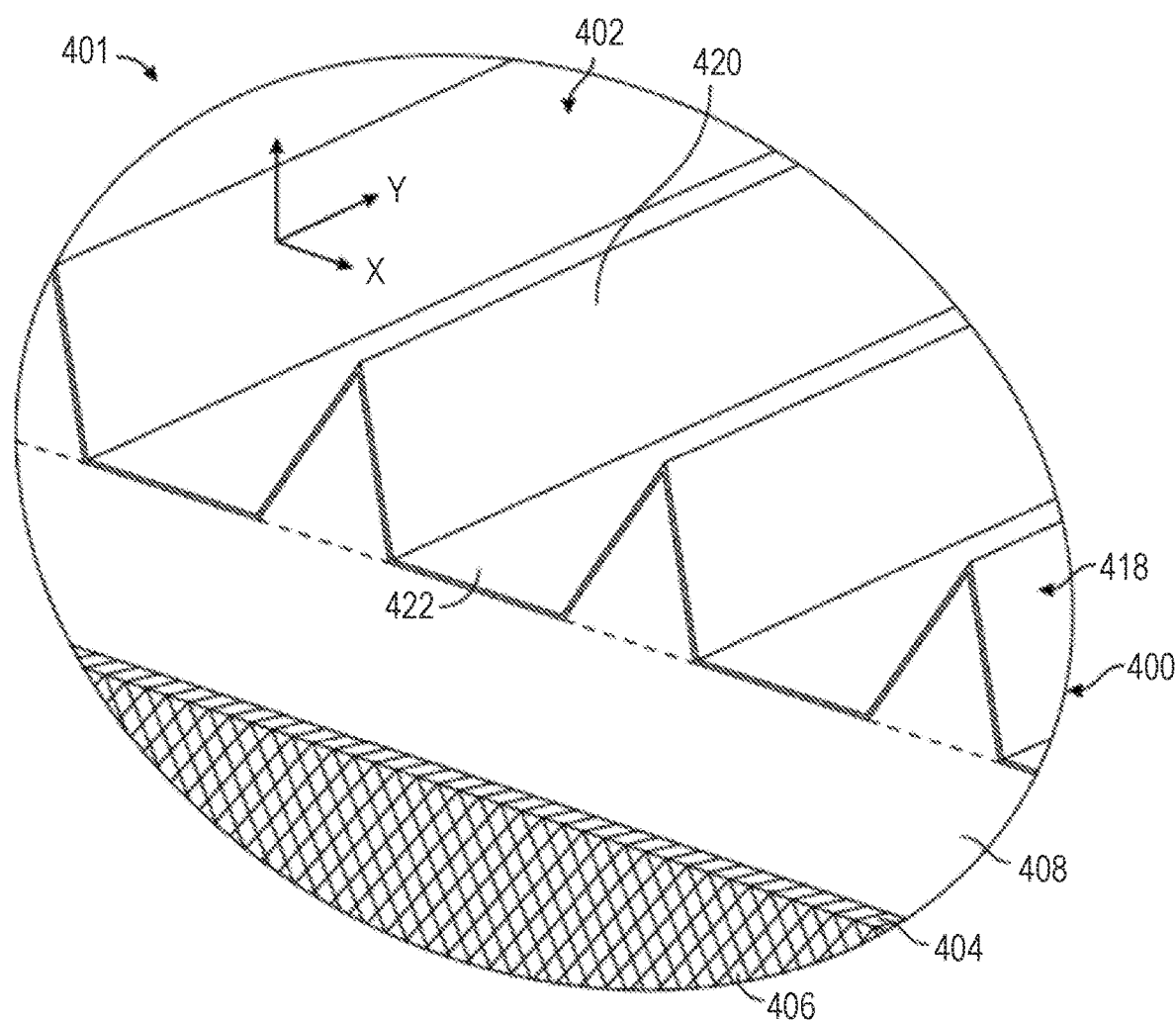
FIGS. 11A, 11B, and 11C are schematic perspective and cross-sectional illustrations of one example of an antisoiling surface structure usable with the passive cooling apparatus or system of FIG. 1.
Figure 11B:
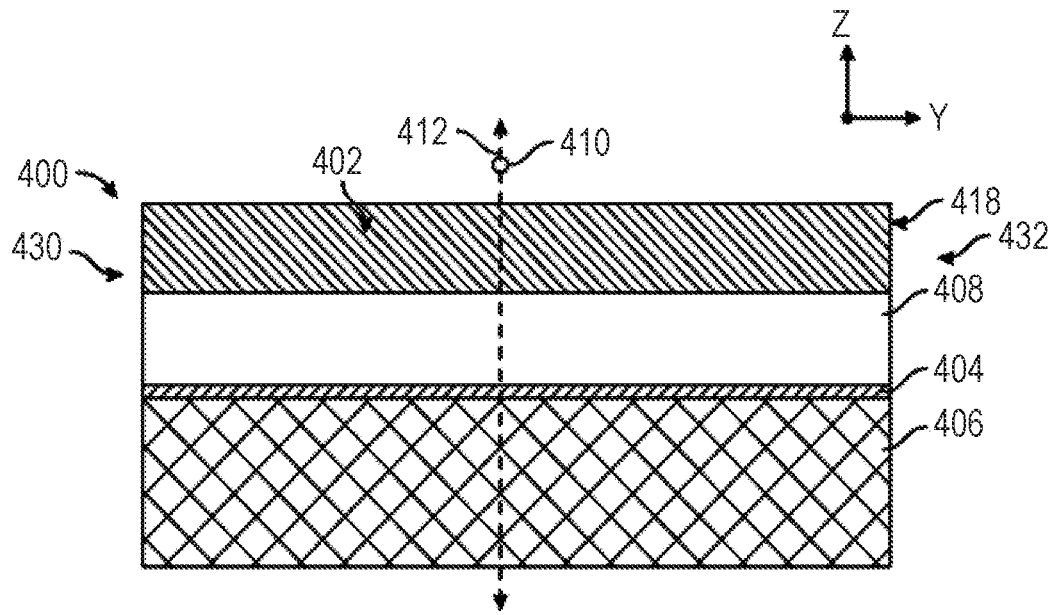

FIGS. 11A-11B show various embodiments related to dirt resistant and antisoiling surfaces that may be used with any articles, such as articles 102, 120, and 180. In some embodiments, the outward facing surface of an element, especially a high emissivity element, may define an antisoiling layer. The antisoiling layer may be defined, for example, by an integral or separately outer layer of an element. The antisoiling surface of the antisoiling layer may be disposed opposite a reflector. The antisoiling layer may be textured so as to be microstructured or nanostructured over some or all of its surface; for example, as described in U.S. Provisional Patent Application No. 62/611,636 and in the resulting PCT International Application Publication No. WO 2019/130198, which are incorporated herein by reference. The use of such microstructuring or nanostructuring for the specific purpose of enhancing antisoiling of a cooling film is discussed in U.S. Provisional Patent Application No. 62/855.392, which is incorporated by reference in its entirety herein.

In some embodiments, the nanostructure may be superimposed on the microstructure on the surface of the antisoiling layer. In some such embodiments, the antisoiling layer has an outer major surface (which may be described as an antisoiling surface) that includes micro-structures or nanostructures. The microstructures may be arranged as a series of alternating micro-peaks and micro-spaces. The size and shape of the micro-spaces between micro-peaks may mitigate the adhesion of dirt particles to the micro-peaks. The nanostructures may be arranged as at least one series of nano-peaks disposed on at least the micro-spaces. The micro-peaks may be more durable to environmental effects than the nano-peaks. Because the micro-peaks are spaced only by a micro-space, and the micro-spaces are significantly taller than the nano-peaks, the micro-peaks may serve to protect the nano-peaks on the surface of the micro-spaces from abrasion.

In reference to the antisoiling layer, the term or prefix "micro" refers to at least one dimension defining a structure or shape being in a range from 1 micrometer to 1 millimeter. For example, a microstructure may have a height or a width that is in a range from 1 micrometer to 1 millimeter.

As used herein, the term or prefix "nano" refers to at least one dimension (or all dimensions) that define a structure or a shape being less than 1 micrometer. For example, a nanostructure may have at least one of a height or a width (or both) that is less than 1 micrometer.

Figure 11C:
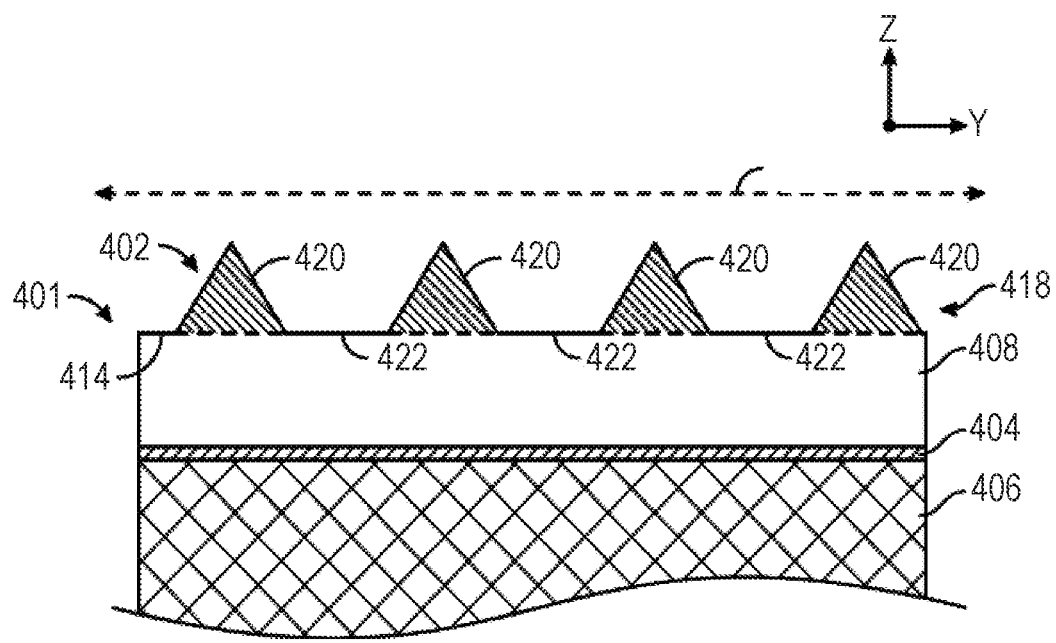

FIGS. 11A, 11B, and 11C are schematic perspective and cross-sectional illustrations of an example of an antisoiling surface structure usable with the passive cooling apparatus 100 (FIG. 1). As illustrated, cross-sections 400, 401 of the antisoiling surface structure are shown as antisoiling layer 408 having antisoiling surface 402 defined by a series of microstructures 418. In particular, FIG. 11A shows a perspective view of the cross section 401 relative to xyz-axes. FIG. 11C shows cross section 401 in an xz-plane parallel to axis 410. FIG. 11B shows cross section 400 in a yz-plane orthogonal to cross section 401 and orthogonal to axis 410. Antisoiling surface 402 is depicted in FIGS. 11A-11C as if antisoiling layer 408 were lying on a flat horizontal surface. Antisoiling layer 408, however, may be flexible and may conform to substrates that are not flat.

In some embodiments, microstructures 418 are formed in antisoiling layer 408. Microstructures 418 and remaining portions of antisoiling layer 408 below the microstructures may be formed of the same material. Antisoiling layer 408 may be formed of any suitable material capable of defining microstructures 418, which may at least partially define antisoiling surface 402. Antisoiling layer 408 may be transparent to various frequencies of light. In at least one embodiment, antisoiling layer 408 may be non-transparent, or even opaque, to various frequencies of light. In some embodiments, Antisoiling layer 408 may include, or be made of, an UV stable material, and/or may include a UV-blocking additive. In some embodiments, antisoiling layer 408 may include a polymer material such as a fluoropolymer or a polyolefin polymer.

Antisoiling surface 402 may extend along axis 410, for example, parallel or substantially parallel to the axis. Plane 412 may contain axis 410, for example, parallel or intersecting such that axis 410 is in plane 412. Both axis 410 and plane 412 may be imaginary constructs used herein to illustrate various features related to antisoiling surface 402. For example, the intersection of plane 412 and antisoiling surface 402 may define line 414 describing a cross-sectional profile of the surface as shown in FIG. 11C that includes micro-peaks 420 and micro-spaces 422 as described herein in more detail. Line 414 may include at least one straight segment or curved segments.

Line 414 may at least partially define series of microstructures 418. microstructures 418 may be three-dimensional (3D) structures disposed on antisoiling layer 408, and line 414 may describe only two dimensions (for example, height and width) of that 3D structure. As can be seen in FIG. 11B, microstructures 418 may have a length that extends along surface 402 from one side 430 to another side 432.

Microstructures 418 may include a series of alternating micro-peaks 420 and micro-spaces 422 along, or in the direction of, axis 410, which may be defined by, or included in, line 414. The direction of axis 410 may coincide with a width dimension. Micro-spaces 422 may each be disposed between pair of micro-peaks 420. In other words, plurality of micro-peaks 420 may be separated from one another by at least one micro-spaces 422. In at least one embodiment, at least one pair of micro-peaks 420 may not include micro-space 422 in-between. Pattern of alternating micro-peaks 420 and micro-spaces 422 may be described as a "skipped tooth riblet" (STR). Each of micro-peaks 420 and micro-spaces 422 may include at least one straight segment or curved segment.

A slope of line 414 (for example, rise over run) may be defined relative to the direction of axis 410 as an x-coordinate (run) and relative to the direction of plane 412 as a y-axis (rise).

A maximum absolute slope may be defined for at least one portion of line 414. As used herein, the term "maximum absolute slope" refers to a maximum value selected from the absolute value of the slopes throughout a particular portion of line 414. For example, the maximum absolute slope of one micro-space 422 may refer to a maximum value selected from calculating the absolute values of the slopes at every point along line 414 defining the micro-space.

A line defined the maximum absolute slope of each micro-space 422 may be used to define an angle relative to axis 410. In some embodiments, the angle corresponding to the maximum absolute slope may be at most 30 degrees (in some embodiments, at most 25, 20, 15, 10, 5, or even at most 1 degree). In some embodiments, the maximum absolute slope of at least some (in some embodiments, all) of micro-peaks 420 may be greater than the maximum absolute slope of at least some (in some embodiments, all) of micro-spaces 422.

In some embodiments, line 414 may include boundary 416 between each adjacent micro-peak 420 and micro-space 422. Boundary 416 may include at least one of straight segment or curved segment. Boundary 416 may be a point along line 414. In some embodiments, boundary 416 may include a bend. The bend may include the intersection of two segments of line 414. The bend may include a point at which line 414 changes direction in a locale (for example, a change in slope between two different straight lines). The bend may also include a point at which line 414 has the sharpest change in direction in a locale (for example, a sharper turn compared to adjacent curved segments). In some embodiments, boundary 416 may include an inflection point. An inflection point may be a point of a line at which the direction of curvature changes.

Figure 12:
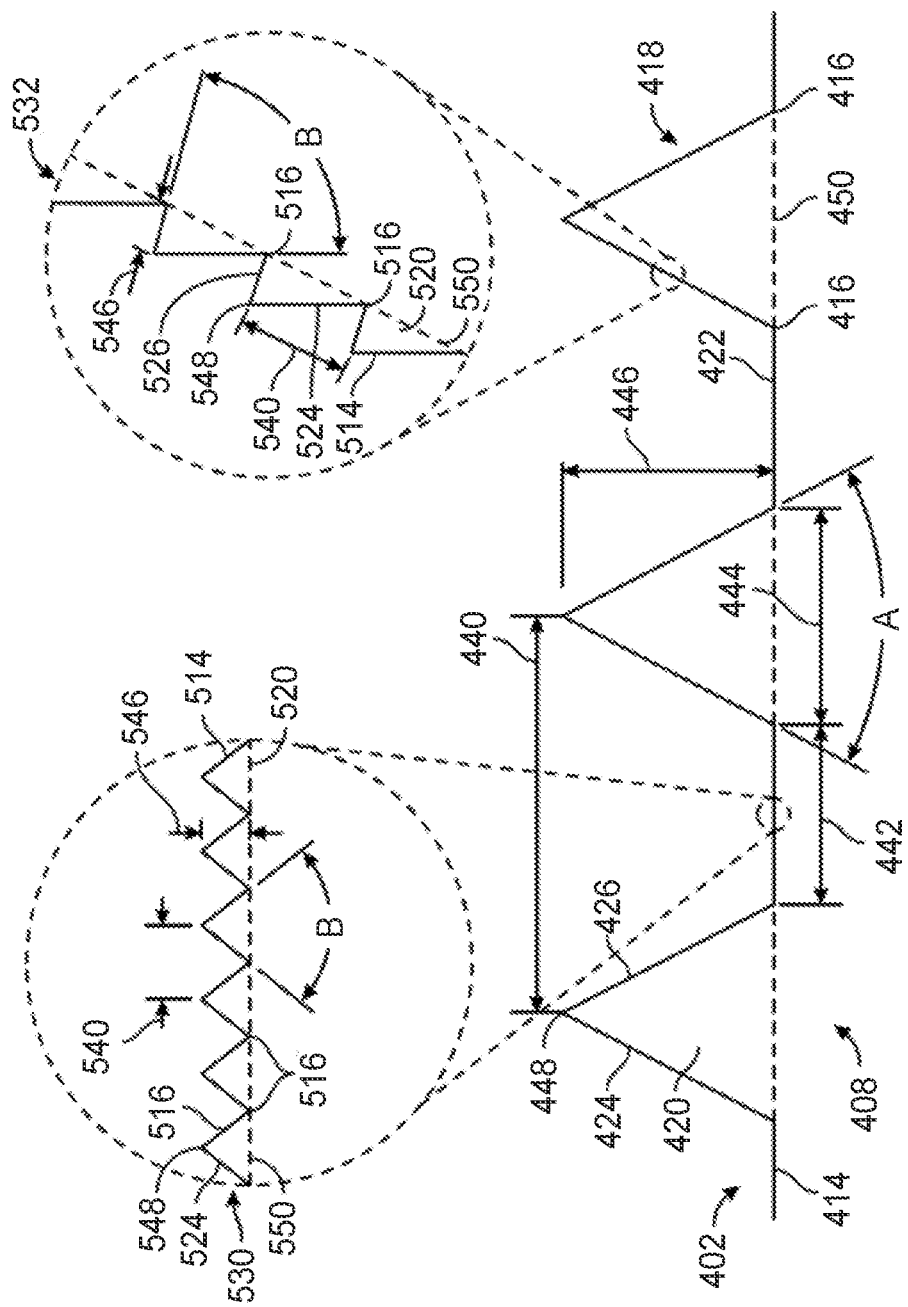
FIG. 12 is a schematic cross-sectional illustration of another example of an antisoiling surface usable with the passive cooling apparatus or system of FIG. 1.

FIG. 12 is a schematic cross-sectional illustration of another example of an antisoiling surface usable with the passive cooling apparatus 100 (FIG. 1). As illustrated, antisoiling surface 402 of antisoiling layer 408 has nanostructures 530, 532 visible in two magnified overlays. At least one micro-peak 420 may include at least one first micro-segment 424 or at least one second micro-segment 426. Micro-segments 424, 426 may be disposed on opposite sides of apex 448 of micro-peak 420. Apex 448 may be, for example, the highest point or local maxima of line 414. Each micro-segment 424, 426 may include at least one: straight segment or curved segment.

Line 414 defining first and second micro-segments 424, 426 may have a first average slope and a second average slope, respectively. The slopes may be defined relative to baseline 450 as an x-axis (run), wherein an orthogonal direction is the z-axis (rise).

As used herein, the term "average slope" refers to an average slope throughout a particular portion of a line. In some embodiments, the average slope of first micro-segment 424 may refer to the slope between the endpoints of the first micro-segment. In some embodiments, the average slope of first micro-segment 424 may refer to an average value calculated from the slopes measured at multiple points along the first micro-segment.

In general, the micro-peak first average slope may be defined as positive and the micro-peak second average slope may be defined as negative. In other words, the first average slope and the second average slope have opposite signs. In some embodiments, the absolute value of the micro-peak first average slope may be equal to the absolute value of the micro-peak second average slope. In some embodiments, the absolute values may be different. In some embodiments, the absolute value of each average slope of micro-segments 424, 426 may be greater than the absolute value of the average slope of micro-space 422.

Angle A of micro-peaks 420 may be defined between the micro-peak first and second average slopes. In other words, the first and second average slopes may be calculated and then an angle between those calculated lines may be determined. For purposes of illustration, angle A is shown as relating to first and second micro-segments 424, 426. In some embodiments, however, when the first and second micro-segments are not straight lines, the angle A may not necessarily be equal to the angle between two micro-segments 424, 426.

Angle A may be in a range to provide sufficient antisoiling properties for surface 402. In some embodiments, angle A may be at most 120 degrees (in some embodiments, at most 110, 100, 95, 90, 85, 80, 75, 70, 65, 60, 55, 50, 45, 40, 35, 30, 25, 20, or even at most 10 degrees). In some embodiments, angle A is at most 85 degrees (in some embodiments, at most 75 degrees). In some embodiments, angle A is, at the low end, at least 30 degrees (in some embodiments, at least 25, 40, 45, or even at least 50 degrees). In some embodiments, angle A is, at the high end, at most 75 degrees (in some embodiments, at most 60, or even at most 55 degrees).

Micro-peaks 420 may be any suitable shape capable of providing angle A based on the average slopes of micro-segments 424, 426. In some embodiments, micro-peaks 420 are generally formed in the shape of a triangle. In some embodiments, micro-peaks 420 are not in the shape of a triangle. The shape may be symmetrical across a z-axis intersecting apex 448. In some embodiments, the shape may be asymmetrical.

Each micro-space 422 may define micro-space width 242. Micro-space width 442 may be defined as a distance between corresponding boundaries 416, which may be between adjacent micro-peaks 420.

A minimum for micro-space width 442 may be defined in terms of micrometers. In some embodiments, micro-space width 442 may be at least 10 micrometers (in some embodiments, at least 20, 25, 30, 40, 50, 60, 70, 75, 80, 90, 100, 150, 200, or even at least 250 micrometers). In some applications, micro-space width 442 is, at the low end, at least 50 micrometers (in some embodiments, at least 60 or 70 micrometers). In some applications, micro-space width 442 is, at the high end, at most 90 micrometers (in some embodiments, at most 80 or 70 micrometers). In some applications, micro-space width 442 is 70 micrometers.

As used herein, the term "peak distance" refers to the distance between consecutive peaks, or between the closest pair of peaks, measured at each apex or highest point of the peak.

Micro-space width 442 may also be defined relative to micro-peak distance 440. In particular, a minimum for micro-space width 442 may be defined relative to corresponding micro-peak distance 440, which may refer to the distance between the closest pair of micro-peaks 420 surrounding micro-space 422 measured at each apex 448 of the micro-peaks. In some embodiments, micro-space width 442 may be at least 10% (in some embodiments, at least 20, 25, 30, 40, 50, 60, 70, 80, or even at least 90%) of the maximum for micro-peak distance 440. In some embodiments, the minimum for micro-space width 442 is, at the low end, at least 30% (in some embodiments, at least 40%) of the maximum for micro-peak distance 440. In some embodiments, the minimum for micro-space width 442 is, at the high end, at most 60% (in some embodiments, at most 50%) of the maximum for micro-peak distance 440. In some embodiments, micro-space width 442 is 45% of micro-peak distance 440.

A minimum the micro-peak distance 440 may be defined in terms of micrometers. In some embodiments, micro-peak distance 440 may be at least 1 micrometer (in some embodiments, at least 2, 3, 4, 5, 10, 25, 50, 75, 100, 150, 200, 250, or even at least 500 micrometers). In some embodiments, micro-peak distance 440 is at least 100 micrometers.

A maximum for micro-peak distance 440 may be defined in terms of micrometers. Micro-peak distance 440 may be at most 1000 micrometers (in some embodiments, at most 900, 800, 700, 600, 500, 400, 300, 250, 200, 150, 100, or even at most 50 micrometers). In some embodiments, micro-peak distance 440 is, at the high end, at most 200 micrometers. In some embodiments, micro-peak distance 440 is, at the low end, at least 100 micrometers. In some embodiments, micro-peak distance 440 is 150 micrometers.

Each micro-peak 420 may define micro-peak height 446. Micro-peak height 446 may be defined as a distance between baseline 550 and apex 448 of micro-peak 420. A minimum may be defined for micro-peak height 446 in terms of micrometers. In some embodiments, micro-peak height 446 may be at least 10 micrometers (in some embodiments, at least 20, 25, 30, 40, 50, 60, 70, 80, 90, 100, 150, 200, or even at least 250 micrometers). In some embodiments, micro-peak height 446 is at least 60 micrometers (in some embodiments, at least 70 micrometers). In some embodiments, micro-peak height 446 is 80 micrometers.

Plurality of nanostructures 530, 532 may be defined at least partially by line 414. Plurality of nanostructures 530 may be disposed on at least one or micro-space 422. In particular, line 514 defining nanostructures 530 may include at least one series of nano-peaks 520 disposed on at least one micro-space 422. In some embodiments, at least one series of nano-peaks 520 of plurality of nanostructures 532 may also be disposed on at least one micro-peak 420.

Due to at least their difference in size, microstructures 418 may be more durable than nanostructures 530, 532 in terms of abrasion resistance. In some embodiments, plurality of nanostructures 532 are disposed only on micro-spaces 422 or at least not disposed proximate to or adjacent to apex 448 of micro-peaks 420.

Each nano-peak 520 may include at least one of first nano-segment 524 and second nano-segment 526. Each nano-peak 520 may include both nano-segments 524, 526. Nano-segments 524, 526 may be disposed on opposite sides of apex 548 of nano-peak 520.

First and second nano-segments 524, 526 may define a first average slope and a second average slope, respectively, which describe line 514 defining the nano-segment. For nanostructures 530, 532, the slope of line 514 may be defined relative to baseline 550 as an x-axis (run), wherein an orthogonal direction is the z-axis (rise).

In general, the nano-peak first average slope may be defined as positive and the nano-peak second average slope may be defined as negative, or vice versa. In other words, the first average slope and the second average slope at least have opposite signs. In some embodiments, the absolute value of the nano-peak first average slope may be equal to the absolute value of the nano-peak second average slope (for example, nanostructures 530). In some embodiments, the absolute values may be different (for example, nanostructures 532).

Angle B of nano-peaks 520 may be defined between lines defined by the nano-peak first and second average slopes. Similar to angle A, angle B as shown is for purposes of illustration and may not necessarily equal to any directly measured angle between nano-segments 524, 526.

Angle B may be a range to provide sufficient antisoiling properties for surface 402. In some embodiments, angle B may be at most 120 degrees (in some embodiments, at most 110, 100, 90, 85, 80, 75, 70, 65, 60, 55, 50, 45, 40, 35, 30, 25, 20, or even at most 10 degrees). In some embodiments, angle B is, at the high end, at most 85 degrees (in some embodiments, at most 80, or even at most 75 degrees). In some embodiments, angle B is, at the low end, at least 55 degrees (in some embodiments, at least 60, or even at least 65 degrees). In some embodiments, angle B is 70 degrees.

Angle B may be the same or different for each nano-peak 520. For example, in some embodiments, angle B for nano-peaks 520 on micro-peaks 420 may be different than angle B for nano-peaks 520 on micro-spaces 422.

Nano-peaks 520 may be any suitable shape capable of providing angle B based on lines defined by the average slopes of nano-segments 524, 526. In some embodiments, nano-peaks 520 are generally formed in the shape of a triangle. In at least one embodiment, nano-peaks 520 are not in the shape of a triangle. The shape may be symmetrical across apex 548. For example, nano-peaks 520 of nanostructures 530 disposed on micro-spaces 422 may be symmetrical. In at least one embodiment, the shape may be asymmetrical. For example, nano-peaks 520 of nanostructures 532 disposed on micro-peaks 420 may be asymmetrical with one nano-segment 524 being longer than another nano-segment 526. In some embodiments, nano-peaks 520 may be formed with no undercutting.

Each nano-peak 520 may define nano-peak height 546. Nano-peak height 546 may be defined as a distance between baseline 550 and apex 548 of nano-peak 520. A minimum may be defined for nano-peak height 546 in terms of nanometers. In some embodiments, nano-peak height 546 may be at least 10 nanometers (in some embodiments, at least 50, 75, 100, 120, 140, 150, 160, 180, 200, 250, or even at least 500 nanometers).

In some embodiments, nano-peak height 546 is at most 250 nanometers (in some embodiments, at most 200 nanometers), particularly for nanostructures 530 on micro-spaces 422. In some embodiments, nano-peak height 546 is in a range from 100 to 250 nanometers (in some embodiments, 160 to 200 nanometers). In some embodiments, nano-peak height 546 is 180 nanometers.

In some embodiments, nano-peak height 546 is at most 160 nanometers (in some embodiments, at most 140 nanometers), particularly for nanostructures 532 on micro-peaks 420. In some embodiments, nano-peak height 546 is in a range from 75 to 160 nanometers (in some embodiments, 100 to 140 nanometers). In some embodiments, nano-peak height 546 is 120 nanometers.

As used herein, the terms "corresponding micro-peak" or "corresponding micro-peaks" refer to micro-peak 420 upon which nano-peak 520 is disposed or, if the nano-peak is disposed on corresponding micro-space 422, refers to one or both of the closest micro-peaks that surround that micro-space. In other words, micro-peaks 420 that correspond to micro-space 422 refer to the micro-peaks in the series of micro-peaks that precede and succeed the micro-space.

Nano-peak height 546 may also be defined relative to micro-peak height 446 of corresponding micro-peak 420. In some embodiments, corresponding micro-peak height 446 may be at least 10 times (in some embodiments, at least 50, 100, 150, 200, 300, 400, 500, 600, 700, 800, 900, or even at least 1000 times) the nano-peak height 546. In some embodiments, corresponding micro-peak height 446 is, at the low end, at least 300 times (in some embodiments, at least 400, 500, or even at least 600 times) the nano-peak height 546. In some embodiments, corresponding micro-peak height 446 is, at the high end, at most 900 times (in some embodiments, at most 800, or even at most 700 times) the nano-peak height 546.

Nano-peak distance 540 may be defined between nano-peaks 520. A maximum for nano-peak distance 540 may be defined. In some embodiments, nano-peak distance 540 may be at most 1000 nanometers (in some embodiments, at most 750, 700, 600, 500, 400, 300, 250, 200, 150, or even at most 100 nanometers). In some embodiments, nano-peak distance 540 is at most 400 nanometers (in some embodiments, at most 300 nanometers).

A minimum for the nano-peak distance 540 may be defined. In some embodiments, nano-peak distance 540 may be at least 1 nanometer (in some embodiments, at least 5, 10, 25, 50, 75, 100, 150, 200, 250, 300, 350, 400, 450, or even at least 500 nanometers). In some embodiments, nano-peak distance 540 is at least 150 (in some embodiments, at least 200 nanometers).

In some embodiments, the nano-peak distance 540 is in a range from 150 to 400 nanometers (in some embodiments, 200 to 300 nanometers). In some embodiments, the nano-peak distance 540 is 250 nanometers.

Nano-peak distance 540 may be defined relative to the micro-peak distance 440 between corresponding micro-peaks 420. In some embodiments, corresponding micro-peak distance 440 is at least 10 times (in some embodiments, at least 50, 100, 200, 300, 400, 500, 600, 700, 800, 900, or even at least 1000 times) the nano-peak distance 540. In some embodiments, corresponding micro-peak distance 440 is, at the low end, at least 200 times (in some embodiments, at least 300) the nano-peak distance 540. In some embodiments, corresponding micro-peak distance 440 is, at the high end, at most 500 times (in some embodiments, at most 400 times) the nano-peak distance 540.

In some embodiments of forming the antisoiling surface, a method may include extruding a hot melt material (for example, a suitable fluoropolymer). The extruded material may be shaped with a micro-replication tool. The micro-replication tool may include a mirror image of a series of microstructures, which may form the series of microstructures on the surface of antisoiling layer. The series of microstructures may include a series of alternating micro-peaks and micro-spaces along an axis. A plurality of nanostructures may be formed on the surface of the layer on at least the micro-spaces. The plurality of nano-peaks may include at least one series of nano-peaks along the axis.

In some embodiments, the plurality nanostructures may be formed by exposing the surface to reactive ion etching. For example, masking elements may be used to define the nano-peaks.

In some embodiments, the plurality of nanostructures may be formed by shaping the extruded material with the micro-replication tool further having an ion-etched diamond. This method may involve providing a diamond tool wherein at least a portion of the tool includes a plurality of tips, wherein the pitch of the tips may be less than 1 micrometer, and cutting a substrate with the diamond tool, wherein the diamond tool may be moved in and out along a direction at a pitch (p1). The diamond tool may have a maximum cutter width (p2) and $$\frac{p_1}{p_2} \geq 2.$$

The nanostructures may be characterized as being embedded within the microstructured surface of the antisoiling layer. Except for the portion of the nanostructure exposed to air, the shape of the nanostructure may generally be defined by the adjacent microstructured material.

A microstructured surface layer including nanostructures can be formed by use of a multi-tipped diamond tool. Diamond Turning Machines (DTM) can be used to generate micro-replication tools for creating antisoiling surface structures including nanostructures as described in U.S. Pat. Appl. Publ. No. 2013/0236697 (Walker et al.), which is incorporated herein by reference. A microstructured surface further including nanostructures can be formed by use of a multi-tipped diamond tool, which may have a single radius, wherein the plurality of tips has a pitch of less than 1 micrometer. Such multi-tipped diamond tool may also be referred to as a "nanostructured diamond tool." Hence, a microstructured surface wherein the microstructures further include nanostructures can be concurrently formed during diamond tooling fabrication of the microstructured tool. Focused ion beam milling processes can be used to form the tips and may also be used to form the valley of the diamond tool. For example, focused ion beam milling can be used to ensure that inner surfaces of the tips meet along a common axis to form a bottom of valley. Focused ion beam milling can be used to form features in the valley, such as concave or convex arc ellipses, parabolas, mathematically defined surface patterns, or random or pseudo-random patterns. A wide variety of other shapes of valley can also be formed. Examples of diamond turning machines and methods for creating discontinuous, or non-uniform, surface structures can include and utilize a fast tool servo (FTS) as described in, for example, PCT Pub. No. WO 00/48037, published Aug. 17, 2000; U.S. Pat. No. 7,350,442 (Ehnes et al.) and U.S. Pat. No. 7,328,638 (Gardiner et al.); and U.S. Pat. Pub. No. 2009/0147361 (Gardiner et al.), which are incorporated herein by reference.

In some embodiments, the plurality of nanostructures may be formed by shaping the extruded material, or antisoiling layer, with the micro-replication tool further having a nano-structured granular plating for embossing. Electrodeposition, or more specifically electrochemical deposition, can also be used to generate various surface structures including nanostructures to form a micro-replication tool. The tool may be made using a 2-part electroplating process, wherein a first electroplating procedure may form a first metal layer with a first major surface, and a second electroplating procedure may form a second metal layer on the first metal layer. The second metal layer may have a second major surface with a smaller average roughness than that of the first major surface. The second major surface can function as the structured surface of the tool. A replica of this surface can then be made in a major surface of an optical film to provide light diffusing properties. One example of an electrochemical deposition technique is described in PCT Pub. No. WO 2018/130926 (Derks et al.), which is incorporated herein by reference.

Figure 13:
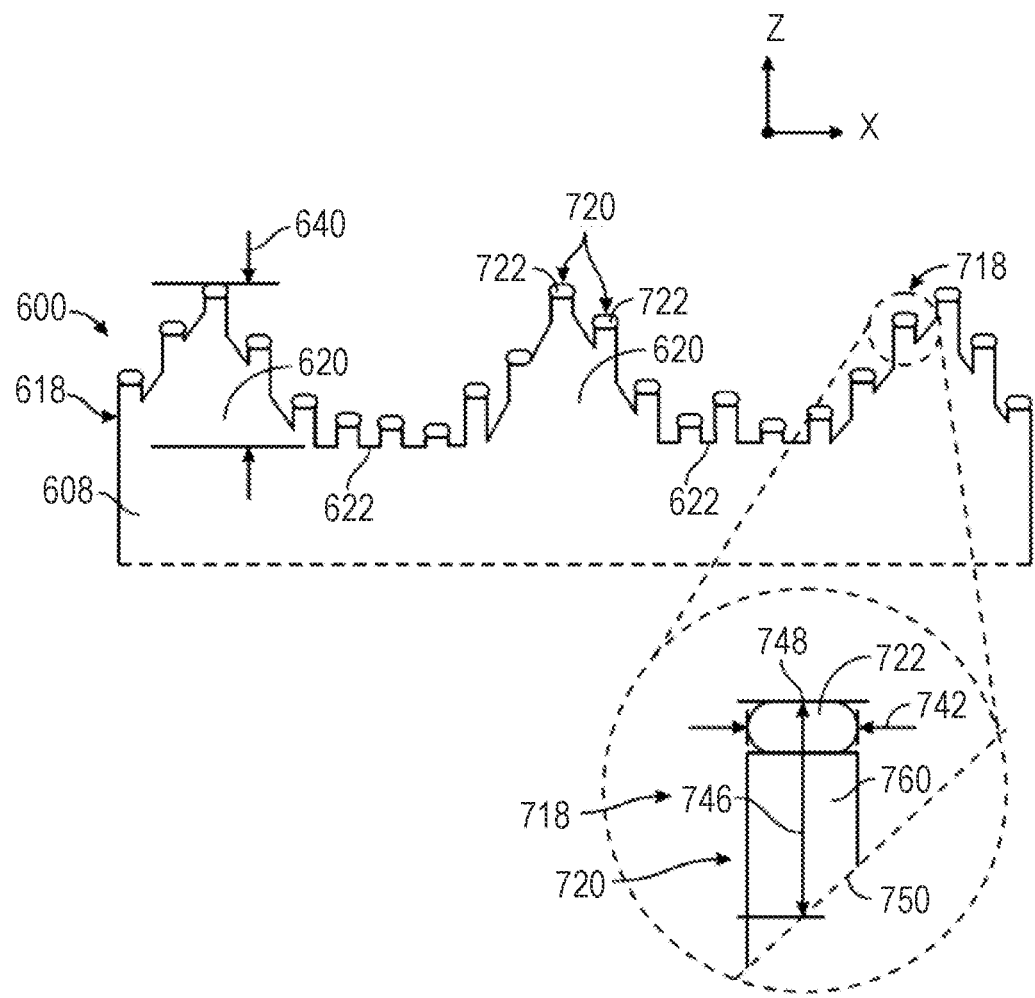
FIG. 13 is a schematic cross-sectional illustration of yet another example of an antisoiling surface usable with the passive cooling apparatus or system of FIG. 1.

FIG. 13 is a schematic cross-sectional illustration of yet another example of an antisoiling surface usable with the passive cooling apparatus 100 (FIG. 1). As illustrated, cross section 600 of antisoiling layer 608 has antisoiling surface 602. Antisoiling surface 602 may be similar to antisoiling surface 402, for example, in that microstructures 418, 618 of antisoiling layer 408, 608 may have the same or similar dimensions and may also form a skipped tooth riblet pattern of alternating micro-peaks 620 and micro-spaces 622. Antisoiling surface 602 differs from surface 402 in that, for example, nanostructures 720 may include nanosized masking elements 722.

Nanostructures 720 may be formed using masking elements 722. For example, masking elements 722 may be used in a subtractive manufacturing process, such as reactive ion etching (RIE), to form nanostructures 720 of surface 602 having microstructures 618. A method of making a nanostructure and nanostructured articles may involve depositing a layer to a major surface of a substrate, such as antisoiling layer 408, by plasma chemical vapor deposition from a gaseous mixture while substantially simultaneously etching the surface with a reactive species. The method may include providing a substrate, mixing a first gaseous species capable of depositing a layer onto the substrate when formed into a plasma, with a second gaseous species capable of etching the substrate when formed into a plasma, thereby forming a gaseous mixture. The method may include forming the gaseous mixture into a plasma and exposing a surface of the substrate to the plasma, wherein the surface may be etched, and a layer may be deposited on at least a portion of the etched surface substantially simultaneously, thereby forming the nano structure.

The substrate can be a (co)polymeric material, an inorganic material, an alloy, a solid solution, or a combination thereof The deposited layer can include the reaction product of plasma chemical vapor deposition using a reactant gas including a compound selected from the group consisting of organosilicon compounds, metal alkyl compounds, metal isopropoxide compounds, metal acetylacetonate compounds, metal halide compounds, and combinations thereof Nanostructures of high aspect ratio, and optionally with random dimensions in at least one dimension, and even in three orthogonal dimensions, can be prepared.

In some embodiments of a method of antisoiling layer 608 having a series of microstructures 618 disposed on antisoiling surface 602 of the layer may be provided. The series of microstructures 618 may include a series of alternating micro-peaks 620 and micro-spaces 622.

A series of nanosized masking elements 722 may be disposed on at least micro-spaces 622. Antisoiling surface 602 of antisoiling layer 608 may be exposed to reactive ion etching to form plurality of nanostructures 718 on the surface of the layer including series of nano-peaks 720. Each nano-peak 720 may include masking element 722 and column 760 of layer material between masking element 722 and layer 608.

Masking element 722 may be formed of any suitable material more resistant to the effects of RIE than the material of antisoiling layer 608. In some embodiments, masking element 722 includes an inorganic material. Non-limiting examples of inorganic materials include silica and silicon dioxide. In some embodiments, the masking element 722 is hydrophilic. Non-limiting examples of hydrophilic materials include silica and silicon dioxide.

As used herein, the term "maximum diameter" refers to a longest dimension based on a straight line passing through an element having any shape.

Masking elements 722 may be nanosized. Each masking element 722 may define maximum diameter 742. In some embodiments, the maximum diameter of masking element 722 may be at most 1000 nanometers (in some embodiments, at most 750, 500, 400, 300, 250, 200, 150, or even at most 100 nanometers).

Maximum diameter 742 of each masking element 722 may be described relative to micro-peak height 640 of corresponding micro-peak 620. In some embodiments, corresponding micro-peak height 640 is at least 10 times (in some embodiments, at least 25, 50, 100, 200, 250, 300, 400, 500, 750, or even at least 1000 times) maximum diameter 742 of masking element 722.

Each nano-peak 720 may define height 746. Height 746 may be defined between baseline 750 and the apex 748 of masking element 722.

Figure 14A:
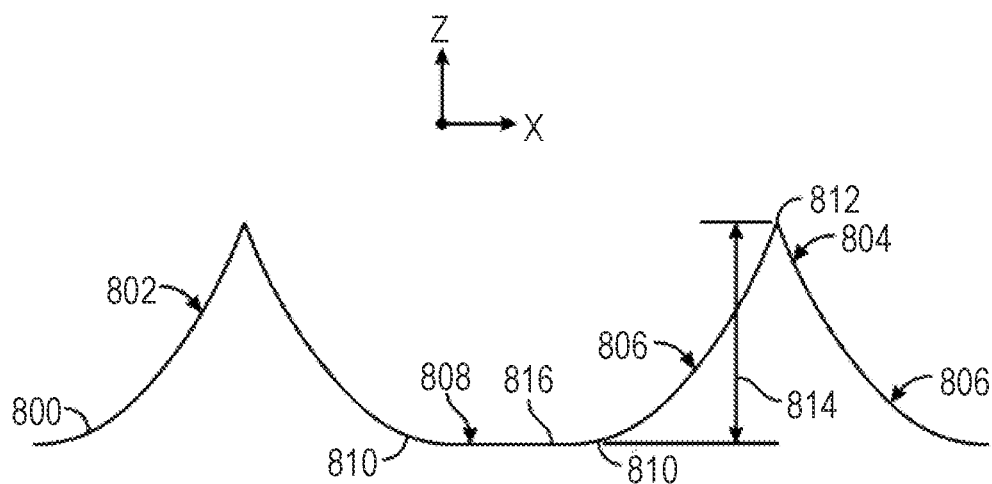
FIGS. 14A-B are schematic cross-sectional illustrations of various examples of surface structures usable with the passive cooling apparatus or system of FIG. 1.
Figure 14B:
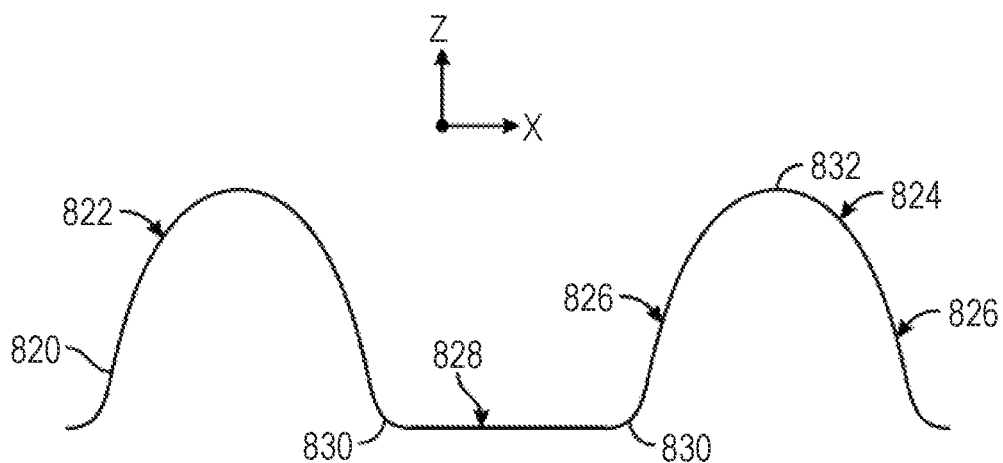

FIGS. 14A-B are schematic cross-sectional illustrations of various examples of surface structures usable with the passive cooling apparatus 100 (FIG. 1). As illustrated, lines 800 and 820 represent the cross-sectional profile of different forms of peaks 802, 822, which may be micro-peaks of microstructures or nano-peaks of nanostructures, for any of the antisoiling surfaces, such as surfaces 402, 602. As mentioned, structures do not need to be strictly in the shape of a triangle.

Line 800 shows that first portion 804 (top portion) of peak 802, including apex 812, may have a generally triangular shape, whereas adjacent side portions 806 may be curved. In some embodiments, as illustrated, side portions 806 of peak 802 may not have a sharper turn as it transitions into space 808. Boundary 810 between side portion 806 of peak 802 and space 808 may be defined by a threshold slope of line 800 as discussed herein, for example, with respect to FIGS. 11A-11C and 12.

Space 808 may also be defined in terms of height relative to height 814 of peak 802. Height 814 of peak 802 may be defined between one of boundaries 810 and apex 812. Height of space 808 may be defined between bottom 816, or lowest point of space 808, and one of boundaries 810. In some embodiments, the height of space 808 may be at most 40% (in some embodiments, at most 30, 25, 20, 15, 10, 5, 4, 3, or even at most 2%) of height 814 of peak 802. In some embodiments, the height of space 808 is at most 10% (in some embodiments, at most 5, 4, 3, or even at most 2%) of height 814 of peak 802.

Line 820 shows that first portion 824 (top portion) of peak 820, including the apex, may have a generally rounded shape without a sharp turn between adjacent side portions 826. Apex 832 may be defined as the highest point of structure 820, for example, where the slope changes from positive to negative. Although first portion 824 (top portion) may be rounded at apex 832, peak 820 may still define an angle, such as angle A (see FIG. 12), between first and second average slopes.

Boundary 830 between side portion 826 of peak 820 and space 828 may be defined, for example, by a sharper turn. Boundary 830 may also be defined by slope or relative height, as discussed herein.

As shown in FIGS. 15 to 18, the antisoiling surface may be discontinuous, intermittent, or non-uniform. For example, the antisoiling surface may also be described as including micro-pyramids with micro-spaces surrounding the micro-pyramids (see FIGS. 15 and 18).

Figure 15:
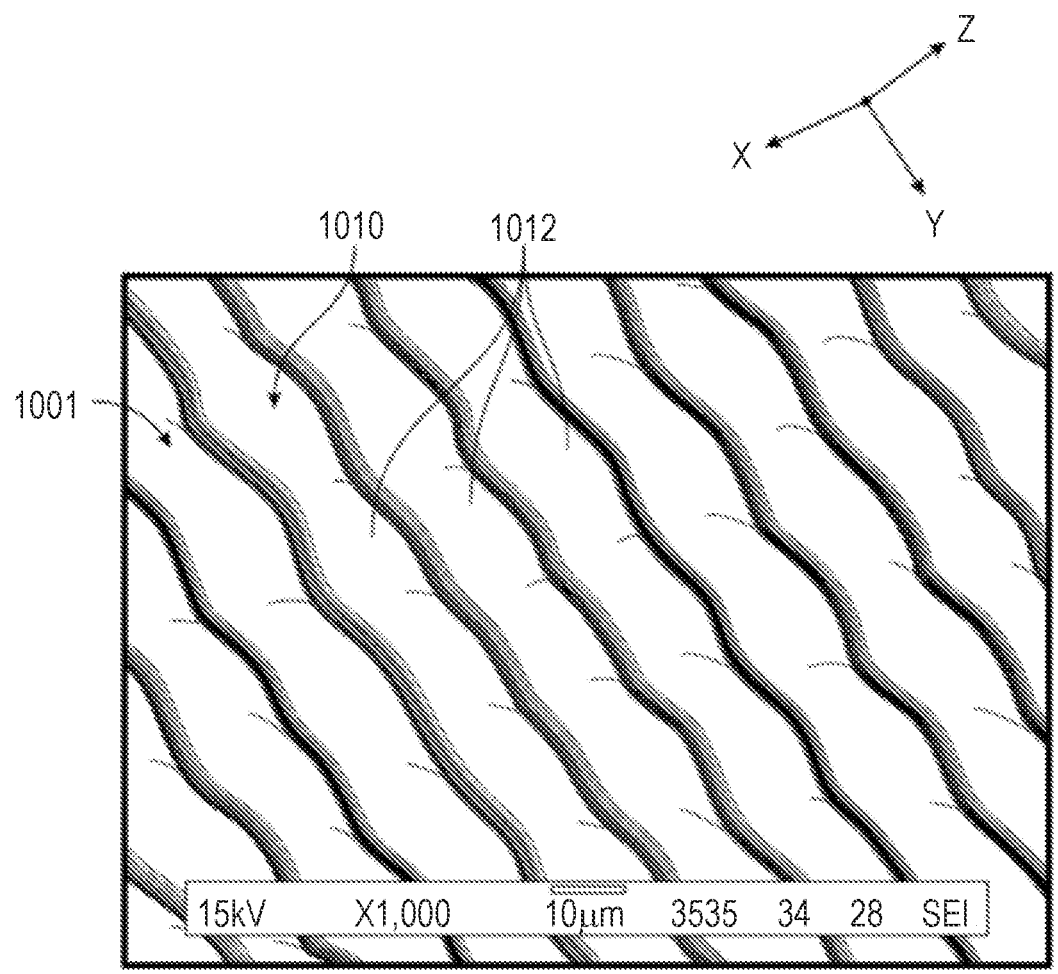
FIG. 15 is a schematic perspective illustration of one example of a further antisoiling surface usable with the passive cooling apparatus or system of FIG. 1.

FIG. 15 is a schematic perspective illustration of one example of a further antisoiling surface usable with the passive cooling apparatus 100 (FIG. 1). As illustrated, first antisoiling surface 1001 is defined at least partially by non-uniform microstructures 1210. For example, if antisoiling surface 1000 were viewed in the yz-plane (similar to FIG. 11B), at least one micro-peak 1012 may have a non-uniform height from the left side to the right side of the view, which can be contrasted to FIG. 11B showing micro-peak 420 having a uniform height from the left side to the right side of the view. In particular, micro-peaks 1012 defined by the microstructures 1010 may be non-uniform in at least one of height or shape. The micro-peaks 1012 are spaced by micro-spaces (not shown in this perspective view), similar to other surfaces described herein, such as micro-space 422 of surface 402 (FIGS. 11A and 11C).

Figure 16:
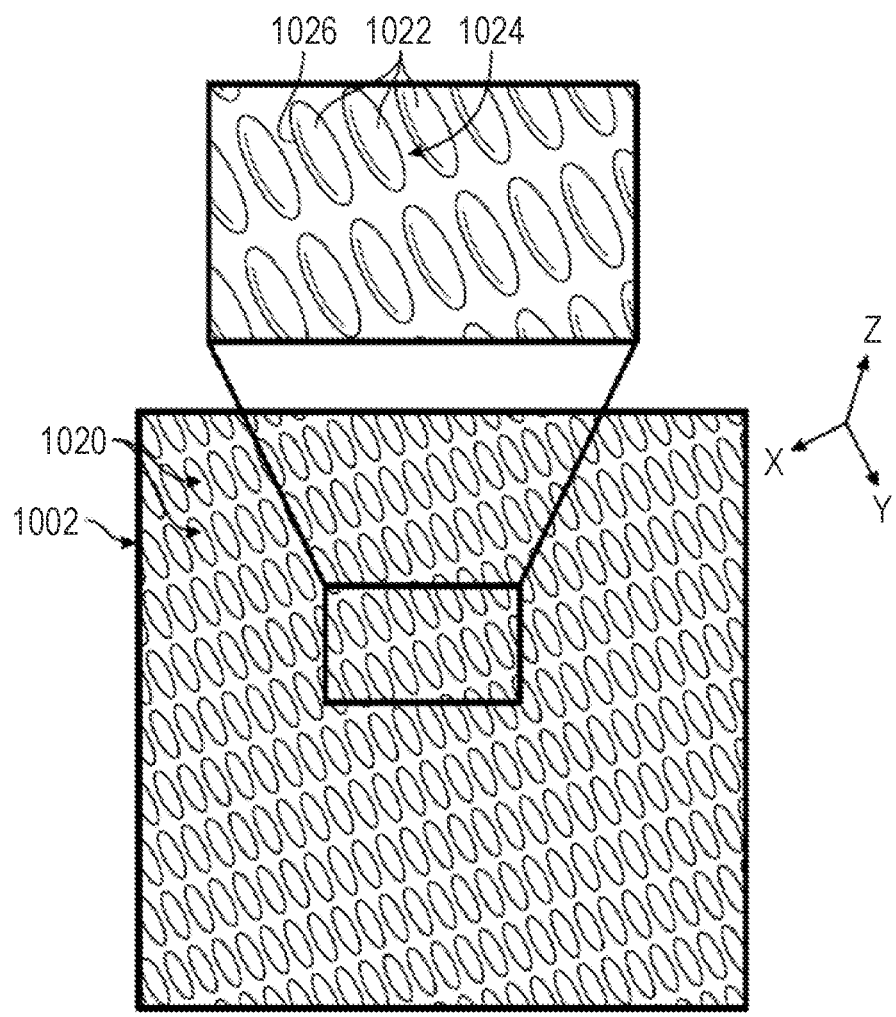
FIG. 16 is a schematic top-down of still another antisoiling surface usable with the passive cooling apparatus or system of FIG. 1.

FIG. 16 is a schematic top-down of still another antisoiling surface usable with the passive cooling apparatus 100 (FIG. 1). As illustrated, second antisoiling surface 1002 has discontinuous microstructures 1020. For example, if second antisoiling surface 1002 were viewed on the yz-plane (similar to FIG. 11B), more than one nano-peak 1022 may be shown spaced by microstructures 1020, which can be contrasted to FIG. 11B showing micro-peak 420 extending continuously from the left side to the right side of the view. In particular, micro-peaks 1022 of microstructures 1020 may be surrounded by micro-spaces 1024. Micro-peaks 1022 may each have a half dome-like shape. For example, the half dome-like shape may be a hemisphere, a half ovoid, a half-prolate spheroid, or a half-oblate spheroid. Edge 1026 of the base of each micro-peak 1022, extending around each micro-peak, may be a rounded shape (for example, a circle, an oval, or a rounded rectangle). The shape of the micro-peaks 1022 may be uniform, as depicted in the illustrated embodiment, or can be non-uniform.

Figure 17:
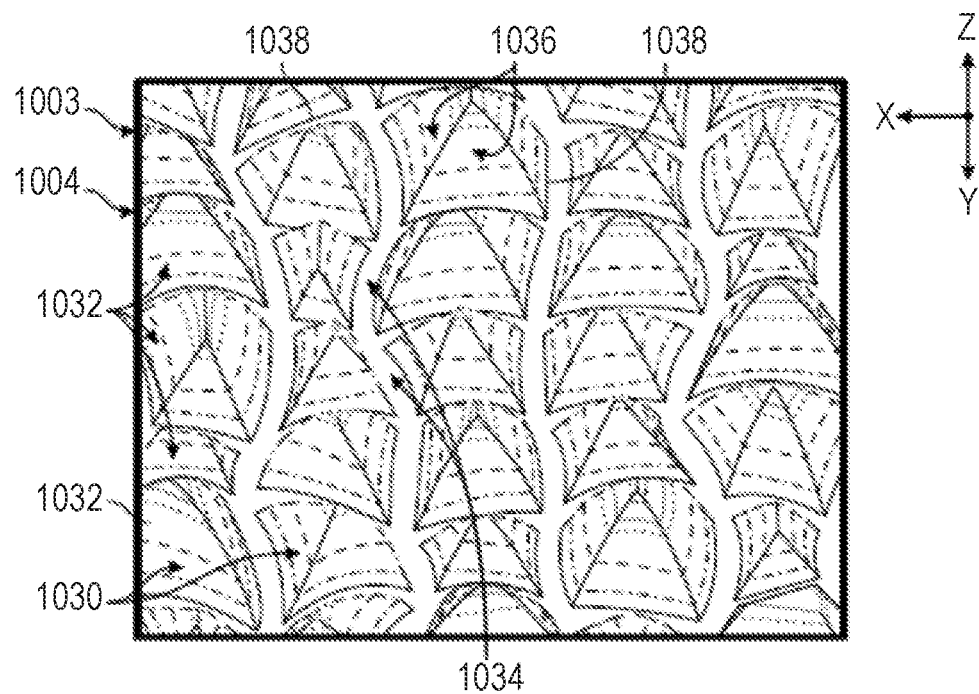
FIGS. 17 and 18 are schematic perspective illustrations of yet another antisoiling surface usable with the passing cooling apparatus or system of FIG. 1.
Figure 18:
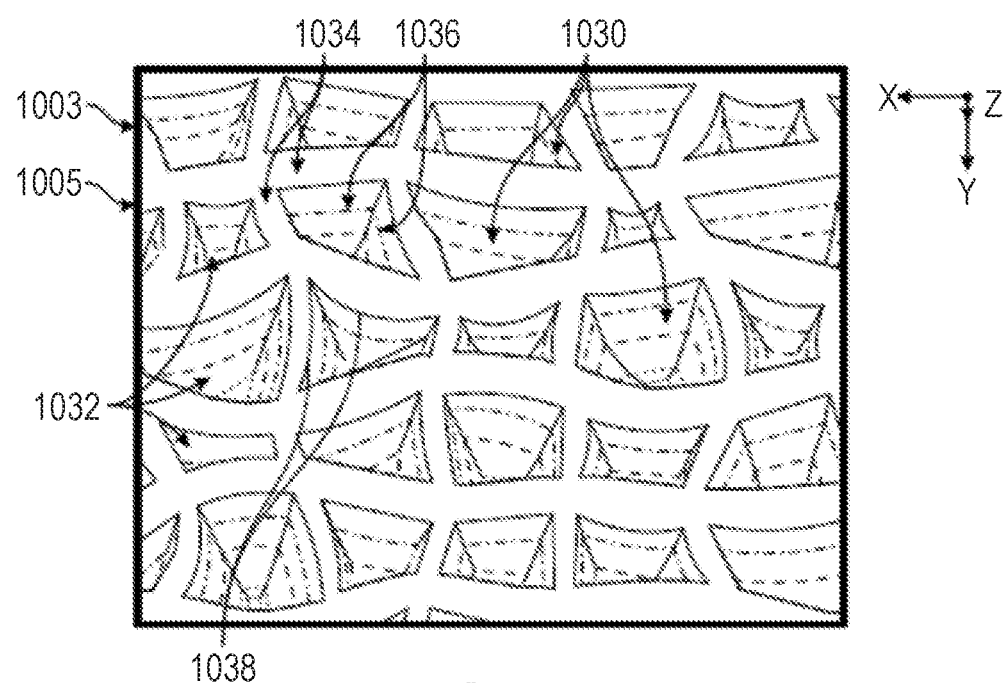

FIGS. 17 and 18 are schematic perspective illustrations of yet another antisoiling surface usable with the passing cooling apparatus 100 (FIG. 1). First portion 1004 (FIG. 17) and second portion 1005 (FIG. 18) of third antisoiling surface 1003 have discontinuous microstructures 1030. The FIG. 17 view shows more of a "front" side of the microstructures 1030 close to a 45-degree angle, whereas the FIG. 18 view shows some of a "back" side of the microstructures closer to an overhead angle.

Micro-peaks 1032 of microstructures 1030 surrounded by micro-spaces 1034 may have a pyramid-like shape (for example, micro-pyramids). For example, the pyramid-like shape may be a rectangular pyramid or a triangular pyramid. Sides 1036 of the pyramid-like shape may be non-uniform in shape or area, as depicted in the illustrated embodiment, or can be uniform in shape or area. Edges 1038 of the pyramid-like shape may be non-linear, as depicted in the illustrated embodiment, or can be linear. The overall volume of each micro-peak 1032 may be non-uniform, as depicted in the illustrated embodiment, or can be uniform.

The above detailed discussions make it clear that if desired, the antisoiling surface of the antisoiling layer may be textured, for example, microstructured or nanostructured, to enhance its antisoiling properties. In general, the texturing may be achieved in any suitable manner, whether for example, achieved by molding or embossing the surface against an appropriate tooling surface, or by removal of material from an existing surface for example, by reactive ion etching, laser ablation, and so on. In some approaches, the antisoiling layer may include inorganic particles of an appropriate size and/or shape to provide the desired surface texture. In some embodiments, any such particles may be for example, deposited onto surface and adhered thereto. In other embodiments, any such particles may be incorporated (for example, admixed) into the material from which the antisoiling layer is to be formed, with the layer then being formed in a way that allows the presence of the particles within the layer to cause the antisoiling surface to exhibit corresponding texture. In some embodiments the presence of such particles may cause the surface of the antisoiling layer to exhibit texture in the layer as made. In other embodiments, such particles may cause texture to form for example, upon organic polymeric material being removed from the surface of the antisoiling layer (for example, by reactive ion etching) while the inorganic particles remain in place, as noted earlier herein. In a variation of such approaches, an inorganic material may be deposited onto a major surface of the antisoiling layer for example, by plasma deposition, concurrent with an organic material removal (for example, reactive ion etching) process, to achieve similar affects. Such arrangements are discussed in U.S. Pat. No. 10,134,566, which is incorporated herein by reference.

With the above being described, FIGS. 19-22 are schematic cross-sectional illustrations of various particular examples of articles according to the present disclosure.

Figure 19:
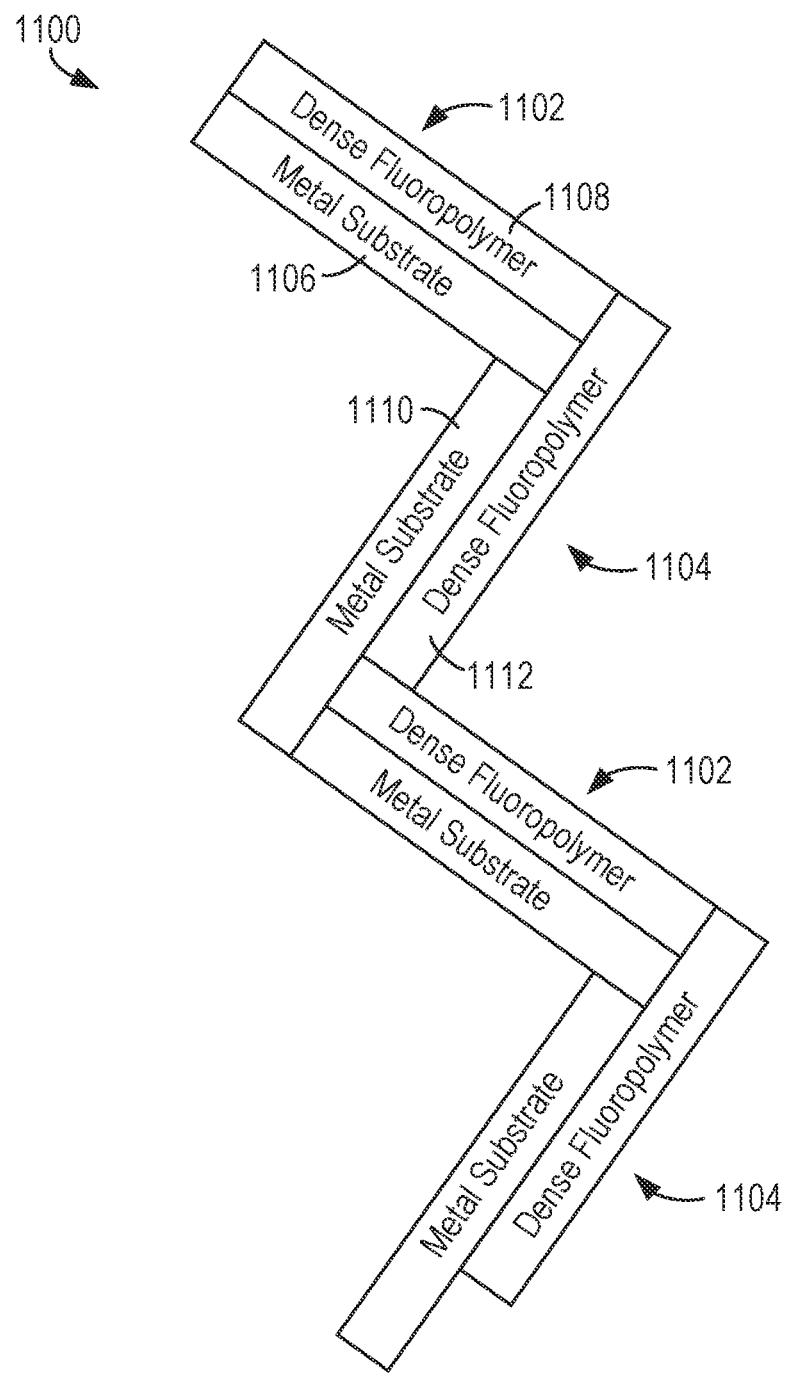
FIGS. 19-22 are schematic cross-sectional illustrations of various particular examples of passive cooling articles usable with the passing cooling apparatus or system of FIG. 1.

FIG. 19 is a schematic illustration one example of the article 120 of FIG. 2. In the illustrated embodiment, the article 1100 includes a plurality of first elements 1102 and a plurality of second elements 1104. The plurality of first elements 1102 include first supporting layers 1106 and first outer layers 1108 at least partially, or entirely, covering the respective first supporting layers. The plurality of second elements 1104 include second supporting layers 1110 and second outer layers 1112 at least partially, or entirely, covering the respective second supporting layers.

The first outer layers 1108 may be at least partially formed of, or include, a dense fluoropolymer (without micropores or micro-voids) to at least partially, or entirely, define high absorbance in the atmospheric window region. The second outer layers 1112 may be at least partially formed of, or include, a dense polyethylene (without micropores or micro-voids) to at least partially, or entirely, define low absorbance in the atmospheric window region. The first and second supporting layers 1106, 1110 may be formed of an integral piece of material, such as a metal. The metal supporting layers 1106, 1110 may at least partially, or entirely, define high average reflectance in the solar region for the respective elements 1102, 1104.

Figure 20:
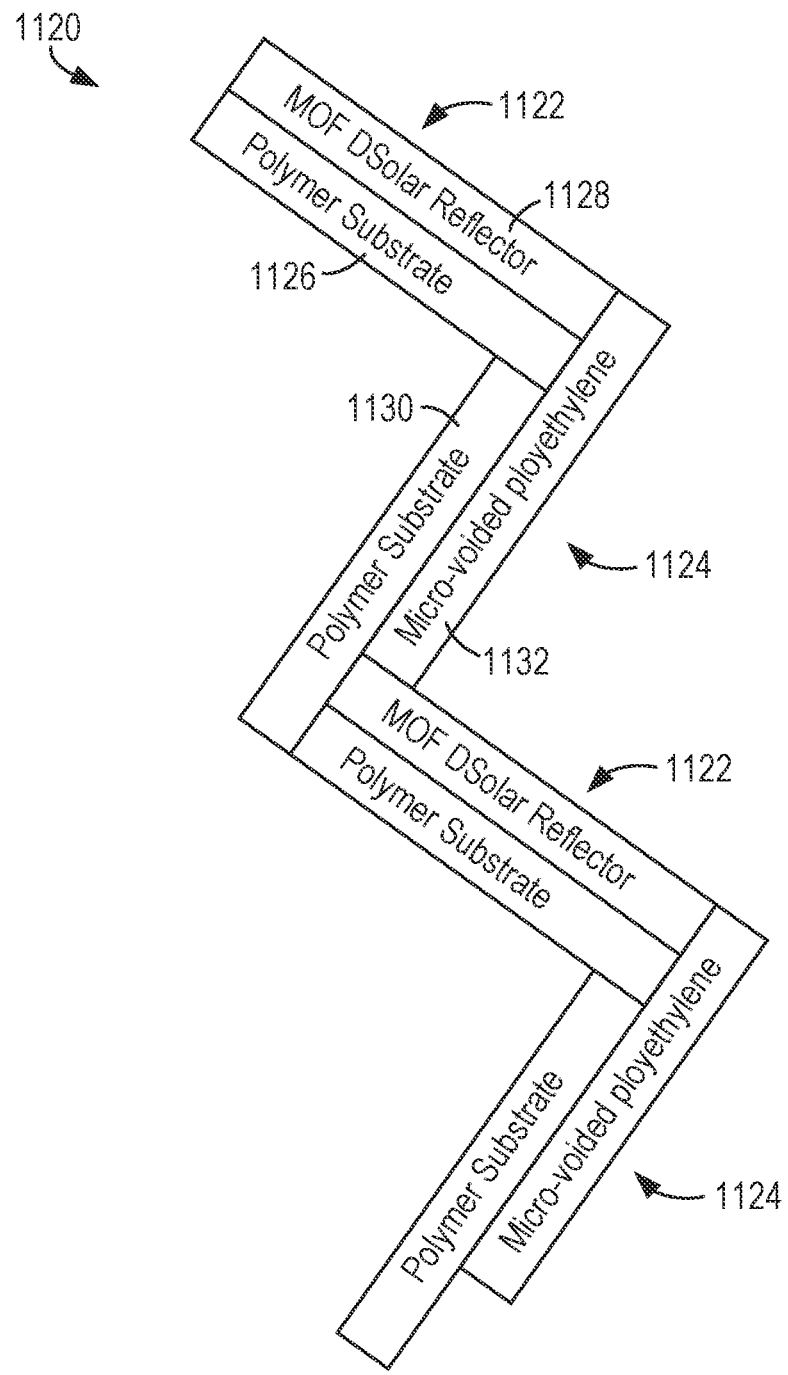

FIG. 20 is a schematic illustration one example of the article 120 of FIG. 2. In the illustrated embodiment, the article 1120 includes a plurality of first elements 1122 and a plurality of second elements 1124. The plurality of first elements 1122 include first supporting layers 1126 and first outer layers 1128 at least partially, or entirely, covering the respective first supporting layers. The plurality of second elements 1124 include second supporting layers 1130 and second outer layers 1132 at least partially, or entirely, covering the respective second supporting layers.

The first outer layers 1128 may include a multilayer optical film, which may be described as a solar reflector, and which at least partially, or entirely, define high average reflectance in the solar region and high absorbance in the atmospheric window region. The second outer layers 1132 may be at least partially formed of, or include, a microporous polyethylene, which may be a micro-voided polyethylene, to at least partially, or entirely, define high average reflectance in the solar region and low absorbance in the atmospheric window region. The first and second supporting layers 1126, 1130 may be formed of a polymer.

Figure 21:
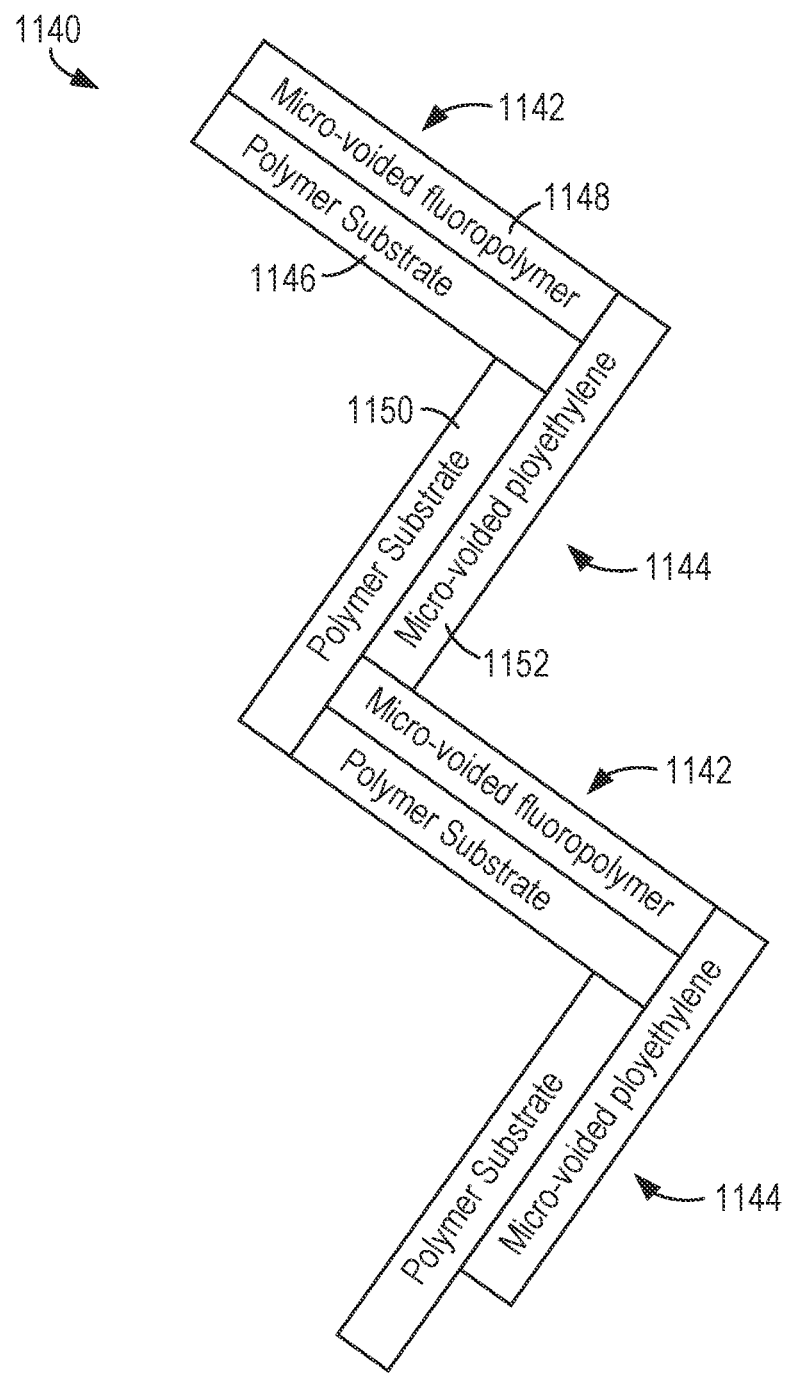

FIG. 21 is a schematic illustration one example of the article 120 of FIG. 2. In the illustrated embodiment, the article 1140 includes a plurality of first elements 1142 and a plurality of second elements 1144. The plurality of first elements 1142 include first supporting layers 1146 and first outer layers 1148 at least partially, or entirely, covering the respective first supporting layers. The plurality of second elements 1144 include second supporting layers 1150 and second outer layers 1152 at least partially, or entirely, covering the respective second supporting layers.

The first outer layers 1148 may be at least partially formed of, or include, a microporous fluoropolymer, which may be a micro-voided fluoropolymer, which at least partially, or entirely, define high average reflectance in the solar region and high absorbance in the atmospheric window region. The second outer layers 1152 may be at least partially formed of, or include, a microporous polyethylene, which may be a micro-voided polyethylene, to at least partially, or entirely, define high average reflectance in the solar region and low absorbance in the atmospheric window region. The first and second supporting layers 1146, 1150 may be formed of a polymer.

Figure 22:
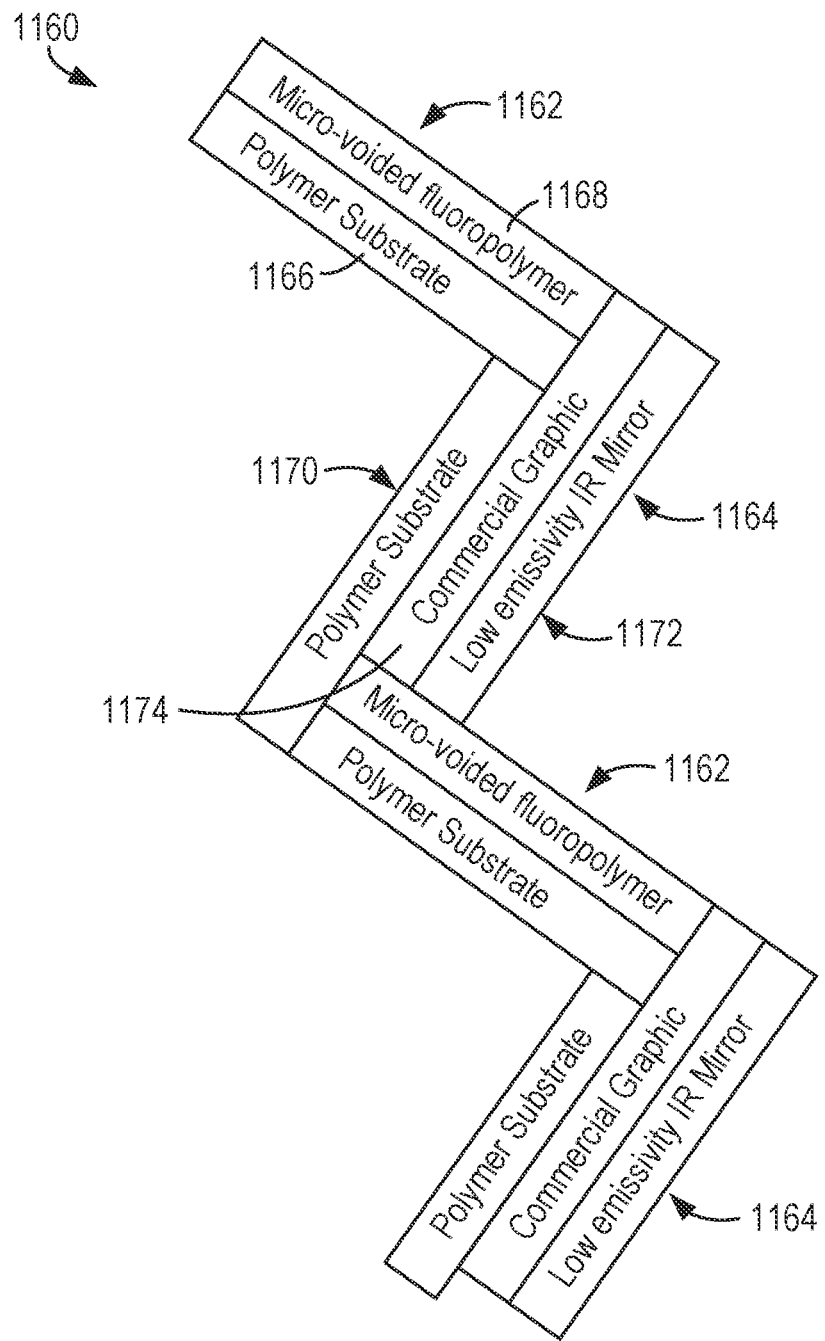

FIG. 22 is a schematic illustration of one example of the article 120 of FIG. 2. In the illustrated embodiment, the article 1160 includes a plurality of first elements 1162 and a plurality of second elements 1164. The plurality of first elements 1162 include first supporting layers 1166 and first outer layers 1168 at least partially, or entirely, covering the respective first supporting layers. The plurality of second elements 1164 include second supporting layers 1170 and second outer layers 1172 at least partially, or entirely, covering the respective second supporting layers.

The plurality of second elements 1164 also include graphic layers 1174. The graphic layers 1174 may be defined as being included in the second supporting layers 1170 or the second outer layers 1172.

The first outer layers 1168 may be at least partially formed of, or include, a polymer layer, such as a dense fluoropolymer to at least partially define high absorbance in the atmospheric window region, a microporous fluoropolymer (which may be a micro-voided fluoropolymer) to at least partially, or entirely, define high average reflectance in the solar region and high absorbance in the atmospheric window region, or a multilayer optical film to at least partially, or entirely, define high average reflectance in the solar region and high absorbance in the atmospheric window region. The second outer layers 1172 may be at least partially formed of, or include, a low emissivity infrared mirror film to at least partially, or entirely, define high average reflectance in the solar region and in the atmospheric window region and low absorbance in at least the atmospheric window region (and optionally low absorbance in the near-infrared region). The graphic layers 1174 may include any suitable material to support a printed material, such as a PVC or polyethylene copolymer, which may optionally at least partially define low absorbance in the atmospheric window region. The first and second supporting layers 1166, 1170 may be formed of a polymer.

Illustrative Embodiments

With various features being described, various illustrative combinations are also described to further illustrate various combinations that are useful in certain applications, some of which are described herein.

A1. A passive cooling article comprising:
a plurality of first elements defining first element outer surfaces, the plurality of first elements defining a first absorbance of greater than or equal to 0.6 (in some embodiments, greater than or equal to 0.7, 0.8, 0.9, or even 1) in an atmospheric window wavelength range from 8 to 13 micrometers and defining a first average reflectance of greater than or equal to 80% (in some embodiments, greater than or equal to 90%) in a solar wavelength range from 0.4 to 2.5 micrometers (in some embodiments, from 0.3 to 3.5 micrometers); and
a plurality of second elements defining second element outer surfaces, the plurality of second elements defining a second absorbance of less than or equal to 0.5 (in some embodiments, less than or equal to 0.4, 0.3, 0.2, or even 0.1; generally lower than the first absorbance) in the atmospheric window wavelength range and defining a second average reflectance of greater than or equal to 60% (in some embodiments, greater than or equal to 80% or even 90%) in the solar wavelength range;
wherein the plurality of first elements and the plurality of second elements are interspersed to form a major structure having a first major surface comprising the first element outer surfaces and the second element outer surfaces and a second major surface opposing the first major surface;

wherein the major structure has a first end region and a second end region, wherein the first element outer surfaces face a first direction toward the first end region and the second element outer surfaces face a second direction toward the second end region.

A2. The article of Embodiment A1, wherein the plurality of first elements defines the first absorbance in a mid-infrared wavelength range from 4 to 20 micrometers (in some embodiments, to cool a substrate above air temperature).

A3. The article of Embodiment A1 or A2, wherein a first vector normal to at least a portion of the first element outer surfaces defines an interelement angle with a second vector normal to at least a portion of the second element outer surfaces, wherein the interelement angle is greater than or equal to 15 degrees and less than or equal to 165 degrees (in some embodiments, greater than or equal to 45, 60, 90, or 120 degrees or less than or equal to 135, 120, 90, or 60 degrees).

A4. The article of Embodiment A3, wherein a major surface vector normal to at least a portion of the second major surface defines a first element angle with the first vector, wherein the first element angle is greater than or equal to 15 degrees and less than or equal to 75 degrees.

A5. The article of Embodiment A4, wherein the major surface vector defines a second element angle with the second vector, wherein the second element angle is greater than or equal to 15 degrees and less than or equal to 75 degrees.

A6. The article of any preceding A Embodiment, wherein the plurality of first elements comprises one or more of the following: a dense fluoropolymer layer, a microporous (or micro-voided) fluoropolymer layer, a dense polyester layer at least partially (or entirely) covered by a dense fluoropolymer layer, a microporous (or micro-voided) polyester layer at least partially (or entirely) covered by a dense fluoropolymer layer, a multilayer optical film at least partially (or entirely) defining the first reflectance in the solar wavelength range, and a metal layer at least partially (or entirely) defining the first reflectance in the solar wavelength range.

A7. The article of any preceding A Embodiment, wherein the plurality of second elements comprises one or more of the following: a dense polyethylene layer, a dense polyethylene copolymer layer, a microporous (or micro-voided) polyethylene layer, a microporous (or micro-voided) polyethylene copolymer layer, a fluoropolymer layer defining a thickness less than or equal to 10 micrometers, a coating comprising metal, an infrared mirror film at least partially (or entirely) defining the second absorbance in the atmospheric window wavelength range, a graphic layer at least partially (or entirely) defining the second absorbance in the atmospheric window wavelength range, a graphic layer at least partially (or entirely) covered by an infrared mirror film at least partially (or entirely) defining the second absorbance in the atmospheric window wavelength range, and a metal layer at least partially (or entirely) defining the first reflectance in the solar wavelength range.

A8. The article of Embodiment A7, wherein the graphic layer comprises one or more of the following: a polyvinyl chloride layer, a polyethylene copolymer layer, a microporous (or micro-voided) polyethylene copolymer layer, and a microporous (or micro-voided) polyethylene at least partially (or entirely) covered by a dense polyethylene copolymer layer.

A9. The article of any one of Embodiments A1 to A5, wherein at least some of the plurality of first elements comprises first supporting layers and first outer layers, the first outer layers at least partially (or entirely) defining the first absorbance and at least partially (or entirely) covering an outer surface of the first supporting layers to at least partially (or entirely) define the first element outer surfaces, wherein at least some of the plurality of second elements comprises second supporting layers and second outer layers, the second outer layers at least partially (or entirely) defining the second absorbance and at least partially (or entirely) covering an outer surface of the second supporting layers to at least partially (or entirely) define the second element outer surfaces.

A10. The article of Embodiment A9, wherein the first supporting layers, the second supporting layers, or both comprise reflectors defining the respective average reflectances.

A11. The article of Embodiment A10, wherein at least some of the reflectors define diffuse reflectors.

A12. The article of any one of Embodiments A9 to A11, wherein the first supporting layers and the second supporting layers are integrally formed as a single piece of material.

A13. The article of any one of Embodiments A9 to A12, wherein at least some of the first outer layers comprise one or more of the following: a dense fluoropolymer layer, a microporous (or micro-voided) fluoropolymer layer, a dense polyethylene layer at least partially (or entirely) covered by a dense fluoropolymer layer, a microporous polyethylene layer at least partially (or entirely) covered by a dense fluoropolymer layer, a multilayer optical film at least partially (or entirely) defining the first reflectance in the solar wavelength range, and a metal layer at least partially (or entirely) defining the first reflectance in the solar wavelength range.

A14. The article of any one of Embodiments A9 to A13, wherein at least some of the first supporting layers or second supporting layers comprise a metal layer.

A15. The article of Embodiment A14, wherein the first outer layers comprise a dense fluoropolymer and the second outer layers comprise a dense polyethylene.

A16. The article of any one of Embodiments A9 to A13, wherein the first supporting layers, the second supporting layers, or both comprise a polymer layer.

A17. The article of Embodiment A16, wherein the first outer layers comprise a multilayer optical film at least partially (or entirely) defining the first absorbance and the first average reflectance.

A18. The article of Embodiment A17, wherein the first outer layers comprise a microporous (or micro-voided) fluoropolymer layer at least partially (or entirely) defining the first absorbance and the first average reflectance.

A19. The article of any one of Embodiments A16 to A18, wherein the second outer layers comprise a microporous (or micro-voided) layer at least partially (or entirely) defining the second absorbance and the second average reflectance, wherein the microporous (or micro-voided) layer comprises a polyethylene or a polyethylene copolymer.

A20. The article of any one of Embodiments A9 to A13, wherein the second outer layers comprise infrared mirror films at least partially defining the second absorbance and the plurality of second elements further comprises graphic layers, wherein the infrared mirror films at least partially (or entirely) cover the graphic layers, wherein the graphic layers together define a visual graphic.

A21. The article of Embodiment A20, wherein the infrared mirror films define an average transmittance less than 30% (in some embodiments, less than or equal to 20% or even 10%) in a visible wavelength range from 0.3 to 0.8 micrometers.

A22. The article of any preceding Embodiment, wherein the plurality of first elements comprise an array of inorganic particles having an effective $D_{90}$ particle size of at most 50 micrometers (in some embodiments, white inorganic particles at least partially (or entirely) defining a high average reflectance in the solar wavelength range).

A23. The article of any preceding Embodiment, wherein at least some of the first or second outer surfaces define an array of discrete surface nanostructures, each discrete surface nanostructure defining height and width dimensions each less than 1 micrometer.

A24. The article of any preceding Embodiment, wherein at least some of the first or second outer surfaces define an array of discrete surface microstructures, each discrete surface microstructure defining a width dimension less than or equal to 50 micrometers (in some embodiments, to provide anti-drag or antisoiling properties).

A25. The article of Embodiment A24, wherein the array of discrete surface microstructures defines micro-spaces between the discrete surface microstructures having width greater than or equal to 50 micrometers and less than or equal to 90 micrometers (in some embodiments, to provide dirt resistance or antisoiling surface).

A26. The article of any preceding A Embodiment, wherein a total surface area of the first element outer surfaces is less than a total surface area of the second element outer surfaces (in some embodiments, less than or equal to 80%, 70%, 60%, 50%, 40%, 30%, or even 20% of the total area of the second element outer surfaces), and the second element outer surfaces together define a visual graphic.

A27. The article of any one of Embodiments A1 to A26, wherein a total surface area of the first element outer surfaces is equal to 80 to 120% (in some embodiments, 90 to 110%, 95 to 105%, or even 99 to 101%) of a total surface area of the second element outer surfaces.

A28. The article of any preceding A Embodiment, wherein the major structure has a thickness dimension between 1 micrometer and 100 centimeters.

A29. The article of any preceding Embodiment, wherein at least some of the plurality of first elements or second elements are arranged as alternating rows of elongate elements.

A30. The article of any one of Embodiments A1 to A28, wherein at least some of the plurality of first elements or second elements are formed as discrete surface structures.

A31. The article of any preceding A Embodiment, wherein at least some of the first or second element outer surfaces define planar surfaces.

A32. The article of any preceding A Embodiment, wherein at least some of the first or second element outer surfaces define curved surfaces.

B1. A passive cooling article comprising:
a plurality of first elements defining first element outer surfaces, the plurality of first elements defining a first absorbance of greater than or equal to 0.6 (in some embodiments, greater than or equal to 0.7, 0.8, 0.9, or even 1) in an atmospheric window wavelength range from 8 to 13 micrometers and defining a first average reflectance of greater than or equal to 80% (in some embodiments, greater than or equal to 90%) in a solar wavelength range from 0.4 to 2.5 micrometers (in some embodiments, from 0.3 to 3.5 micrometers), wherein at least some of the plurality of first elements comprises first supporting layers and first outer layers, the first outer layers at least partially (or entirely) defining the first absorbance and at least partially (or entirely) covering an outer surface of the first supporting layers to at least partially (or entirely) define the first element outer surfaces, wherein the first outer layers comprise a dense fluoropolymer; and
a plurality of second elements defining second element outer surfaces, the plurality of second elements defining a second absorbance of less than or equal to 0.5 (in some embodiments, less than or equal to 0.4, 0.3, 0.2, or even 0.1; generally lower than the first absorbance) in the atmospheric window wavelength range and defining a second average reflectance of greater than or equal to 60% (in some embodiments, greater than or equal to 80% or even 90%) in the solar wavelength range, wherein at least some of the plurality of second elements comprises second supporting layers and second outer layers, the second outer layers at least partially (or entirely) defining the second absorbance and at least partially (or entirely) covering an outer surface of the second supporting layers to at least partially (or entirely) define the second element outer surfaces, wherein the second outer layers comprise a dense polyethylene;
wherein the first supporting layers and the second supporting layers are integrally formed as a single piece of material;
wherein at least some of the first supporting layers or second supporting layers comprise a metal layer;
wherein the plurality of first elements and the plurality of second elements are interspersed to form a major structure having a first major surface comprising the first element outer surfaces and the second element outer surfaces and a second major surface opposing the first major surface;
wherein the major structure has a first end region and a second end region, wherein the first element outer surfaces face a first direction toward the first end region and the second element outer surfaces face a second direction toward the second end region.

C1. A passive cooling article comprising:
a plurality of first elements defining first element outer surfaces, the plurality of first elements defining a first absorbance of greater than or equal to 0.6 (in some embodiments, greater than or equal to 0.7, 0.8, 0.9, or even 1) in an atmospheric window wavelength range from 8 to 13 micrometers and defining a first average reflectance of greater than or equal to 80% (in some embodiments, greater than or equal to 90%) in a solar wavelength range from 0.4 to 2.5 micrometers (in some embodiments, from 0.3 to 3.5 micrometers), wherein at least some of the plurality of first elements comprises first supporting layers and first outer layers, the first outer layers at least partially (or entirely) defining the first absorbance and at least partially (or entirely) covering an outer surface of the first supporting layers to at least partially (or entirely) define the first element outer surfaces, wherein the first outer layers comprise a multilayer optical film at least partially (or entirely) defining the first absorbance and the first average reflectance; and
a plurality of second elements defining second element outer surfaces, the plurality of second elements defining a second absorbance of less than or equal to 0.5 (in some embodiments, less than or equal to 0.4, 0.3, 0.2, or even 0.1; generally lower than the first absorbance) in the atmospheric window wavelength range and defining a second average reflectance of greater than or equal to 60% (in some embodiments, greater than or equal to 80% or even 90%) in the solar wavelength range, wherein at least some of the plurality of second elements comprises second supporting layers and second outer layers, the second outer layers at least partially (or entirely) defining the second absorbance and at least partially (or entirely) covering an outer surface of the second supporting layers to at least partially (or entirely) define the second element outer surfaces, wherein the second outer layers comprise a dense polyethylene, wherein the second outer layers comprise a micro-voided layer at least partially (or entirely) defining the second absorbance and the second average reflectance, wherein the micro-voided layer comprises a polyethylene or a polyethylene copolymer;

wherein at least some of the first supporting layers or second supporting layers comprise a polymer layer;

wherein the plurality of first elements and the plurality of second elements are interspersed to form a major structure having a first major surface comprising the first element outer surfaces and the second element outer surfaces and a second major surface opposing the first major surface;

wherein the major structure has a first end region and a second end region, wherein the first element outer surfaces face a first direction toward the first end region and the second element outer surfaces face a second direction toward the second end region.

D1. A passive cooling article comprising:

a plurality of first elements defining first element outer surfaces, the plurality of first elements defining a first absorbance of greater than or equal to 0.6 (in some embodiments, greater than or equal to 0.7, 0.8, 0.9, or even 1) in an atmospheric window wavelength range from 8 to 13 micrometers and defining a first average reflectance of greater than or equal to 80% (in some embodiments, greater than or equal to 90%) in a solar wavelength range from 0.4 to 2.5 micrometers (in some embodiments, from 0.3 to 3.5 micrometers), wherein at least some of the plurality of first elements comprises first supporting layers and first outer layers, the first outer layers at least partially (or entirely) defining the first absorbance and at least partially (or entirely) covering an outer surface of the first supporting layers to at least partially (or entirely) define the first element outer surfaces, wherein the first outer layers comprise a micro-voided fluoropolymer layer (or a micro-voided polyester layer and a dense fluoropolymer layer at least partially (or entirely) covering the micro-voided polyester layer) at least partially (or entirely) defining the first absorbance and the first average reflectance; and a plurality of second elements defining second element outer surfaces, the plurality of second elements defining a second absorbance of less than or equal to 0.5 (in some embodiments, less than or equal to 0.4, 0.3, 0.2, or even 0.1; generally lower than the first absorbance) in the atmospheric window wavelength range and defining a second average reflectance of greater than or equal to 60% (in some embodiments, greater than or equal to 80% or even 90%) in the solar wavelength range, wherein at least some of the plurality of second elements comprises second supporting layers and second outer layers, the second outer layers at least partially (or entirely) defining the second absorbance and at least partially (or entirely) covering an outer surface of the second supporting layers to at least partially (or entirely) define the second element outer surfaces, wherein the second outer layers comprise a dense polyethylene, wherein the second outer layers comprise a micro-voided layer at least partially (or entirely) defining the second absorbance and the second average reflectance, wherein the micro-voided layer comprises a polyethylene or a polyethylene copolymer;

wherein at least some of the first supporting layers or second supporting layers comprise a polymer layer;

wherein the plurality of first elements and the plurality of second elements are interspersed to form a major structure having a first major surface comprising the first element outer surfaces and the second element outer surfaces and a second major surface opposing the first major surface;

wherein the major structure has a first end region and a second end region, wherein the first element outer surfaces face a first direction toward the first end region and the second element outer surfaces face a second direction toward the second end region.

E1. A passive cooling article comprising:

a plurality of first elements defining first element outer surfaces, the plurality of first elements defining a first absorbance of greater than or equal to 0.6 (in some embodiments, greater than or equal to 0.7, 0.8, 0.9, or even 1) in an atmospheric window wavelength range from 8 to 13 micrometers and defining a first average reflectance of greater than or equal to 80% (in some embodiments, greater than or equal to 90%) in a solar wavelength range from 0.4 to 2.5 micrometers (in some embodiments, from 0.3 to 3.5 micrometers), wherein at least some of the plurality of first elements comprises first supporting layers and first outer layers, the first outer layers at least partially (or entirely) defining the first absorbance and at least partially (or entirely) covering an outer surface of the first supporting layers to at least partially (or entirely) define the first element outer surfaces, wherein the first outer layers comprise a micro-voided fluoropolymer layer (or a micro-voided polyester layer and a dense fluoropolymer layer at least partially (or entirely) covering the micro-voided polyester layer) at least partially (or entirely) defining the first absorbance and the first average reflectance; and a plurality of second elements defining second element outer surfaces, the plurality of second elements defining a second absorbance of less than or equal to 0.5 (in some embodiments, less than or equal to 0.4, 0.3, 0.2, or even 0.1; generally lower than the first absorbance) in the atmospheric window wavelength range and defining a second average reflectance of greater than or equal to 60% (in some embodiments, greater than or equal to 80% or even 90%) in the solar wavelength range, wherein at least some of the plurality of second elements comprises second supporting layers and second outer layers, the second outer layers at least partially (or entirely) defining the second absorbance and at least partially (or entirely) covering an outer surface of the second supporting layers to at least partially (or entirely) define the second element outer surfaces, wherein the second outer layers comprise infrared mirror films at least partially defining the second absorbance and the plurality of second elements further comprises graphic layers, wherein the infrared mirror films at least partially (or entirely) cover the graphic layers, wherein the graphic layers together define a visual graphic;

wherein at least some of the first supporting layers or second supporting layers comprise a polymer layer;

wherein the plurality of first elements and the plurality of second elements are interspersed to form a major structure having a first major surface comprising the first element outer surfaces and the second element outer surfaces and a second major surface opposing the first major surface;

wherein the major structure has a first end region and a second end region, wherein the first element outer surfaces face a first direction toward the first end region and the second element outer surfaces face a second direction toward the second end region.

F1. An apparatus comprising:
a substrate capable of being cooled comprising at least a portion of a substrate surface configured to be exposed to solar energy; and
the article of any A, B, C, D, or E Embodiment covering at least the portion of the substrate surface to reflect solar energy directed toward the substrate surface.

F2. The apparatus of Embodiment F1, wherein the substrate surface comprises a vertical surface of a vehicle (in some embodiments, a trailer or semi-trailer of a truck, a train, a bus, or a heat exchanger thereof) and the second element outer surfaces face a direction toward a ground surface.

F3. The apparatus of Embodiment F1, wherein the substrate surface comprises a vertical surface of a stationary structure (in some embodiments, a building exterior wall or a heat exchanger of a building) and the second element outer surfaces face a direction toward a ground surface.

Thus, various embodiments of the multi-surface passive cooling articles are disclosed. Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A passive cooling article comprising:
a plurality of first elements defining first element outer surfaces, the plurality of first elements defining a first absorbance of greater than or equal to 0.6 in an atmospheric window wavelength range from 8 to 13 micrometers and defining a first average reflectance of greater than or equal to 80% in a solar wavelength range from 0.4 to 2.5 micrometers; and a plurality of second elements defining second element outer surfaces, the plurality of second elements defining a second absorbance of less than or equal to 0.5 in the atmospheric window wavelength range and defining a second average reflectance of greater than or equal to 60% in the solar wavelength range;

wherein the plurality of first elements and the plurality of second elements are interspersed to form a major structure having a first major surface comprising the first element outer surfaces and the second element outer surfaces and a second major surface opposing the first major surface;

wherein the major structure has a first end region and a second end region, wherein the first element outer surfaces face a first direction toward the first end region and the second element outer surfaces face a second direction toward the second end region;

wherein the plurality of second elements comprises one or more of the following: a dense polyethylene layer, a dense polyethylene copolymer layer, a microporous polyethylene layer, a microporous polyethylene copolymer layer, a fluoropolymer layer defining a thickness less than or equal to 10 micrometers, a coating comprising metal, an infrared mirror film at least partially defining the second absorbance in the atmospheric window wavelength range, a graphic layer at least partially defining the second absorbance in the atmospheric window wavelength range, a graphic layer at least partially covered by an infrared mirror film at least partially defining the second absorbance in the atmospheric window wavelength range, and a metal layer at least partially defining the first reflectance in the solar wavelength range;

wherein at least some of the plurality of first elements comprises first supporting layers and first outer layers, the first outer layers at least partially defining the first absorbance and at least partially covering an outer surface of the first supporting layers to at least partially define the first element outer surfaces, wherein at least some of the plurality of second elements comprises second supporting layers and second outer layers, the second outer layers at least partially defining the second absorbance and at least partially covering an outer surface of the second supporting layers to at least partially define the second element outer surfaces; and wherein the passive cooling article is a composite film, each of the first and second outer layers and first and second supporting layers being a film layer of the composite film.

2. The article of claim 1, wherein the plurality of first elements defines the first absorbance in a mid-infrared wavelength range from 4 to 20 micrometers.

3. The article of claim 1, wherein a first vector normal to at least a portion of the first element outer surfaces defines an interelement angle with a second vector normal to at least a portion of the second element outer surfaces, wherein the interelement angle is greater than or equal to 15 degrees and less than or equal to 165 degrees.

4. The article of claim 3, wherein a major surface vector normal to at least a portion of the second major surface defines a first element angle with the first vector, wherein the first element angle is greater than or equal to 15 degrees and less than or equal to 75 degrees.

5. The article of claim 4, wherein the major surface vector defines a second element angle with the second vector, wherein the second element angle is greater than or equal to 15 degrees and less than or equal to 75 degrees.

6. The article of claim 1, wherein the plurality of first elements comprises one or more of the following: a dense fluoropolymer layer, a microporous fluoropolymer layer, a dense polyester layer at least partially covered by a dense fluoropolymer layer, a microporous polyester layer at least partially covered by a dense fluoropolymer layer, a multilayer optical film at least partially defining the first reflectance in the solar wavelength range, and a metal layer at least partially defining the first reflectance in the solar wavelength range.

7. The article of claim 6, wherein the graphic layer comprises one or more of the following: a polyvinyl chloride layer, a polyethylene copolymer layer, a microporous polyethylene copolymer layer, and a microporous polyethylene at least partially covered by a dense polyethylene copolymer layer.

8. The article of claim 1, wherein the first supporting layers, the second supporting layers, or both comprise reflectors defining the respective average reflectances.

9. The article of claim 8, wherein at least some of the reflectors define diffuse reflectors.

10. The article of claim 1, wherein the first supporting layers, the second supporting layers, or both comprise a polymer layer that is a microporous polymer layer, a multilayer optical film, or a graphic layer.

11. The article of claim 10, wherein the first outer layers comprise a multilayer optical film at least partially defining the first absorbance and the first average reflectance.

12. The article of claim 11, wherein the first outer layers comprise a microporous fluoropolymer layer at least partially defining the first absorbance and the first average reflectance.

13. The article of claim 10, wherein the second outer layers comprise a microporous layer at least partially defining the second absorbance and the second average reflectance, wherein the microporous layer comprises a polyethylene or a polyethylene copolymer.

14. The article of claim 1, wherein the second outer layers comprise infrared mirror films at least partially defining the second absorbance and the plurality of second elements further comprises graphic layers, wherein the infrared mirror films at least partially cover the graphic layers, wherein the graphic layers together define a visual graphic.

15. The article of claim 14, wherein the infrared mirror films define an average transmittance less than 30% in a visible wavelength range from 0.3 to 0.8 micrometers.

16. The article of claim 1, wherein the plurality of first elements comprise an array of inorganic particles having an effective $D_{90}$ particle size of at most 50 micrometers.

17. The article of claim 1, wherein at least some of the first or second outer surfaces define an array of discrete surface nanostructures, each discrete surface nanostructure defining height and width dimensions each less than 1 micrometer.

18. The article of claim 1, wherein the first and second supporting layers are integral parts of a single continuous layer.

19. An apparatus comprising:
a substrate capable of being cooled comprising at least a portion of a substrate surface configured to be exposed to solar energy; and
the article of claim 1 covering at least the portion of the substrate surface to reflect solar energy directed toward the substrate surface.

20. The apparatus of claim 19, wherein the substrate surface comprises a vertical surface of a vehicle or a stationary structure and the second element outer surfaces face a direction toward a ground surface.

* * * * *